(12) United States Patent
Field et al.

(10) Patent No.: US 11,247,446 B2
(45) Date of Patent: Feb. 15, 2022

(54) RE-PULPABLE INSULATED PAPER PRODUCTS AND METHODS OF MAKING AND USING THE SAME

(71) Applicants: Andrew Howard Field, Chicago, IL (US); Nigel J. Flynn, Flowery Branch, GA (US); Taylor Kopacka Leigh, Alpharetta, GA (US); Jason Lye, Atlanta, GA (US); Lon E. Pschigoda, II, Gobles, MI (US)

(72) Inventors: Andrew Howard Field, Chicago, IL (US); Nigel J. Flynn, Flowery Branch, GA (US); Taylor Kopacka Leigh, Alpharetta, GA (US); Jason Lye, Atlanta, GA (US); Lon E. Pschigoda, II, Gobles, MI (US)

(73) Assignee: TRIPLE POINT INNOVATIONS LLC, Chicago, IL (US)

( * ) Notice: Subject to any disclaimer, the term of this patent is extended or adjusted under 35 U.S.C. 154(b) by 143 days.

(21) Appl. No.: 16/590,224

(22) Filed: Oct. 1, 2019

(65) Prior Publication Data
US 2020/0189256 A1    Jun. 18, 2020

Related U.S. Application Data

(60) Provisional application No. 62/739,735, filed on Oct. 1, 2018.

(51) Int. Cl.
*B32B 29/08* (2006.01)
*B32B 29/00* (2006.01)
(Continued)

(52) U.S. Cl.
CPC .............. *B32B 29/08* (2013.01); *B32B 7/12* (2013.01); *B32B 29/005* (2013.01); *B32B 29/06* (2013.01);
(Continued)

(58) Field of Classification Search
CPC ......... B32B 29/04; B32B 29/06; B32B 29/08; B32B 29/005; B32B 2250/05; B32B 2250/26; B32B 2305/024; B32B 2307/304; B65D 81/3858; B65D 81/3874; B65D 81/3897; B65D 81/3886; B65D 81/3846;
(Continued)

(56) References Cited

U.S. PATENT DOCUMENTS 5,155,138 A    10/1992  Lundqvist
5,543,186 A    8/1996   Andersen et al.
(Continued)

FOREIGN PATENT DOCUMENTS

WO    90/13708    11/1990
WO    99/36618    7/1999
(Continued)

OTHER PUBLICATIONS

PCT/US2020/053402 International Search Report and Written Opinion, dated Nov. 18, 2020.
(Continued)

*Primary Examiner* — Catherine A. Simone
(74) *Attorney, Agent, or Firm* — Withers & Keys, LLC

(57) ABSTRACT

Insulated paper products are disclosed. Methods of making and using insulated paper products are also disclosed.

34 Claims, 41 Drawing Sheets

(51) Int. Cl.
   *B32B 7/12* (2006.01)
   *B32B 29/06* (2006.01)
(52) U.S. Cl.
   CPC ....... *B32B 2250/05* (2013.01); *B32B 2250/26* (2013.01); *B32B 2305/024* (2013.01); *B32B 2307/304* (2013.01)
(58) Field of Classification Search
   CPC ............ B65D 81/3834; B65D 81/3823; B65D 81/3811; Y10T 428/25; Y10T 428/252; Y10T 428/1303; Y10T 428/24455; Y10T 428/24463; D21H 21/54; D21H 21/52; D21H 21/50
   USPC .................................................. 428/153, 154
   See application file for complete search history.

(56) References Cited

U.S. PATENT DOCUMENTS

| | | |
|---|---|---|
| 5,580,624 A | 12/1996 | Andersen et al. |
| 5,631,052 A | 5/1997 | Andersen et al. |
| 5,683,772 A | 11/1997 | Andersen et al. |
| 5,705,242 A | 1/1998 | Andersen et al. |
| 5,753,308 A | 5/1998 | Andersen et al. |
| 6,265,040 B1 | 7/2001 | Neale et al. |
| 6,740,373 B1 | 5/2004 | Swoboda et al. |
| 6,919,111 B2 | 7/2005 | Swoboda et al. |
| 2006/0096978 A1 | 5/2006 | Lafferty |
| 2007/0131667 A1 | 6/2007 | Amato |
| 2017/0284030 A1* | 10/2017 | Svending ............... D21H 21/10 |

FOREIGN PATENT DOCUMENTS

| | | |
|---|---|---|
| WO | 2004046463 A2 | 6/2004 |
| WO | 2013/063374 | 5/2013 |
| WO | 2016121372 | 8/2016 |

OTHER PUBLICATIONS

PCT/US2020/053421 International Search Report and Written Opinion, dated Nov. 9, 2020.

* cited by examiner

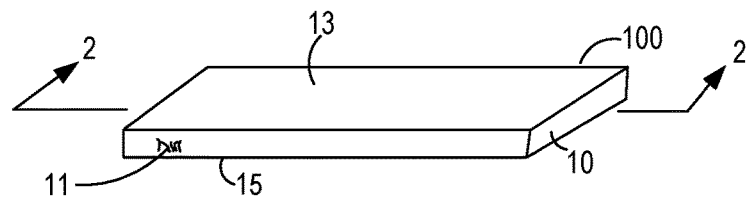
FIG. 1
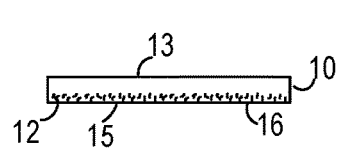   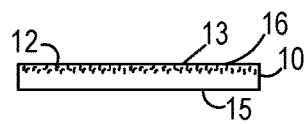   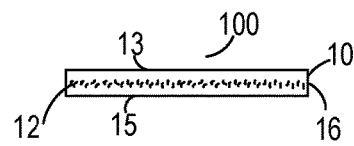
FIG. 2A          FIG. 2B          FIG. 2C
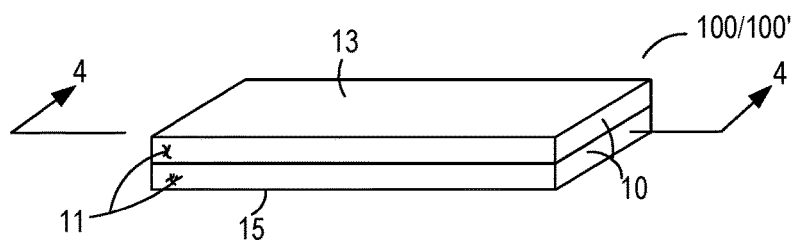
FIG. 3

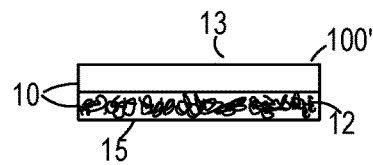 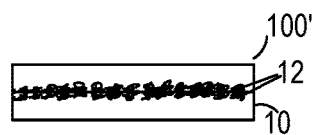 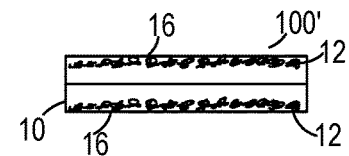
*FIG. 4A*      *FIG. 4B*      *FIG. 4C*
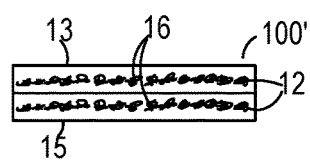 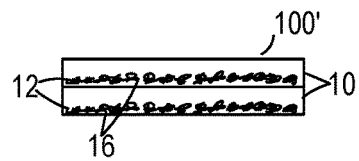 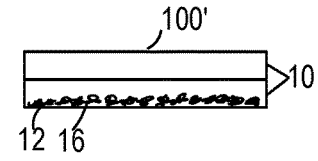
*FIG. 4D*      *FIG. 4E*      *FIG. 4F*
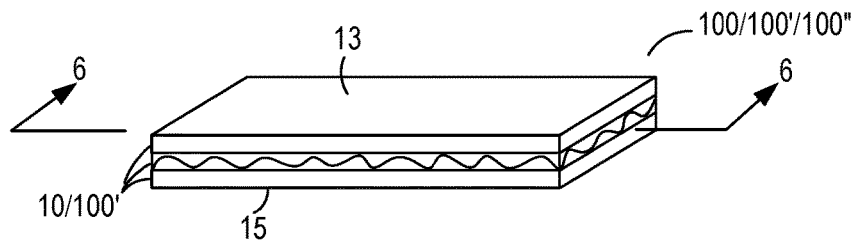
*FIG. 5*

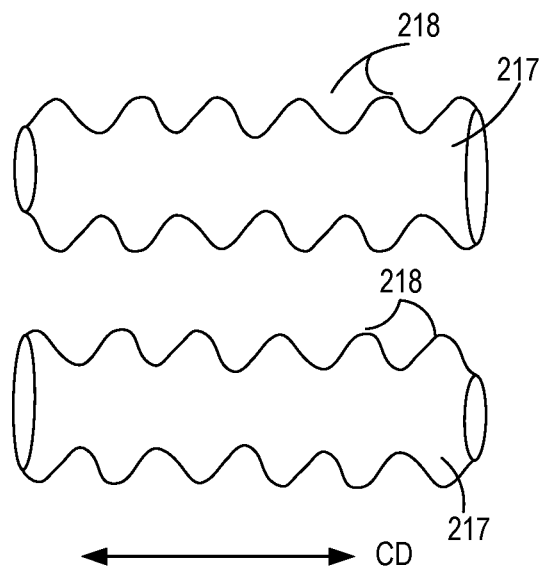
*FIG. 17*
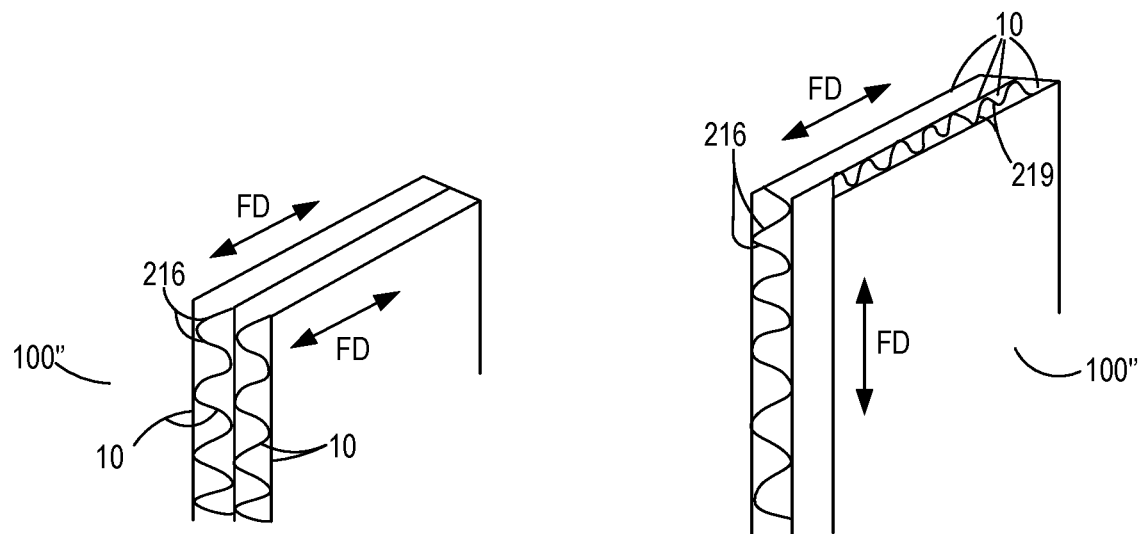
*FIG. 18A*     *FIG. 18B*

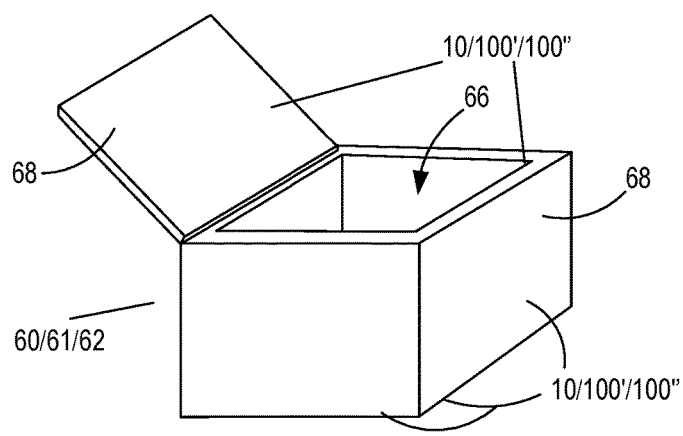
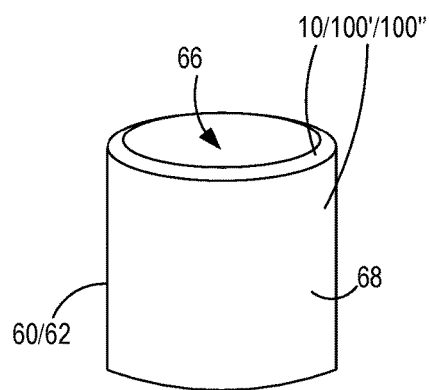
FIG. 19A
FIG. 19B
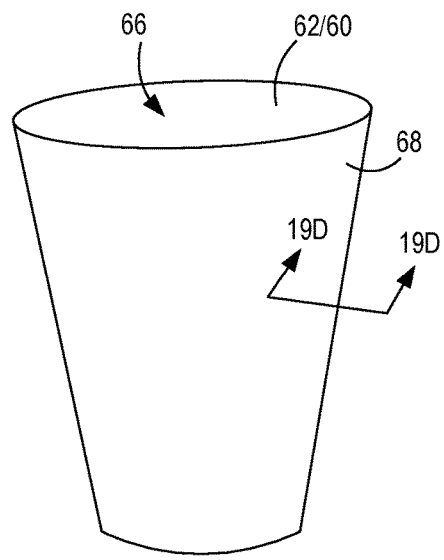
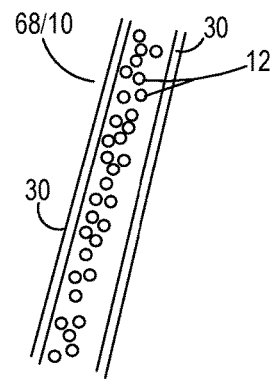
FIG. 19C
FIG. 19D

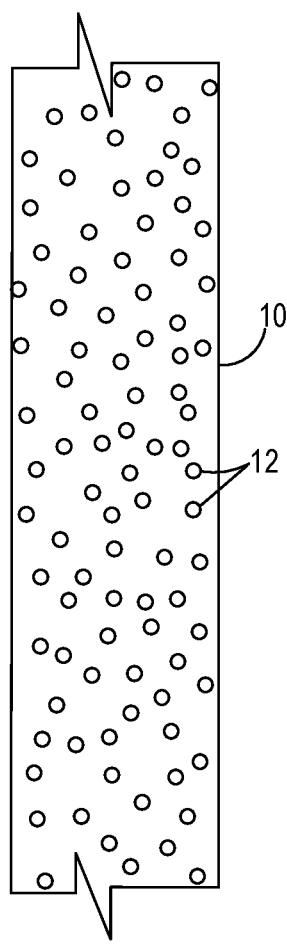 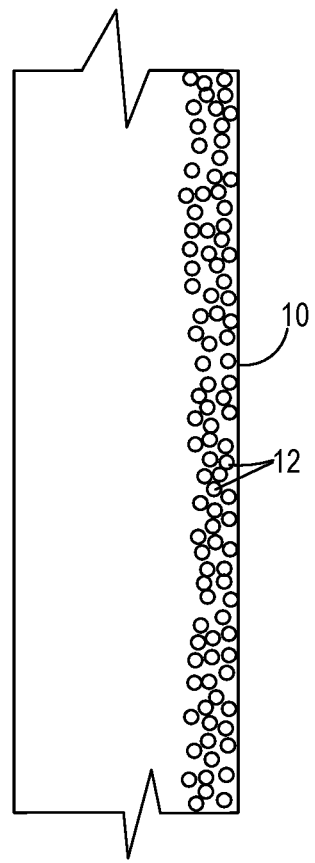
*FIG. 25A*  *FIG. 25B*

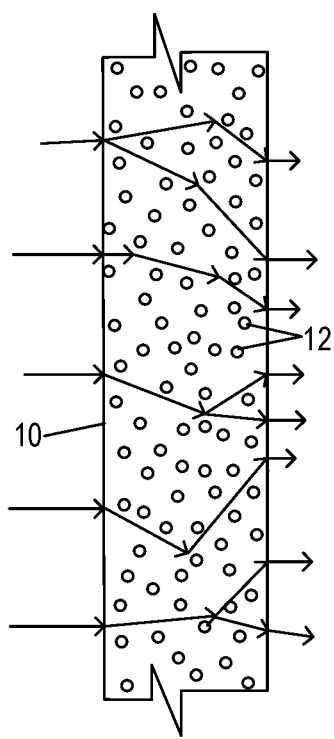 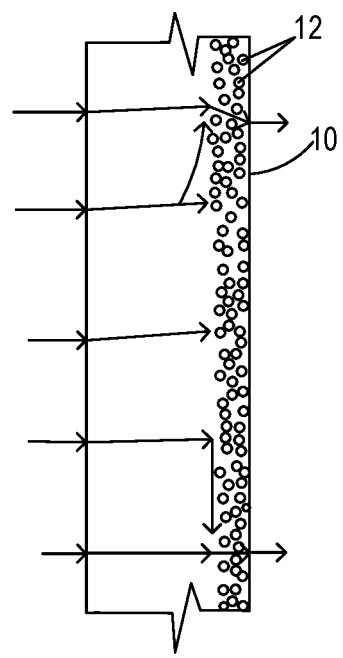
*FIG. 26A*  *FIG. 26B*

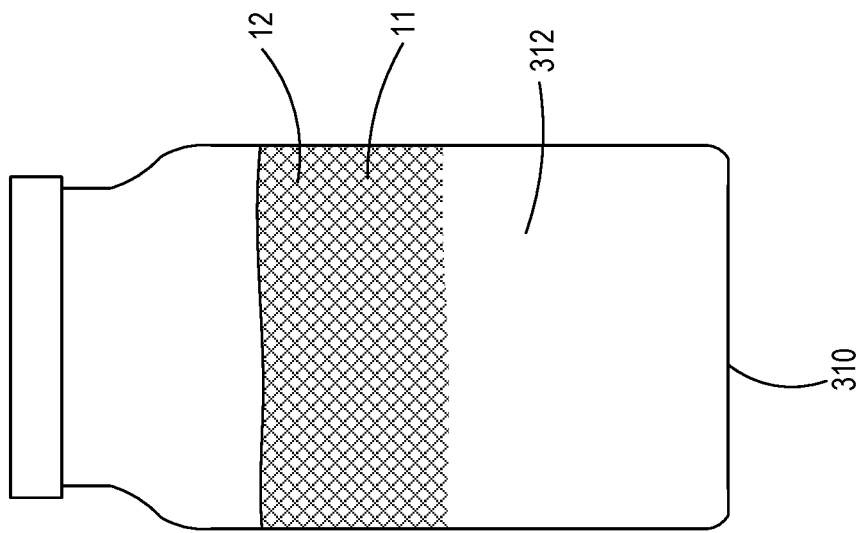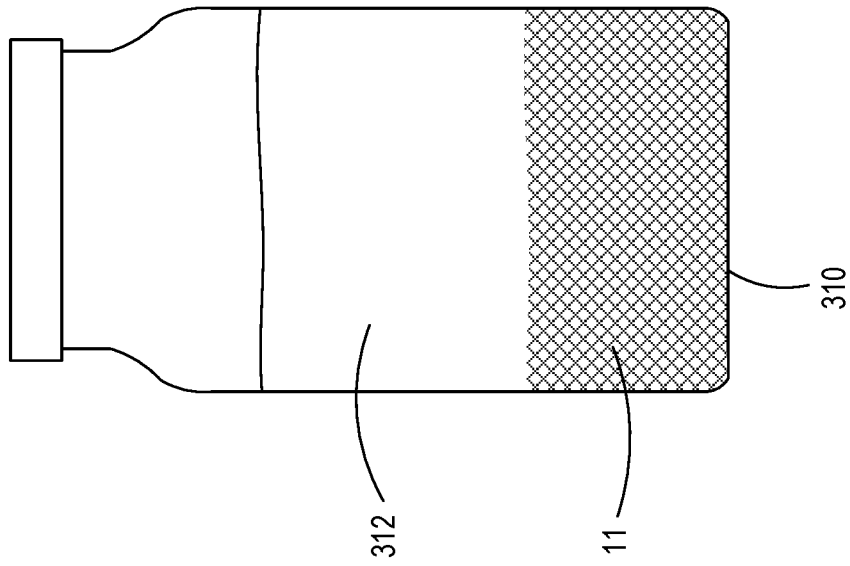
FIG. 44

FIG. 47

RE-PULPABLE INSULATED PAPER PRODUCTS AND METHODS OF MAKING AND USING THE SAME

CROSS-REFERENCE TO RELATED APPLICATIONS

This patent application claims the benefit of priority to U.S. Provisional Patent Application Ser. No. 62/739,735 filed on Oct. 1, 2018 and entitled "RE-PULPABLE INSULATED PAPER PRODUCTS AND AND METHODS OF MAKING AND USING THE SAME," the subject matter of which is hereby incorporated by reference in its entirety.

FIELD OF THE INVENTION

The present invention relates generally to insulated paper products. The present invention further relates to methods of making and using insulated paper products.

BACKGROUND OF THE INVENTION

With the advent of on-line shopping, many goods are now delivered directly to the consumer's front door from distributors such as Amazon and others. Food and other temperature sensitive materials are typically shipped inside an insulated box. The insulation is typically some kind of polymeric closed-cell foam or a poly(ethylene) bubble-wrap type material and perhaps a metalized reflective film, which is inserted into the cardboard box prior to shipping.

While cheap to produce, manufacture, and highly insulating, expanded polystyrene has many disadvantages. Expanded polystyrene (1) is persistent in the environment, contributing to ocean pollution and long term landfills, (2) is frequently litter that is unsightly and may cause obstruction in the guts of smaller animals when ingested, (3) is not recyclable in most municipalities, (4) has to be separated from the box prior to recycling, (5) has to be inserted inside the box, and (6) does not nest, meaning that it is expensive to ship, and bulky to store.

The economic impact of using incompatible materials in a production environment is often underappreciated. FIG. 42 shows how a stack of freshly made corrugated cardboard sheets are cut into an unfolded box by a rotary die/roller, ready to be inspected by quality control and shipped off to the customer. Card cuttings and trimmings from this process, along with any reject box, are shredded and then fed directly back into the repulping process (FIG. 7) as pre-consumer scrap card. This is made back into furnish. Introducing treatments, coatings, liners, and other materials into the cardboard box that cannot be fed directly back into the re-pulping process complicates the production process and risks increasing paper machine (FIG. 8) down-time if mistakes are made. Using an incompatible material means that the scrap, and any trimmings from that cardboard material must be segregated, and handled separately from the usual cardboard.

Presently, frozen or chilled food is shipped in cardboard containers with thermally insulating inserts. Such inserts are either expanded poly(styrene) foam (sold under the tradename Styrofoam), and or poly(olefin) bubble wrap which may or may not be metalized to decrease radiative heat transfer. Occasionally, expanded polyurethane foam is used in combination with a plastic film liner. None of these materials can be used in a cardboard box manufacturing line because any scrap containing these synthetic polymers would have to be segregated from the regular pulp. For this reason, cardboard boxes are made separately from the insulating material. Furthermore, the insulating material has to be removed prior to recycling the box as many municipalities do not recycle plastic films or expanded polystyrene.

For similar reasons, some paper beverage cups are also difficult to recycle. They are coated with a low molecular weight polyethylene, which causes problems when introduced into the pulp.

What is needed is a highly thermally insulating paper structure that provides one or more of the following benefits: (1) is non-toxic and safe for use with food, (2) maintains frozen or chilled food temperatures for the time needed to ship foods, (3) is curb-side ready—that is recyclable by municipal recycling services without separation or segregation from other papers in the waste stream, (4) trimmings generated during the paper product (e.g., cardboard box) manufacture are able to be repulped and directly sent back into the paper product (e.g., cardboard box) production stream without having to be segregated, (5) is able to withstand crushing by stacking, (6) is able to maintain integrity with condensation formation after being placed in a freezer then exposed to humid air, and (7) is biodegradable or biodestructable.

SUMMARY OF THE INVENTION

The present invention is directed to insulated paper products that (1) insulate food positioned therein and/or surrounded thereby, (2) are biodegradable or biodestructable, recycleable, repulpable, and (3) do not require additional inserts to keep food cold or hot. The disclosed insulated paper products utilize multiple ways to introduce insulating materials into and/or onto a variety of paper products. For example, thermally insulating materials may be introduced into the paper furnish prior to casting the furnish onto a paper-forming wire mesh. Alternatively, or in addition, the insulating material may be introduced between layers of paper as they are formed. Alternatively, or in addition, insulating materials may be incorporated into adhesives used to bond paper layers to one another. Still further, insulating materials may be included within a coating, which is then coated onto a variety of paper products.

The present invention is directed to insulated paper products. In one exemplary embodiment, the insulated paper product of the present invention comprises an insulated paper product comprising one or more paper layers and insulating material, wherein (I) when two or more paper layers are present, the two or more paper layers form an integral paper product, and (2)(a) at least one of (i) one layer in combination with the one or more paper layers comprises the insulating material, and (ii) one paper layer within the one or more paper layers may have a non-uniform distribution of insulating material therein, or (2)(b) the integral paper product itself has a non-uniform distribution of insulating material therethrough.

In another exemplary embodiment, the insulated paper product of the present invention comprises a corrugated integral paper product comprising: a first linerboard layer comprising one or more first paper layers, a second linerboard layer comprising one or more second paper layers, and a fluted paper layer comprising one or more fluted paper layers or a honeycomb layer positioned between the first linerboard layer and the second linerboard layer, wherein (i) the first linerboard layer, (ii) the second linerboard layer, and (iii) the fluted paper layer or the honeycomb layer may each independently comprise insulating material that has a low thermal conductivity and/or low emissivity.

In another exemplary embodiment, the insulated paper product of the present invention comprises a corrugated integral paper product comprising: a first linerboard layer comprising one or more first paper layers, a second linerboard layer comprising one or more second paper layers, and a fluted paper layer comprising one or more fluted paper layers or a honeycomb layer positioned between the first linerboard layer and the second linerboard layer, wherein (i) the first linerboard layer, (ii) the second linerboard layer, and (iii) the fluted paper layer or the honeycomb layer may each independently comprise insulating material therein or thereon.

In one desired embodiment, the insulated paper product comprises a fully recyclable, re-pulpable, biodegradeable, biodestructable, and thermally insulated cardboard box.

The present invention is further directed to methods of making insulated paper products. In one exemplary embodiment, the method of making an insulated paper product comprises: forming an insulated paper product comprising: one or more paper layers and insulating material, wherein (1) when two or more paper layers are present, the two or more paper layers form an integral paper product, and (2)(a) at least one of: (i) one layer in combination with the one or more paper layers comprises the insulating material and (ii) one paper layer within the one or more paper layers has a non-uniform distribution of insulating material therein, or (2)(b) the integral paper product itself has a non-uniform distribution of insulating material therethrough.

The present invention is further directed to methods for making insulated paper products in the form of corrugated structures, and subsequently forming them into containers. Similar structures may be formed in high volume using a die cutter to make a stack of similar box nets, or the net for each box may be custom cut using for instance, a laser, or a robot, or an automated abrasive jet, or some other means to rapidly produce custom-sized boxes upon demand.

The present invention is even further directed to methods of using insulated paper products. In one exemplary embodiment, the method of using an insulated paper product comprises: insulating an object (e.g., food, medicine, pharmaceuticals, ice, flowers, etc.) via any one of the herein-described insulated paper products.

These and other features and advantages of the present invention will become apparent after a review of the following detailed description of the disclosed embodiments and the appended claims.

BRIEF DESCRIPTION OF THE FIGURES

The present invention is further described with reference to the appended figure, wherein:

FIG. 1 depicts a perspective view of an exemplary paper product of the present invention;

FIGS. 2A-2C depict exemplary cross-sectional views of the exemplary paper product shown in FIG. 1 as viewed along line 2-2 shown in FIG. 1;

FIG. 3 depicts a perspective view of another exemplary paper product of the present invention;

FIGS. 4A-4F depict exemplary cross-sectional views of the exemplary paper product shown in FIG. 3 as viewed along line 4-4 shown in FIG. 3;

FIG. 5 depicts a perspective view of another exemplary paper product of the present invention (also referred to herein as "an integral paper product");

FIG. 17 depicts an exemplary close-up view of the exemplary flute-forming rollers used in the process step shown in FIG. 16 as viewed along the machine direction (MD);

FIGS. 18A-18B depict side views of two exemplary corrugated paper products of the present invention;

FIGS. 19A-19C depict exemplary storage containers comprising any one of the exemplary insulated paper products of the present invention;

FIG. 19D depicts an exemplary cross-sectional view of the wall structure of the exemplary hot beverage cup shown in FIG. 19C;

FIGS. 20-23A depict additional exemplary storage containers comprising any one of the exemplary insulated paper products of the present invention;

FIGS. 25A-25B depict a paper layer having an uniform distribution of insulating particles and a paper layer having a non-uniform distribution of insulating particles;

FIGS. 26A-26B depict possible heat pathways through (i) the paper layer having an uniform distribution of insulating particles shown in FIG. 25A and (ii) and the paper layer having a non-uniform distribution of insulating particles shown in FIG. 25B;

FIG. 44 depicts a photograph of regular bleached secondary fiber pulp (left jar), allowed to settle compared to the floating paper pulp after it has been combined with surface modified aerogel (right jar);

FIG. 47 depicts SEMs of surfaces and cross sections of prepared papers containing insulating fillers for comparison;

DETAILED DESCRIPTION OF THE INVENTION

Figure 6A:
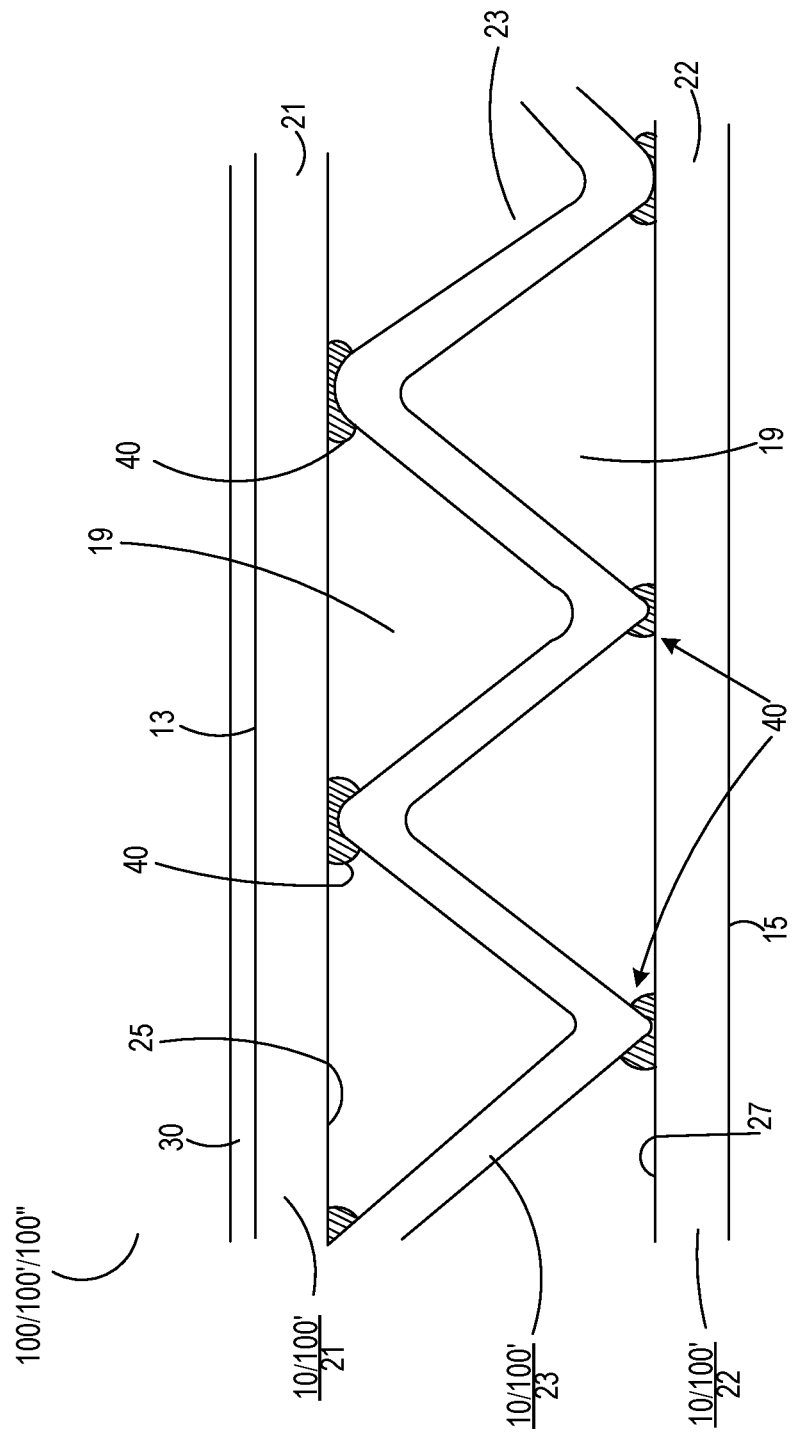
FIGS. 6A-6D depict exemplary cross-sectional views of the exemplary paper product shown in FIG. 5 as viewed along line 6-6 shown in FIG. 5.

The present invention is directed to insulated paper products comprising fibers 11 (e.g., wood pulp fibers 11) and insulating material 12. Although shown in all figures, each paper layer 10 comprises fibers 11 (e.g., wood pulp fibers 11) with or without other paper layer additives including, but not limited to, the insulating material 12. Some definitions of fibers, paper, and packaging, as well as product specification and fiber sources, are provided below.

As used herein, the term "paper" is used to identify a type of non-woven material in which fibers are randomly oriented in all directions. Fibers principally made from cellulose are poured as a slurry on a mesh screen. As the paper is formed, the fibers come into contact with each other, and physically bond with neighboring fibers via a variety of interactions, including hydrogen bonding. The fibers originally come from plants including trees, although synthetic and mineral fibers, or other types of fibers, may optionally be included. Often, the paper also contains recycled fiber. Wood may be sourced from direct harvesting of trees from forest land, or from lumber industry byproducts (such as sawdust).

Paper fibers may include the fibrous portions from many parts, including softwoods (such as those plants with needles instead of leaves, for example, loblolly pine) and hardwoods. Other plants that yield useful paper fibers include but are not limited to bamboo, sugar cane, wheat straw, reed grass, mischanthus grass, coconut fiber, hemp fiber, cotton fiber, jute, palm, reeds, and papyrus. Cellulose fibers in many plants are bound together with lignin.

In the case of virgin (non-recycled) fiber, much of the lignin is removed during the pulping process. Recycled paper may include fibers from corrugated, fiber board, writing paper, pressboard, card, newspaper, tissue paper, specialty papers, linerboard, containerboard, boxboard, PE-lined paperboard, carton material, cup stock, or foodboard.

When made from trees, the pulping process involves methods to separate the individual cellulosic fibers into a slurry, as well as remove some or all of the lignin. Pulping methods may include a) thermomechanical pulping, which involves the use of steam and sheer forces generated between a spinning and a stationary plate, b) chemical pulping, which uses strong chemicals to break down the pulp by dissolving the lignin, and/or c) the semi-chem process, which uses a combination of mechanical and chemical methods. Most often, fluted medium hoard (e.g., fluted medium board 23) is made using semi-chem process pulp and/or recycled paper fiber. Other types of pulp include solid bleached sulfate pulp, chipboard, and kraft.

Paper (and paper layer 10), as used herein, may broadly include any material that includes 15% or more cellulose fibers (discussed further below). Other additives, including insulating material 12, other particles/additives/components that impart grease resistant and/or water resistant, as well as other particles/additives/components to impart strength. Non-paper (and non-paper layer 30) is anything containing less than 15% of cellulose fibers (discussed further below).

As used herein, the term insulating material, such as insulating material 12, is used to describe inorganic or organic materials that provide some degree of insulation. The term insulating material, as in insulating material 12, does not include air alone or any other gas alone, although air and/or another gas could be trapped within one or more inorganic or organic insulating material 12.

Paper products 10/100'/60, comprising fibers 11 (e.g., wood pulp fibers 11) and insulating material 12, can either be made flat (e.g., insulated paper products 100/100') using a screen to make flat materials, or alternatively be molded, vacuum formed, or thermoformed from a pulp suspension to form essentially three-dimensional (non-flat) objects (e.g., molded or otherwise formed containers 60 shown in FIGS. 19A-23B). Such three-dimensional paper products include certain packaging, for instance, egg crates and egg cartons, packaging that protects the corners of products shipped in the mail, biodegradable compost containers, biodegradable plant pots, disposable urinals and bed pans used in hospitals, disposable cat little boxes, and the like. Additives, including insulating material 12, may be included within the paper products 10/100'/60 to impart thermal insulation properties, strength under moist or wet conditions, impart water repellency or water proofing, impart grease absorption resistance, increase strength, improve the color, improve printability, or other aesthetic aspects.

When forming a given paper layer 10, dried pulp sheets may be fragmented using a hammermill and the fibers 11 dispersed in air. This is often called fluff pulp. The solid-in-air suspension may then be vacuum formed into products 10/100'/60. Such products include air-laid pads, absorbent materials for use in other products such as diapers and feminine hygiene products, disposable pet waste pads, or fluff thermal insulation.

Additives, including insulating material 12, may be added to the paper pulp prior to casting on the paper wire or otherwise molding the pulp into a product 10/100'/60. Alternatively, additives, including insulating material 12, may be added at the size press, or after the steam can dryers. Additives, including insulating material 12, can also be added to a clay coating (e.g., coating 30) often applied to liner board (e.g., liner board 21/22) to make clay coated kraftback, or clay coated newsback.

Paper packaging (e.g., containers 60 shown in FIGS. 19A-23B), formed from the insulated paper products 100/100'/100" of the present invention, may include a wide variety of formats, including: regular slotted container (RSC), overlap slotted container, full overlap slotted container, special center slotted container, Bag-in-Box, center special overlap slotted container, center special full-overlap slotted container, snap- or 1-2-3-bottom box with tuck top, snap- or 1-2-3-bottom box with RSC top, Full Bottom File Box, Hamper Style, Ft. Wayne Bottom or Anderson Lock Bottom, Bellows Style top and Bottom Container, Integral Divider Container, RSC with Internal Divider or Self Divider Box, Full-telescope Design-style Box, Full-telescope Half-slotted Box, Partial-Telescope Design-style Box, Partial-telescope half-slotted box, Design-Style Box with cover, Half-slotted Box with cover, Octagonal Double Cover Container, Double cover box, Interlocking Double-Cover box, double-thickness score-line box, one-piece folder, two-piece folder, three-piece folder, fiver panel folder, one piece folder with air cell/end buffers (used to protect e.g. books), wrap-around blank, tuck folder, one piece telescope, double-slide box, number 2 or 3 bliss box, recessed end box, self-erecting box, pre-glued auto bottom with RSC top flaps, four corner tray, self-erecting six-corner tray, flange box, Arthur lock bottom, valentine lock container, reverse valentine lock container.

Medium board used in the insulated paper products 100/100'/100" of the present invention may be fluted with flutes of different dimensions. See, for example, exemplary fluted medium board 23 shown in FIGS. 6A-6D). The Fiber Box Handbook defines flutes and flute dimensions as: A, B, C, E, F, G, K, N, as well as R/S/T/D. The liner and medium papers may also be tested and rated by different burst grade: 125-350 SW, 23-55 ECT, 200-600 DW, 42-82 ECT DW, 700-1300 TW, 67-112 ECT TW. The carton or box (e.g., box 61) may then be folded into the following industry known styles: reverse tuck, snap lock, automatic bottom, straight tuck, tuck top snaplock bottom, tuck top automatic bottom, seal end, beers, mailing envelopes, folder, and simplex.

As discussed herein, the insulated paper products of the present invention may comprise a single paper layer with insulating material dispersed therein or thereon, or may comprise two or more paper layers in combination with insulating material, wherein the insulating material is within one or more of the paper layers of the insulated paper product and/or is present as a component within the insulated paper product (e.g., as a separate layer from the paper layers and/or as a filler within a layer or component of the insulated paper product). See, for example, exemplary insulated paper products 100/100'/100" in FIGS. 1-6D.

The insulated paper products of the present invention may further comprise one or additional layers other than the one or more paper layers and possible layers of insulating material. Suitable additional layers may include, but are not limited to, a coating that provides enhanced emissivity of the insulated paper product, a coating that provides a desired color and/or surface texture for the insulated paper product, and a coating that provide enhanced water-repellency (e.g., waterproofing properties) to the insulated paper product. See, for example, exemplary insulated paper products 100/100'/100" in FIGS. 6A-6D.

In exemplary insulated paper product 100/100'/100" shown in FIG. 6A, a corrugated cardboard structure 100/100'/100" comprises two liner boards 21/22 bonded to a fluted medium board 23. One (or both) of the liner boards 21/22 may be coated (e.g., clay coated) with coating layer 30 for aesthetics. The fluted medium 23 may have a range of flute dimensions, which are classified by the industry as A-flute through F-Flute. Each liner board 21/22 may be made from one ply of paper 10/100', or it may comprise two or more plies 10/100'. Other types of board that could be used in combination with the above-described insulated paper products 100/100'/100" discussed above: pressboard—pressed fiber board; honeycomb board—e.g., two liner boards 21/22 with a honeycomb spacer in between.

Figure 6B:
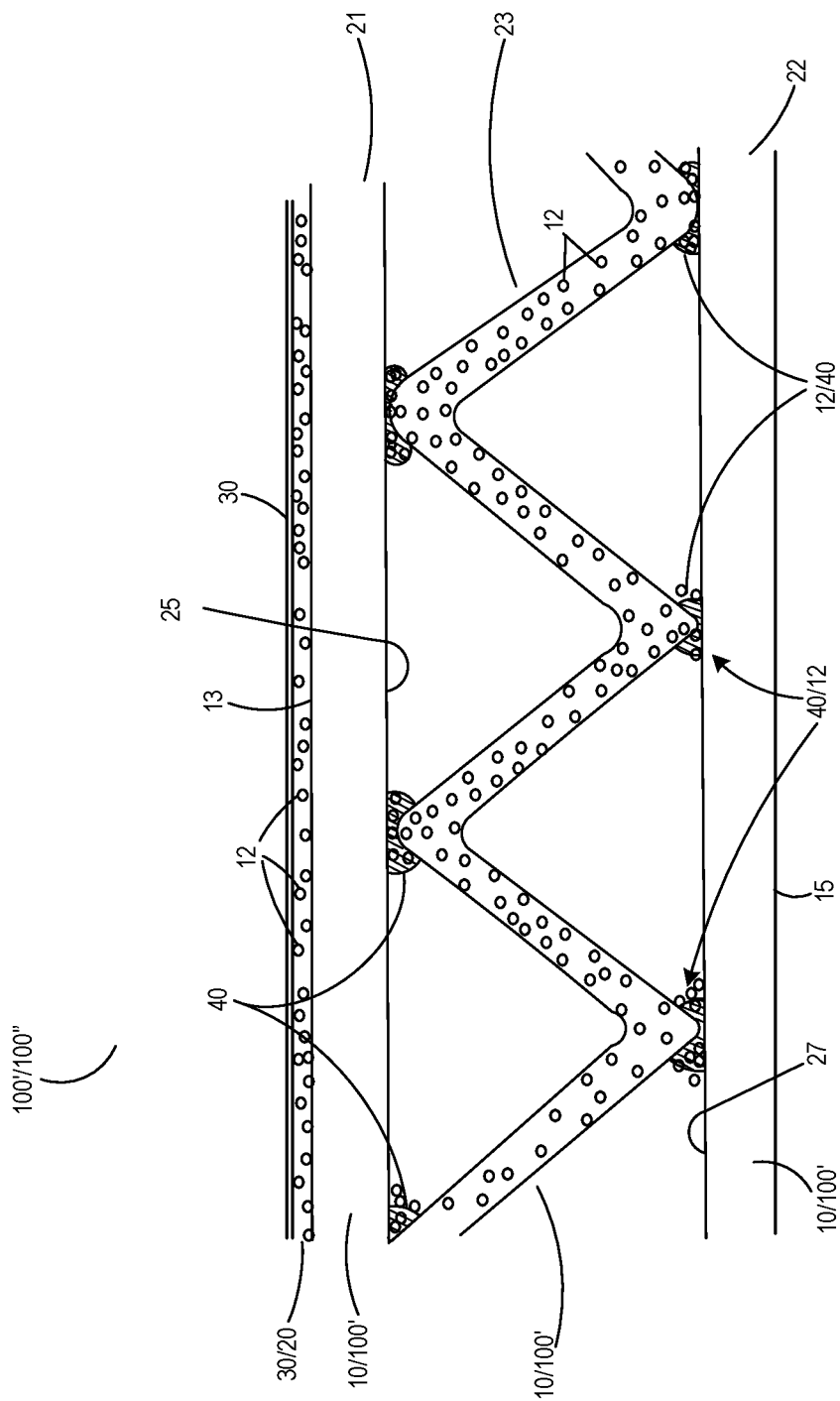

In exemplary insulated paper product 100/100'/100" shown in FIG. 6B, a corrugated cardboard structure 100/100'/100" comprises two liner boards 21/22 bonded to a fluted medium board 23, and demonstrates several opportunities for incorporation of insulating additives 12 into the structure of corrugated cardboard 100/100'/100". First, insulating additives 12 have been added to the furnish of the fluted medium 23. Second, the flutes have been further isolated from heat transfer via conduction by incorporating insulating additives 12 into the starch adhesive 40 that bonds each flute (e.g., of fluted medium 23) to the liner boards 21/22. Third, the liner board 21 is coated with insulating additives 12 via a coating 30. Fourth, to slow radiative heat transfer, a low emissivity coating 30 is overcoated on the outside of the corrugated cardboard structure 100/100'/100" (e.g., a box 61). Such a coating 30 will reflect vs. absorb radiative heat and infra-red radiation.

Figure 6C:
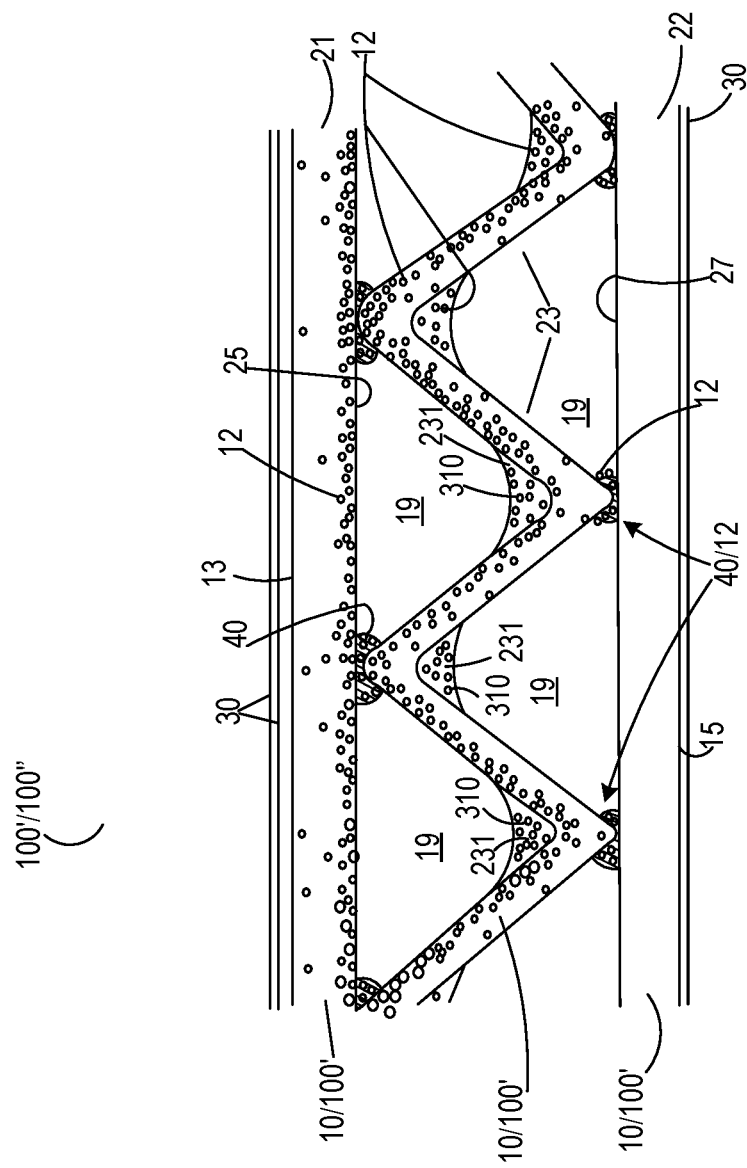

In exemplary insulated paper product 100/100'/100" shown in FIG. 6C, another corrugated cardboard structure 100/100'/100" comprises two liner boards 21/22 bonded to a fluted medium board 23, and again demonstrates several opportunities for incorporation of insulating additives 12 into the corrugated cardboard structure 100/100'/100". First, insulating additives 12 have been added to the furnish of the fluted medium board 23, however, in such a way that the insulating material 12 has preferentially segregated to one face (e.g., the upper face as shown) of the medium fluted board 23 over the other (e.g., the lower face as shown). Second, the flutes (of the medium fluted board 23) have been further isolated from heat transfer via conduction by incorporating insulating additives 12 into the starch adhesive 40 that bonds each flute of the medium fluted board 23 to the liner boards 21/22. Third, another coating 310 containing insulating additives 12 has been incorporated in the valleys 231 of the flutes. Fourth, one of the liner boards 21/22 contains insulating additives 12 distributed in a non-uniform manner (e.g., such as in first liner board 21 as shown). Fifth, to slow radiative heat transfer, a low emissivity coating 30 is overcoated on the outside faces of both liner boards 21/22. Such a coating 30 will reflect vs. absorb radiative heat and infra-red radiation.

Figure 6D:
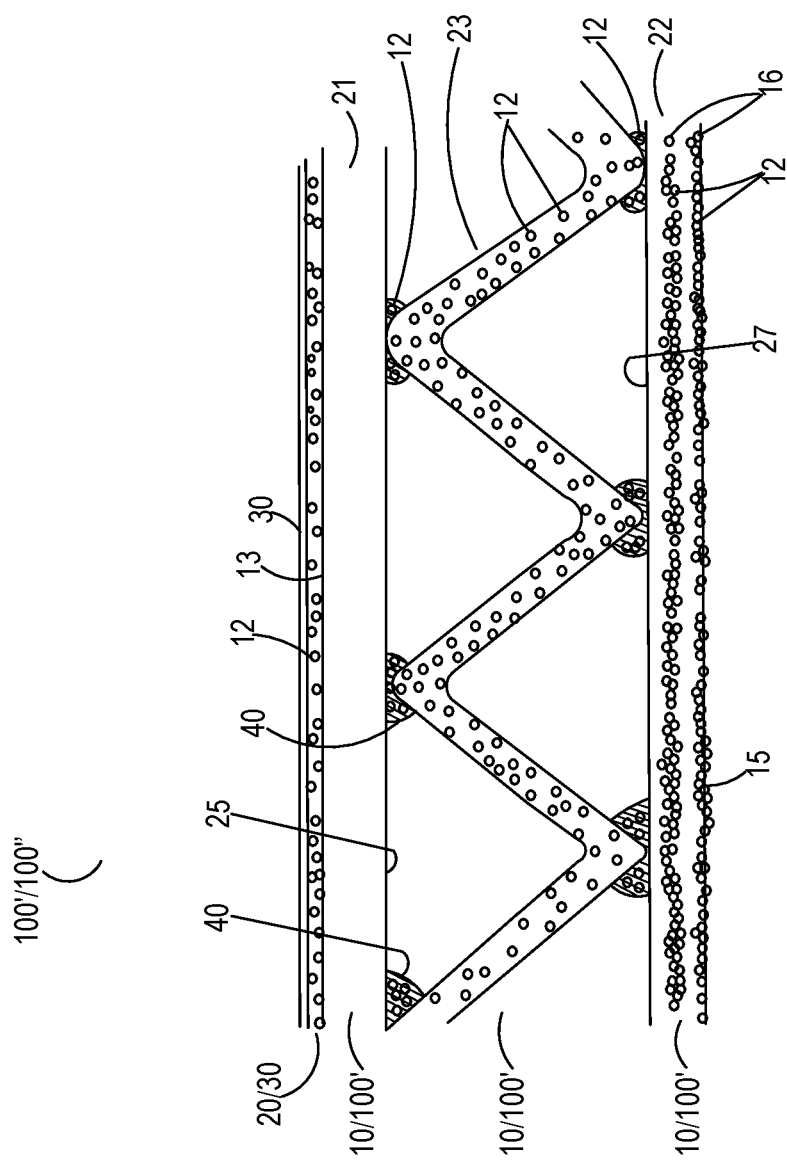

In exemplary insulated paper product 100/100'/100" shown in FIG. 6D, another corrugated cardboard structure 100/100'/100" comprises two liner boards 21/22 bonded to a fluted medium board 23, and again demonstrates several opportunities for incorporation of insulating additives 12 into the insulated paper product 100/100'/100". First, insulating additives 12 have been added to the furnish of the fluted medium board 23 in such a way that the insulating materials 12 are distributed evenly throughout the thickness of the one or more paper layers 10/100'. Second, the flutes of the fluted medium board 23 have been further isolated from heat transfer via conduction by incorporating insulating additives 12 into the starch adhesive 40 that bonds each flute of the fluted medium board 23 to the liner boards 21/22. Third, another coating 30 containing insulating additives 12 has been coated onto one of the liner board 21. Fourth, the second liner board 22 contains insulating additives 12 distributed in a non-uniform manner. Fifth, to slow radiative heat transfer, a low emissivity coating 30 is overcoated on the outside faces of one of the liner boards 21. Such a coating 30 will reflect vs. absorb radiative heat and infra-red radiation.

In addition, any of the insulated paper products of the present invention described herein may be configured into a variety of shapes. For example, in some embodiments, the insulated paper product is in the form of an insulated cup or mug that may be used to house a hot beverage such as coffee. Such insulated paper products may be used instead of STYROFOAM® cups, eliminating the disposal and environmental problems associated with STYROFOAM® cups. In other embodiments, the insulated paper product is in the form of insulated packaging for temporary storage and transport of items such as food, medicines, dc. Such insulated paper products may be in the form of an insulated box, corrugated or not corrugated, as well as many other packaging items discussed herein. See, for example, exemplary insulated paper products 100/100'/100" in FIGS. 19A-23B.

Regardless of configuration and/or shape, the insulated paper products 100/100'/100" of the present invention provide a degree of insulation due to the construction of one or more paper layers 10 within a given insulated paper products 100/100'/100". For example, FIGS. 25A-25B depict cross-sectional representations of exemplary paper composite layers 10 containing insulating material particles 12, represented as circles, and fibers 11. Both paper composite layers 10 contain the same number of circles, representing the insulating material particles 12. The paper composite layer 10 shown in FIG. 25A has a substantially uniform distribution of insulating material particles 12, whereas the paper composite layer 10 shown in FIG. 25B has a non-uniform distribution of insulating material particles 12.

In addition, FIGS. 26A-26B provide a representation of possible conductive pathways that heat could take through exemplary paper composite layers 10 shown in FIGS. 25A-25B. While the invention should not be limited by theory, in the case of the paper composite layer 10 shown in FIG. 25A, it is believed that the insulating particles 12, evenly distributed, lengthen the pathway of the conducted heat, thereby slowing heat transfer down. While the paper composite layer 10 shown in FIG. 25B has the same number of particles 12 (represented by the same number of circles), the particles 12 are concentrated in a narrow layer of the paper composite layer 10. Heat is partially blocked by the high concentration of insulating particles 12, reducing heat flow considerably in the paper composite layer 10 shown in FIG. 25B compared to the paper composite layer 10 shown in FIG. 25A.

The present invention is further directed to methods of making and using the herein-disclosed and described insulated paper products. The insulated paper products may be made using papermaking equipment and techniques so as to produce one or more paper layers. As discussed herein, the methods of making the insulated paper products of the present invention involve the strategic placement of one or more insulating materials within a given insulated paper product and/or the strategic placement of one or more optional coatings on the insulated paper product so as to provide superior insulating properties, as well as other properties to the insulated paper product. Exemplary method steps and procedures for forming insulated paper products of the present invention are shown/described in FIGS. 7-17.

Figure 7:
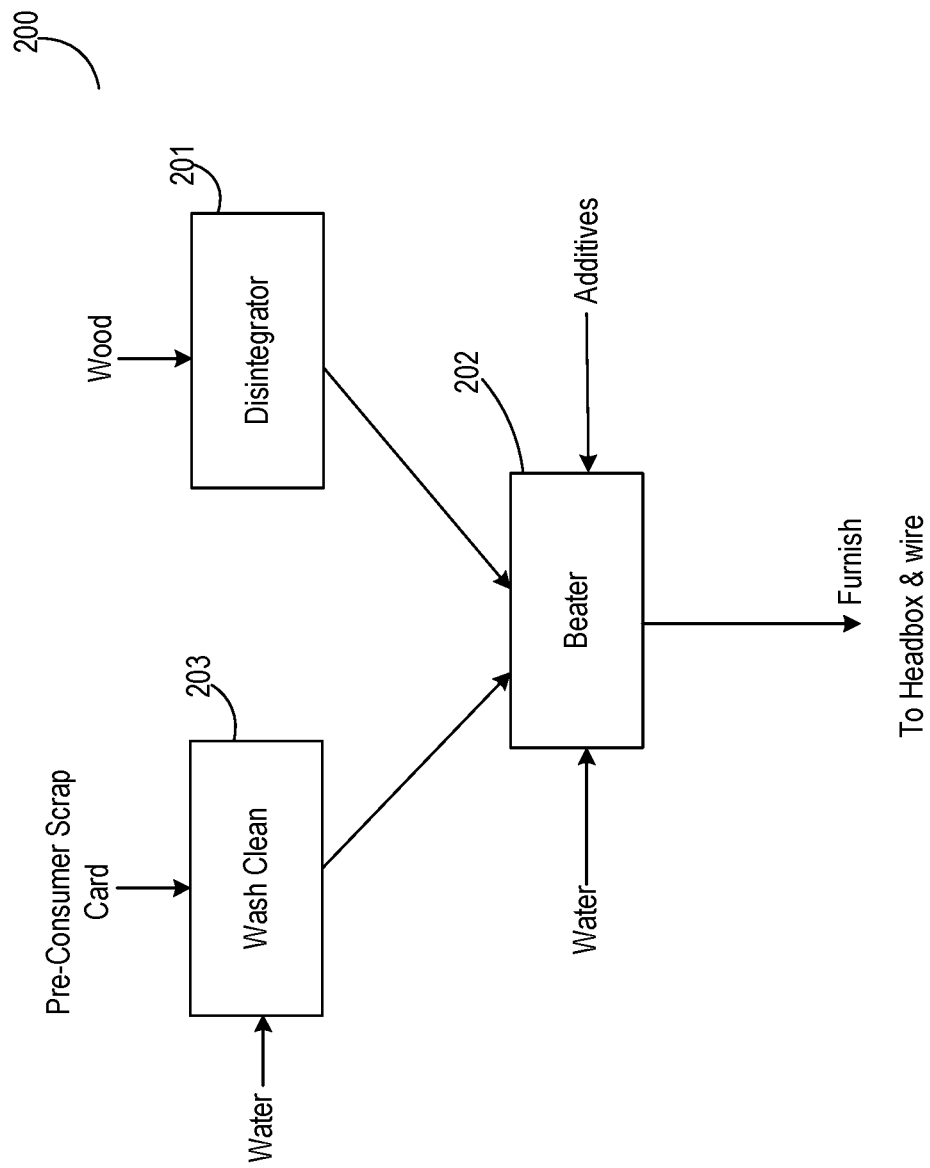
FIG. 7 depicts a schematic view of process steps and process components used to form the exemplary paper products of the present invention.

FIG. 7 describes an exemplary method 200 for forming paper from wood pulp and pre-consumer trimmings/scrap cardboard. After removal of bark and leaves etc., a wood composition of tree-wood is approximately ⅓ cellulose, ⅓ lignin, and ⅓ water. Wood is fed into a disintegrator 201, which grinds the wood and feeds it into a beater 202. Pulp is made in the beater 202. After prolonged beating, the fibers undergo morphological changes Fibers tend to collapse from round fibers into more of a kidney shaped cross-section, and the fibers become slightly more hydrophobic as beating continues.

As the layers of paper are formed and further processed, trimmings and rejected card (e.g., damaged, warped, etc.) is shredded and fed back into the pulping process. The card is washed in a wash clean device 203 to the extent possible to remove inks etc., then fed back into the beater 202.

Figure 8A:
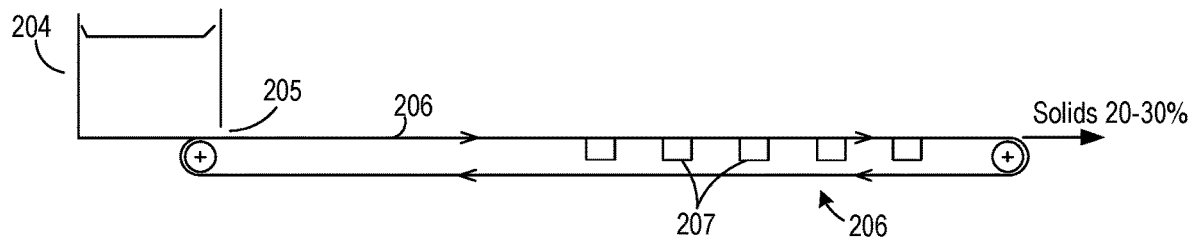
FIGS. 8A-8C depict an exemplary process flow in an exemplary papermaking process suitable for use in forming the exemplary paper products of the present invention.
Figure 8B:
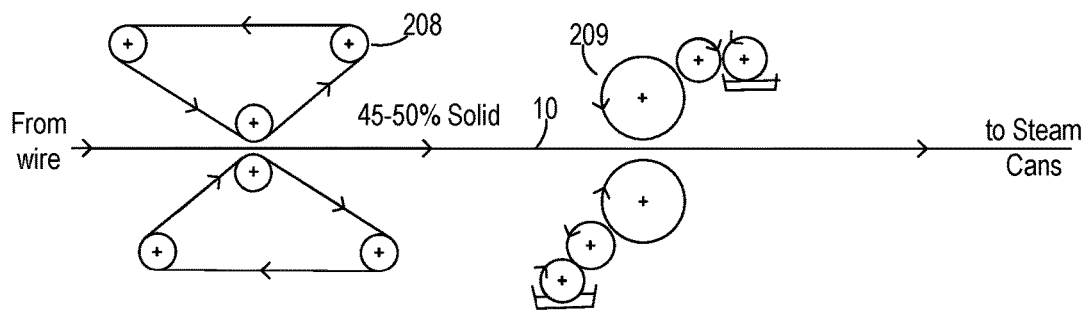
Figure 8C:
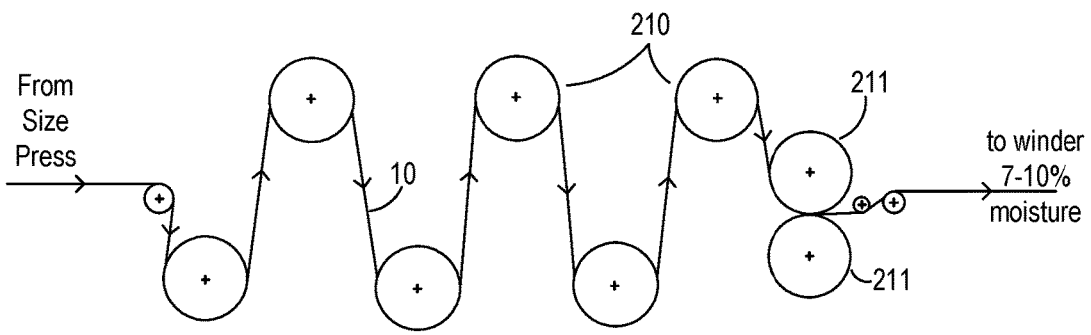

FIGS. 8A-8C depict an exemplary process of forming paper sheets 10. As shown in FIG. 8A, pulp (furnish) is pumped into a header box 204. The fiber content of the furnish is approximately 1-2 wt % at this stage. A gate 205 allows furnish to flow out onto the moving forming wire (a fine mesh conveyor) 206. The forming wire 206 may be 75-100 feet long. Initially, water drains via gravity, however, further down, vacuum boxes 207 beneath the wire 206 assist water removal, increasing the fiber content to around 20-30 wt %.

As shown in FIG. 8B, the material (~20-30 wt % fiber) is then fed through one or more felt presses 208, which "blot" the precursor paper (i.e., precursor to paper layer 10), removing more water, and increasing the fiber content to around 45-50 wt %. If starch or another additive is to be applied, then that may be done at the size press 209 prior to drying.

As shown in FIG. 8C, drying may be affected in a number of ways, including running over steam cans 210, or entering a long hot air drying tunnel (not shown). After passing through calendar rolls 211 and prior to winding, the paper 10 may be between 6 to 10% moisture content.

Figure 9:
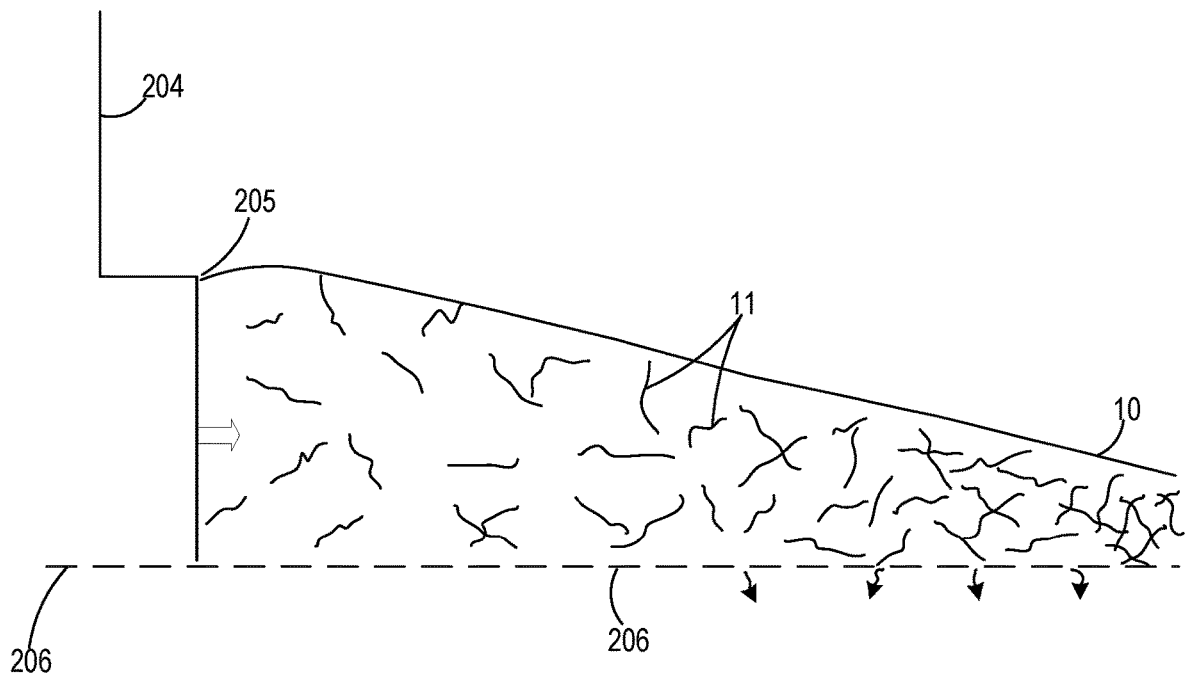
FIG. 9 depicts a side view of a paper layer forming process step suitable for thrilling a single paper layer within any of the exemplary paper products of the present invention.

FIG. 9 depicts an exemplary furnish flowing out of a header box gate 205 onto the moving forming wire (a fine mesh conveyor) 206, showing water draining through the moving forming wire 206, and fibers coalescing and concentrating as the wire 206 moves along.

Figure 10:
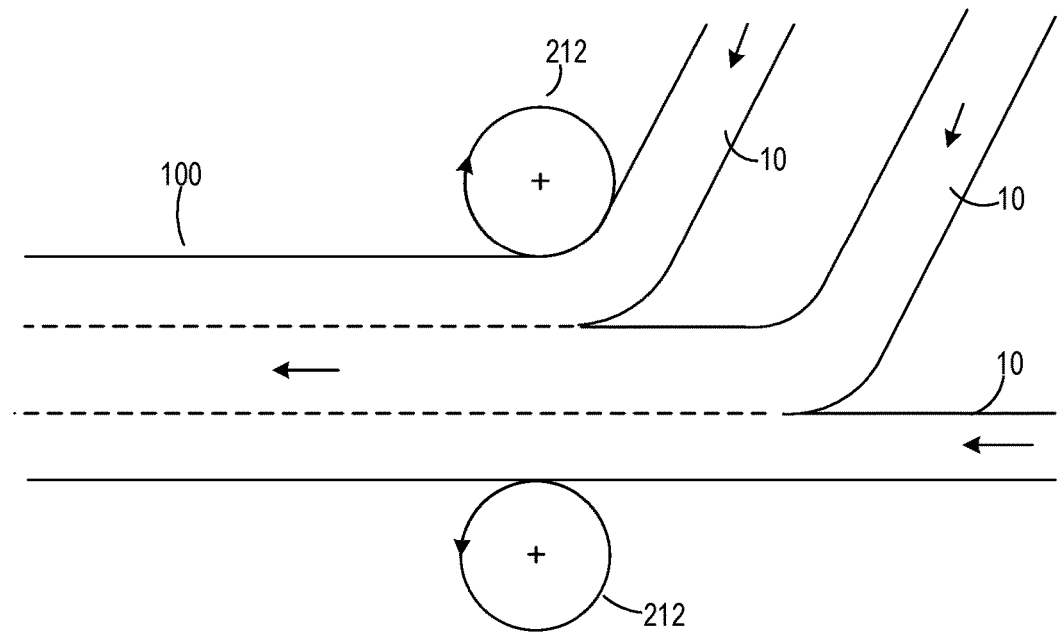
FIG. 10 depicts a side view of another paper product forming process step suitable for forming an exemplary three-layered paper products of the present invention.

FIG. 10 depicts an exemplary process step for forming a multiple ply linerboard 100. The linerboard 100 may be made from more than one paper ply 10 during the manufacturing process. More than one header box 204 and wire line 206 may be running simultaneously, so that two or more wet paper sheets 10 are combined at laminator nip rolls 212 prior to entering the felt press 208. FIG. 10 shows three plies 10 being combined to make a thicker linerboard 100 prior to entering a felt press 208.

Figure 11:
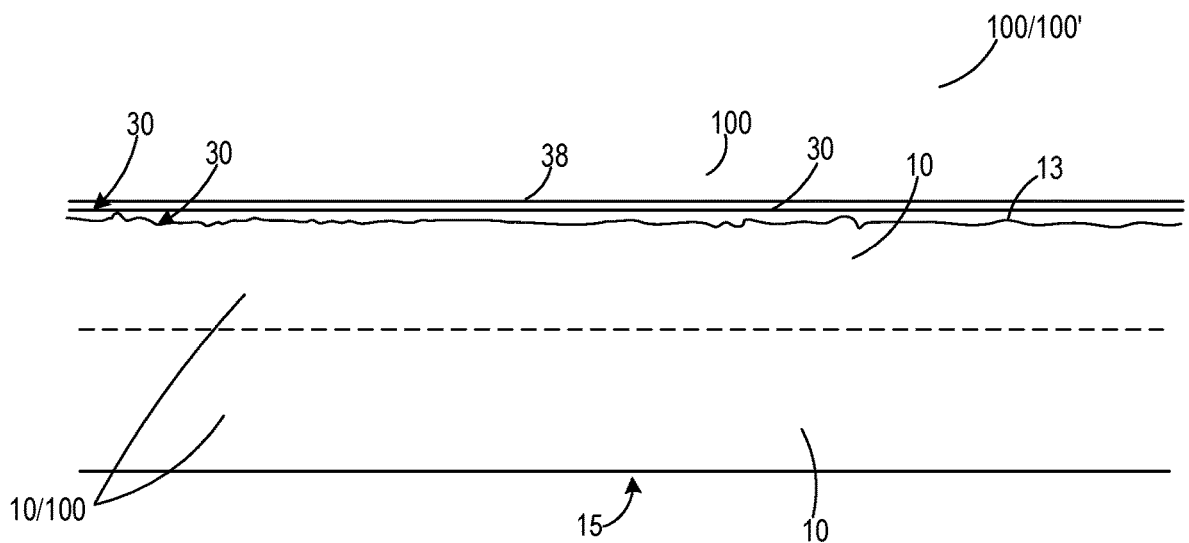
FIG. 11 depicts a side view of another paper product forming process step suitable for forming an exemplary paper product of the present invention.

FIG. 11 depicts details of an exemplary linerboard 100 suitable for use in forming an insulated paper product 100/100'/100" of the present invention or a component (e.g., a layer or outer linerboard) of an insulated paper product 100/100'/100" of the present invention. As shown in FIG. 11, exemplary linerboard 100 comprises two sheets of paper 10 laminated to one another. Exemplary linerboard 100 further comprises a first clay coating 30 directly on an outer surface 13 of one of the paper layers 10, and an outermost second white clay coating 30 so as to provide a printable surface/layer 38 for exemplary linerboard 100. First clay coating 30 evens out the valleys and troughs of the rough paper 10, leaving a smooth surface for high-quality printing.

Figure 12:
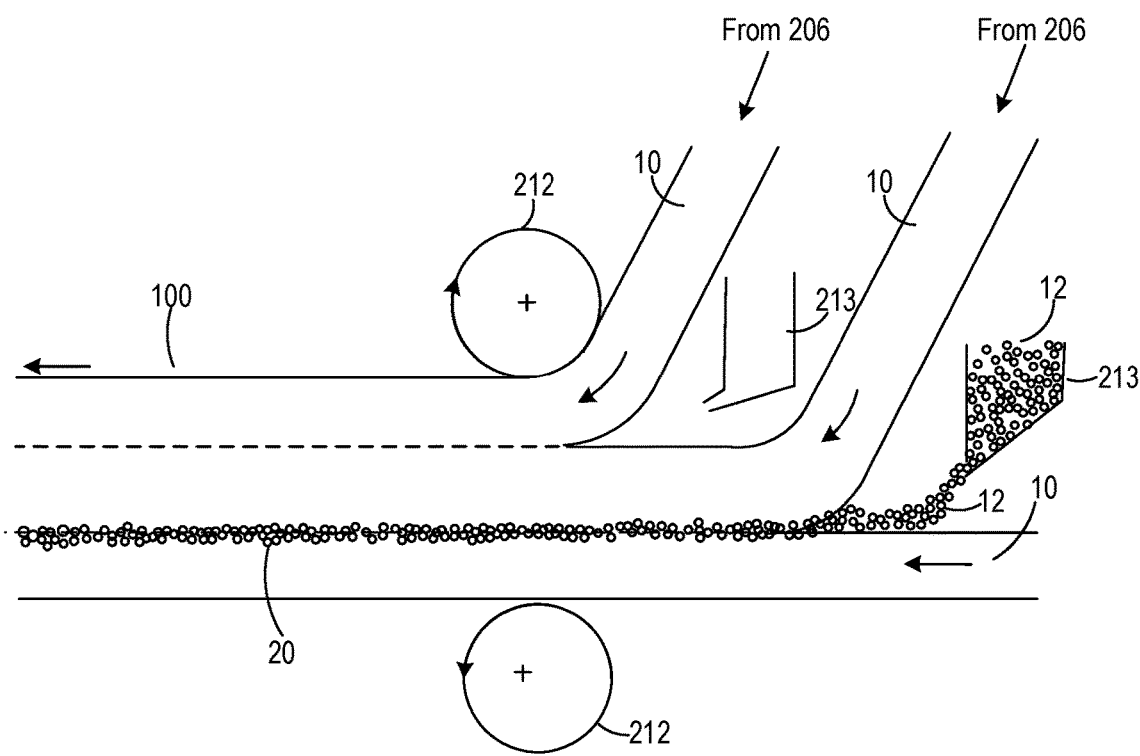
FIG. 12 depicts a side view of another paper product forming process step suitable for forming an exemplary paper product of the present invention comprising a layer of insulating material.

FIG. 12 depicts details of another exemplary linerboard 100 suitable for use in forming an insulated paper product 100/100' of the present invention or a component (e.g., a layer or outer linerboard) of an insulated paper product 100/100' of the present invention. As shown in FIG. 12, a thermally insulating additive layer 20 comprising insulating material 12 may be incorporated into an exemplary linerboard 100 via an additive applicator 213. In this case, layer 20 of insulating material 12 is positioned between two layers of paper 10 within exemplary linerboard 100 comprising three layers of paper 10. As shown in FIG. 12, a second additive applicator 213 could be used to provide another layer of additives (e.g., insulating material 12 or some other material) between the other two layers of paper 10 within exemplary linerboard 100 comprising three layers of paper 10.

Figure 13A:
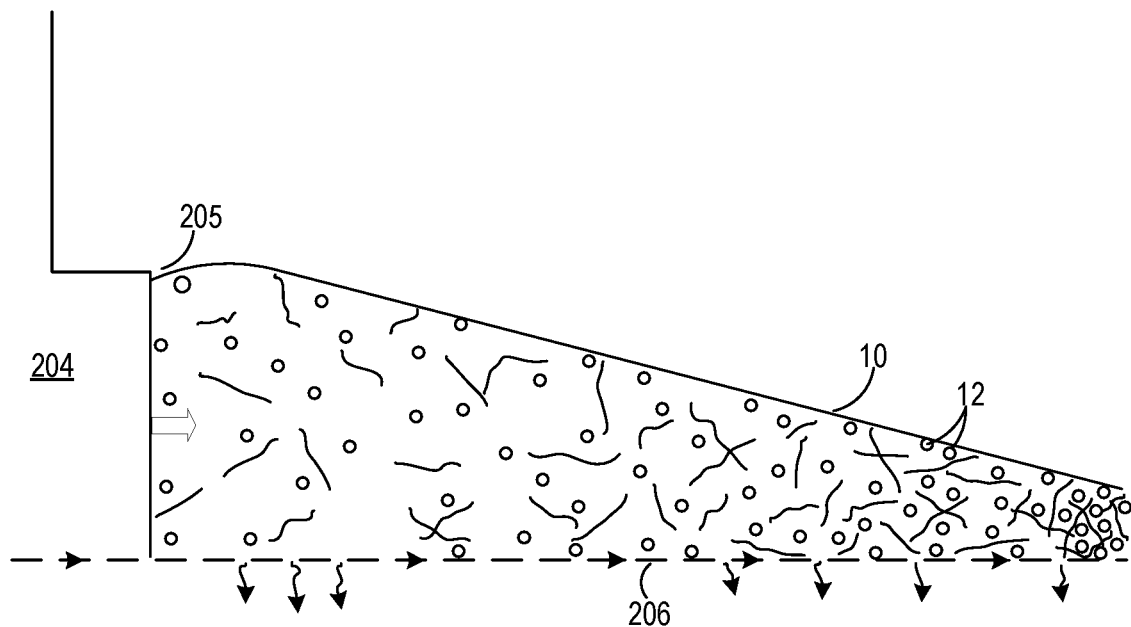
FIGS. 13A-13G depict side views of seven paper layer forming processes, each of which is suitable for forming a paper within any of the exemplary paper products of the present invention.

FIGS. 13A-13G depict various ways of incorporating insulating material 12 within or on a given paper layer 10 or an insulated paper product 100/100'. As shown in FIG. 13A, thermally insulating material 12 is added to the pulp, wherein the thermally insulating material 12 has a density that that is close to that of water. In this case, as the furnish drains, the insulating materials 12 are incorporated evenly, substantially uniformly throughout the paper 10 thickness.

Figure 13B:
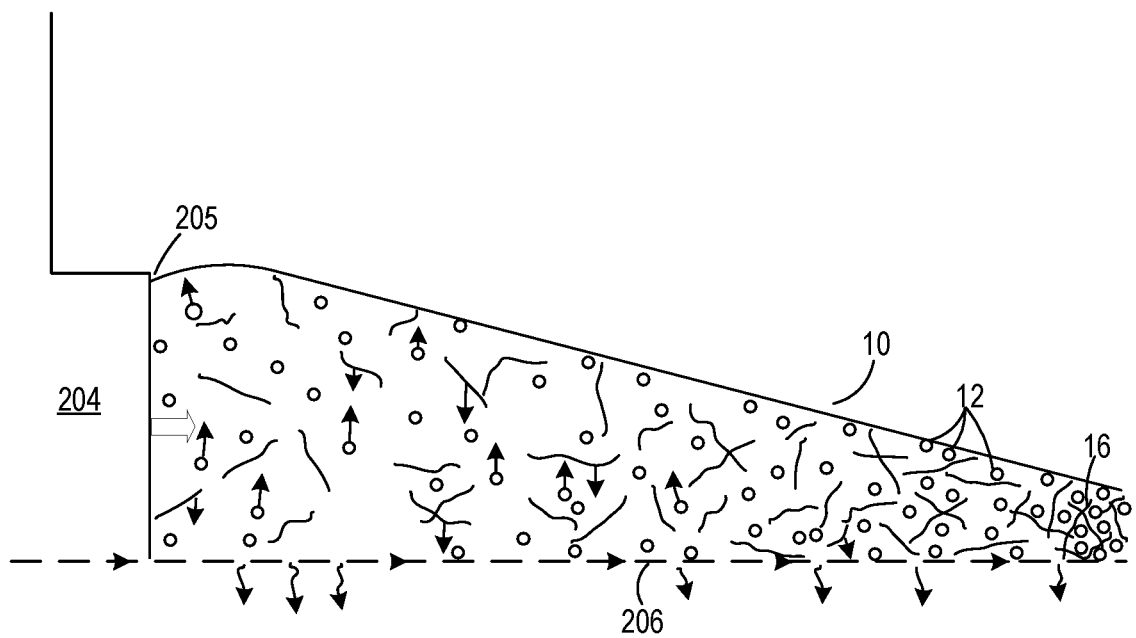

In FIG. 13B, a non-uniform distribution of insulating material 12 results from the use of insulating material 12 having a density lower (or much lower) than that of water. In this case, gravitational forces cause water to drain downward, but insulating material 12 tends to move upward as the furnish proceeds along moving wire 206. This leads to a higher concentration of insulating particles 12 on an upper side/surface of the paper 10. In some embodiments of the present invention, it has been surprisingly discovered that the insulating properties of a paper layer 10 are enhanced when the insulating additives 12 are concentrated on one face of the paper 10 versus distributed substantially uniformly throughout the thickness.

Figure 13C:
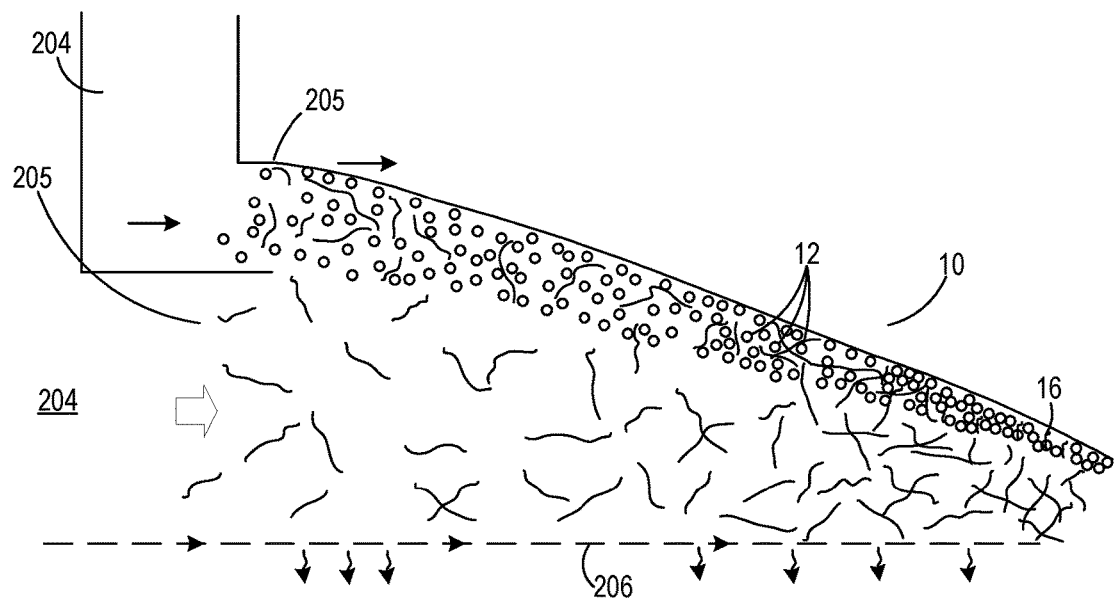

In FIG. 13C, another procedure is shown so as to result in a non-uniform distribution of insulating particles 12 within an insulated paper product 100/100'. As shown in FIG. 13C, a second head box 204 may be used to deposit a layer of insulating mater 12 and optional fibers on top of a lower layer of fibers (e.g., furnish) as the combined furnish proceeds along moving wire 206.

Figure 13D:
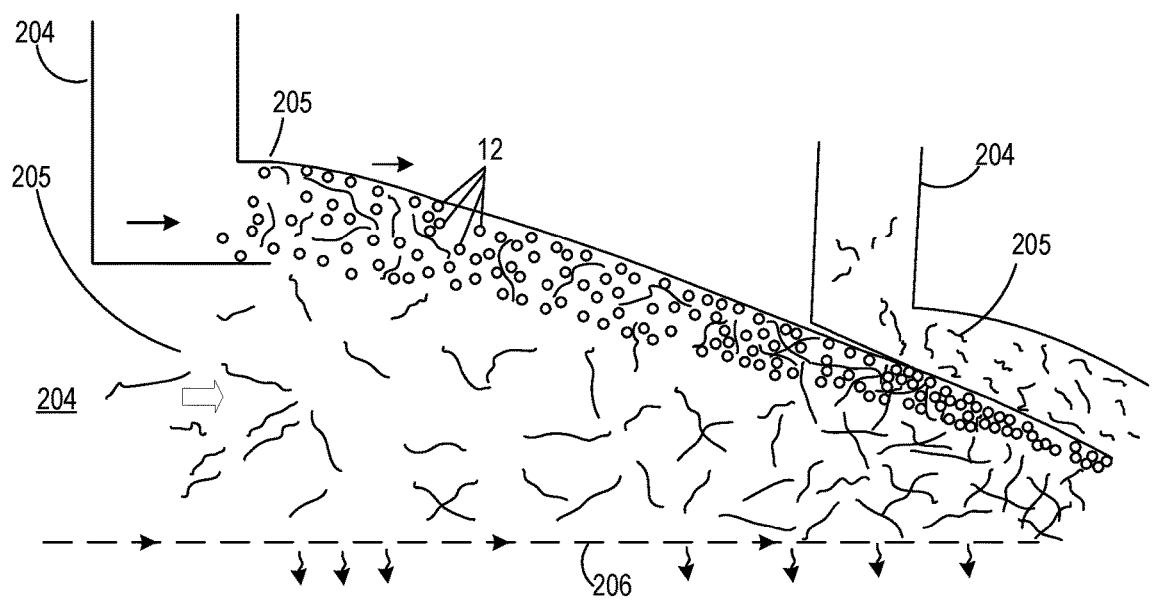

In FIG. 13D, another procedure is shown so as to result in a non-uniform distribution of insulating particles 12 within an insulated paper product 100/100'. As shown in FIG. 13D, a third head box 204 may be used to deposit a layer of insulating mater 12 and optional fibers on top of a lower layer of fibers (e.g., furnish) as the combined furnish proceeds along moving wire 206.

Figure 13E:
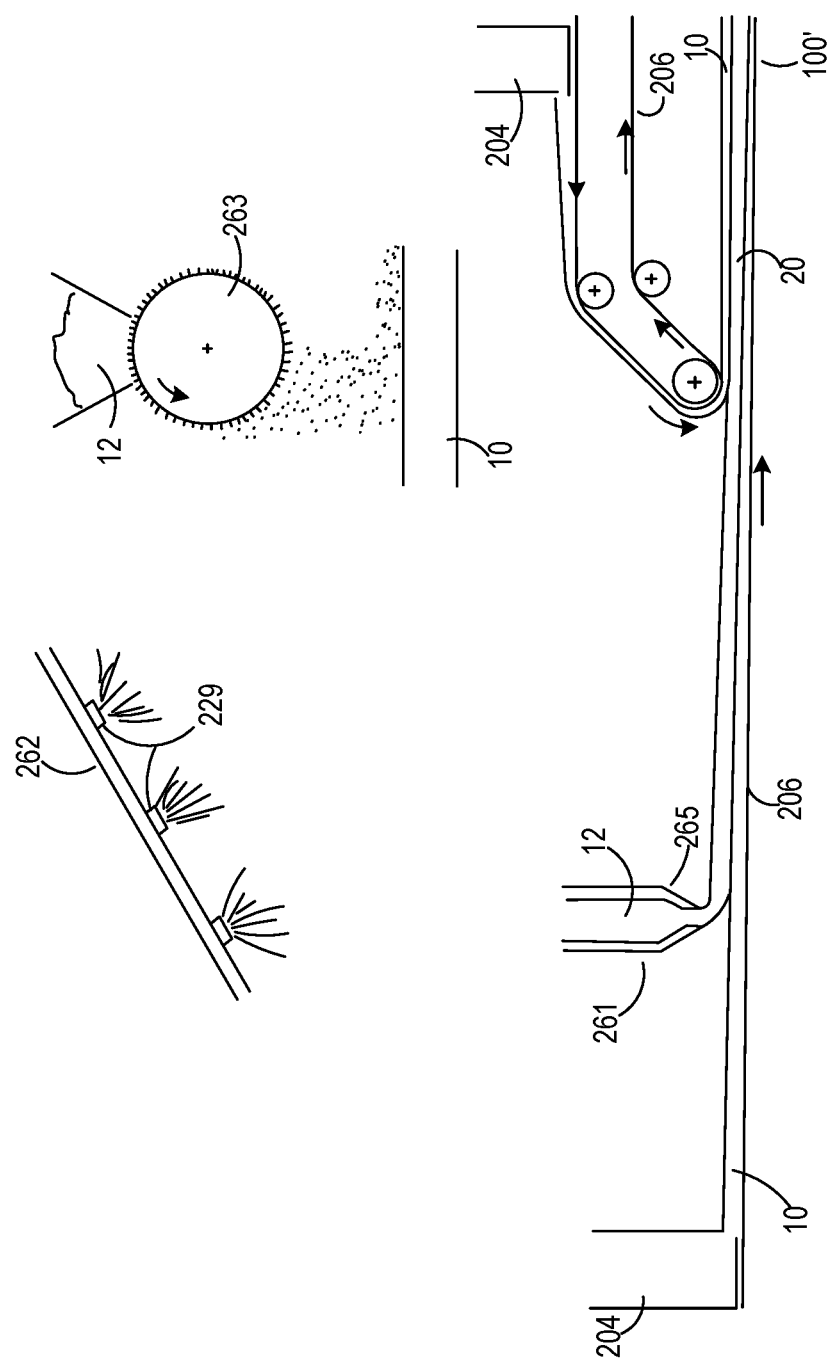

In FIG. 13E, another procedure is shown so as to result in a non-uniform distribution of insulating particles 12 thin an insulated paper product 100'. As shown in FIG. 13E, a first and a second head box 204 may be used to form two plies of fiber. A middle layer containing insulating material 12 is deposited as a liquid via a slot-die coater 261, or via a spray boom 262, or as a solid via a shilling roller 263. In 13E, the top layer of pulp is first cast onto a separate wire 206, and then transferred onto the middle layer of the non-uniform composite 100'. The slot-die coaters 261 are well known, being similar to curtain coaters. Slot-die coaters 261 may include an agitation means (not shown) within the head 265 to ensure that feed is consistent and settling is avoided. More advanced slot-die coaters 261 include such inventions as the Hydra-Sizer technology supplied by GL&V Pulp & Paper Group, Lawrenceville Ga.

Figure 13F:
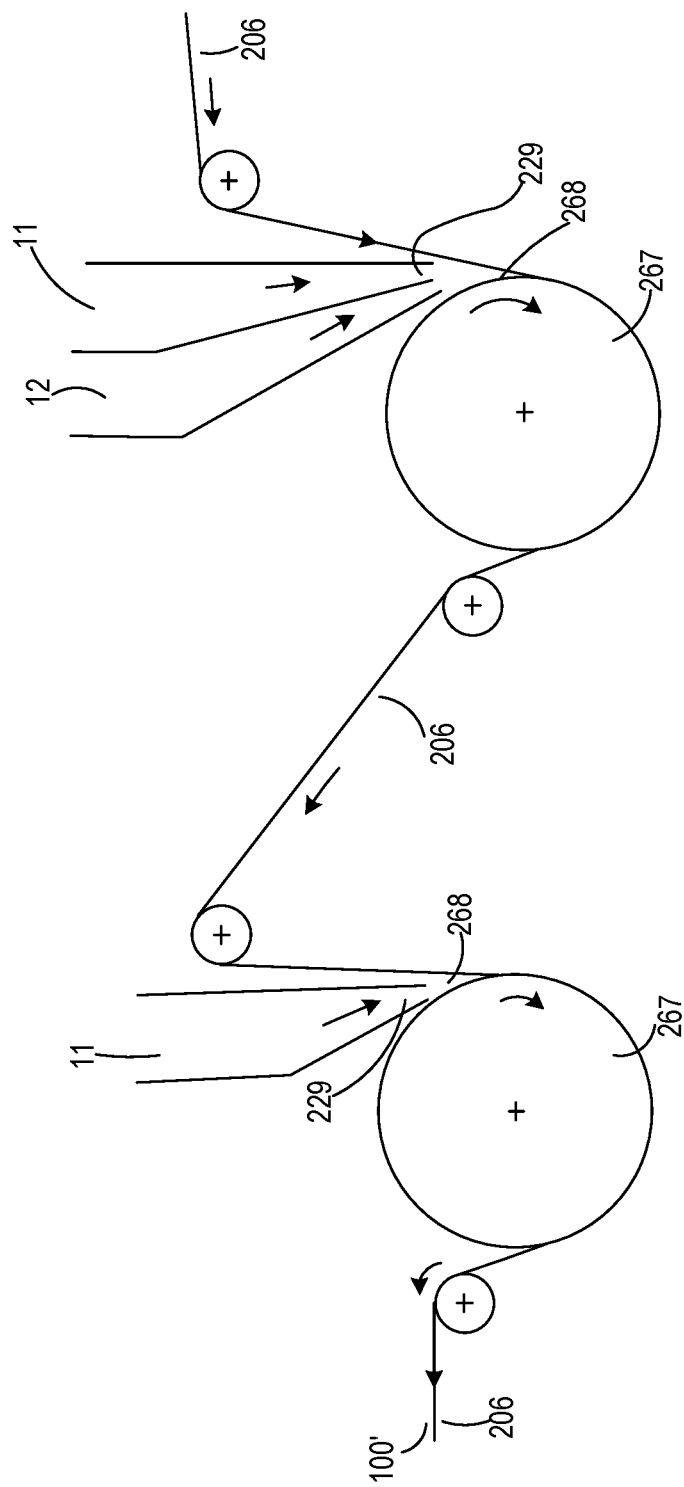

In FIG. 13F, another procedure is shown so as to result a non-uniform distribution of insulating particles 12 within an insulated paper product 100'. As shown in FIG. 13F, a nozzle 229 is used to feed pulp 11 into the gap 268 between a vacuum roll 267 and a forming felt 206. A middle layer containing insulating material 12 is deposited as a slurry in layer 20. In 13F, the top layer of pulp 11 is applied by a second head box nozzle 229. Such nozzle pulp applicators 229 are described in U.S. Pat. No. 5,645,689 entitled "Multilayer Headbox" to Voith Sulzer Papiermaschinen GmbH. Furthermore, Inventia disclose 'Aq-Vane' technology for preventing mixing of layers as they are delivered by a multi-layered head. Aq-Vane incorporates an interstitial layer of water between layers of pulp as they are laid down. "*Multi-layer technology in papermaking*" by Daniel Soderberg, of Innventia, and the KTH Royal Institute of Technology, Stockholm: Presentation at the Marcis Wallenberg Prize Symposium, Stockholm, Sweden, Oct. 2, 2012.

Figure 13G:
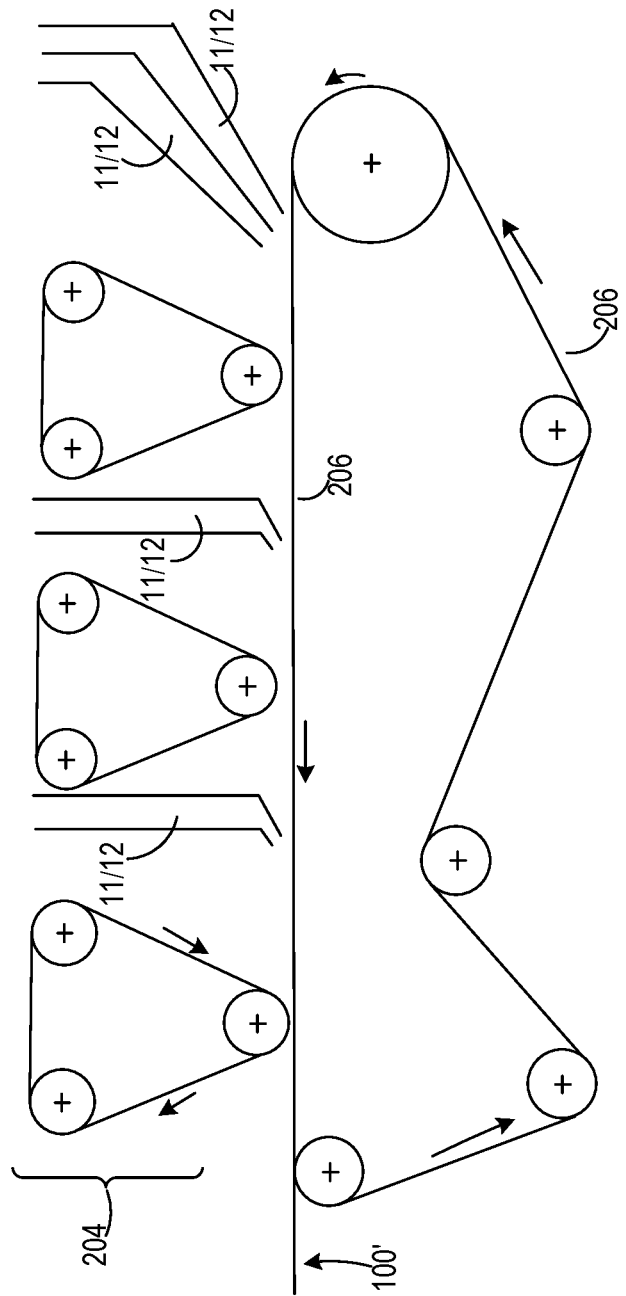

FIG. 13G depicts another method of making an insulated paper product 100' with non-uniform cross section containing an uneven distribution of insulating material 12. A multi-layer headbox 204 is used to put down the first two layers (e.g., each of which independently comprises pulp 11 and/or insulating material 12) on a forming wire 206, which are then pressed with felt. Consecutive layers (e.g., layers 3 and 4, each of which independently comprises pulp 11 and/or insulating material 12) are added followed by felt presses after each additional layer.

Figure 14:
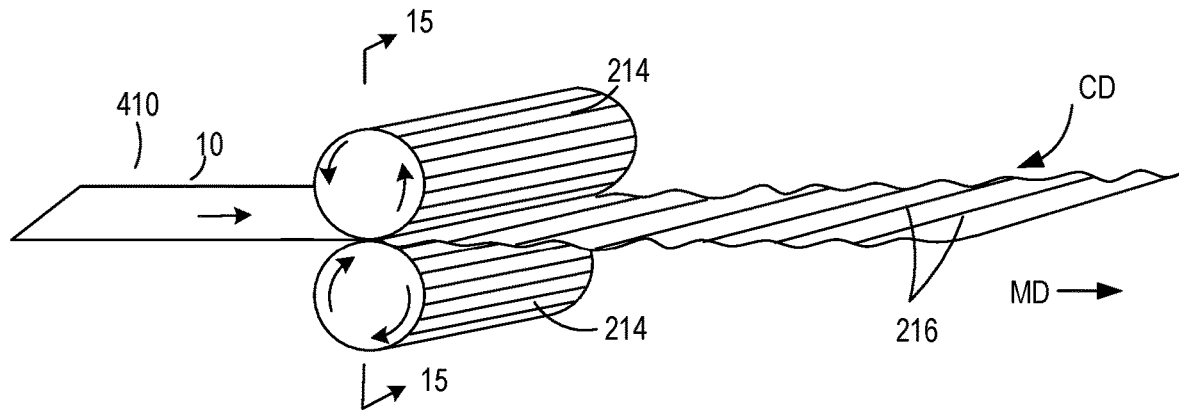
FIG. 14 depicts a perspective view of a paper layer forming process step suitable for forming cross-directional flutes within an exemplary paper product of the present invention.
Figure 15:
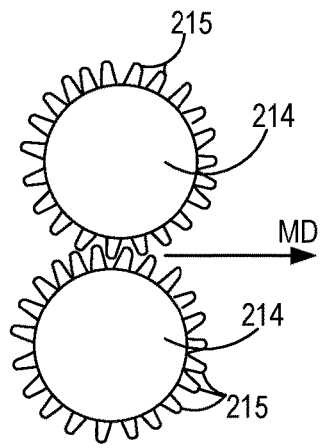
FIG. 15 depicts an exemplary cross-sectional view of the exemplary flute-forming rollers used in the process step shown in FIG. 14 as viewed along line 15-15 shown in FIG. 14.

Methods of making insulated paper products 100/100'/100" of the present invention may further comprise forming one or more corrugated or fluted layers of material 10/100/100'/100" as shown in FIGS. 14-18B. Each of the corrugated or fluted layers of material may contain or be free from insulating material 12. As shown in FIG. 14, a paper layer 10 (or laminate 100) may proceed between cross-direction flute-forming rollers 214 having cross-direction (CD) undulations 215 thereon so as to form cross-directional (CD) flutes 216 within the exemplary paper product 10. FIG. 15 depicts a cross-sectional view of the exemplary cross-direction (CD) flute-forming rollers 214 used in the process step shown in FIG. 14 as viewed along line 15-15 shown in FIG. 14.

Figure 16:
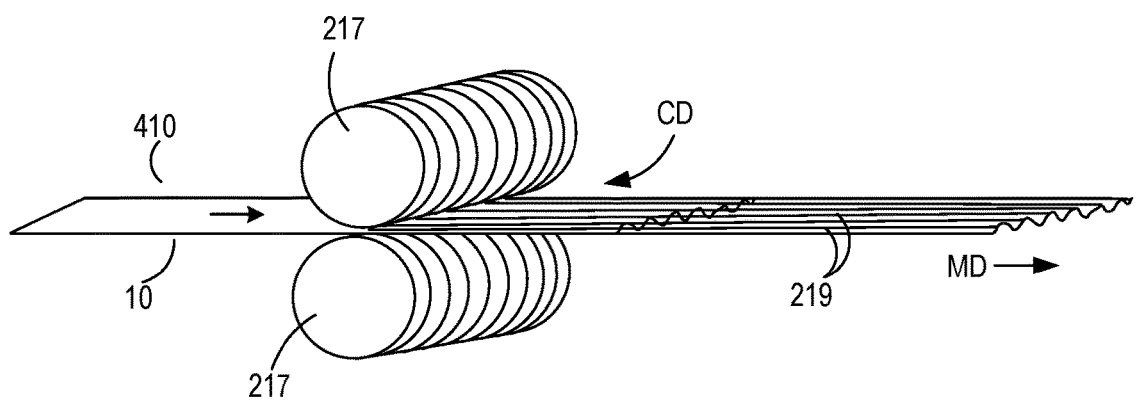
FIG. 16 depicts a perspective view of a paper layer forming process step suitable for forming machine-directional flutes within an exemplary paper product of the present invention.
Figure 20:
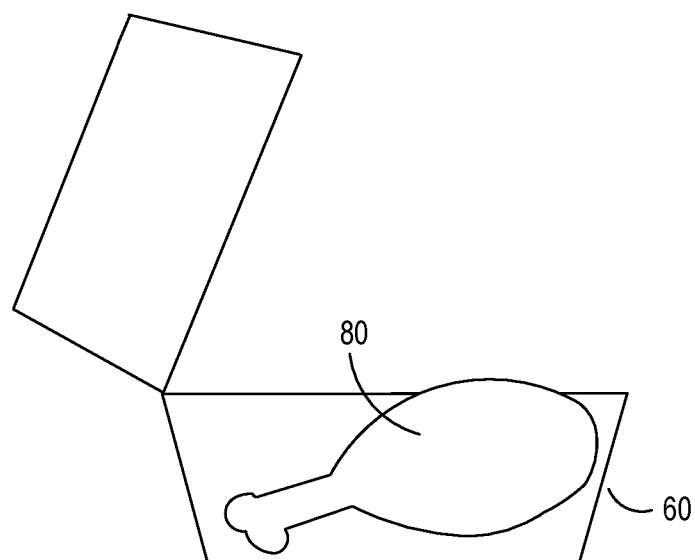
Figure 21:
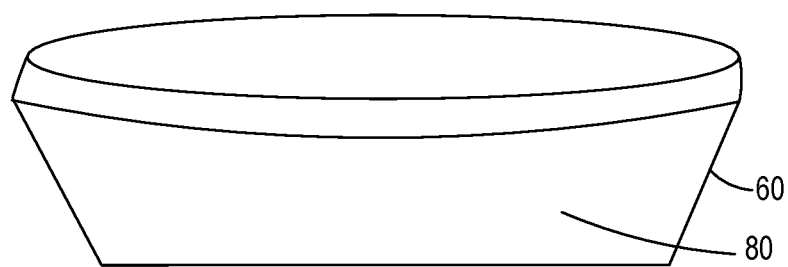
Figure 22:
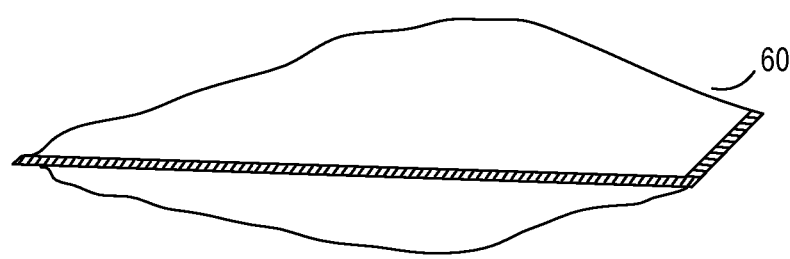

In other embodiments shown in FIGS. 16-17, a paper layer 10 (or laminate 100) may proceed between machine-direction (MD) flute-forming rollers 217 having machine-direction (MD) undulations 218 thereon so as to form machine-directional (MD) flutes 219 within the exemplary paper product 10. FIG. 17 depicts a close-up view of the exemplary machine-direction (MD) flute-forming rollers 217 used in the process step shown in FIG. 16 as viewed in the machine direction (MD).

The method steps shown in FIGS. 14-17 may be used to form corrugated paper products 100" of the present invention such as those shown in FIGS. 18A-18B. As shown in FIG. 18A, exemplary corrugated paper products 100" comprises two fluted layers 10 with both fluted layers having either (i) cross-directional flutes 216 or (ii) machine-directional flutes 219 within each layer 10 of the exemplary corrugated paper products 100". As shown in FIG. 18B, exemplary corrugated paper products 100" comprises two fluted layers 10 with one fluted layers having cross-directional flutes 216 and the other fluted layer 10 having machine-directional flutes 219 within the exemplary corrugated paper products 100".

Typically, in double-walled corrugated card (FIG. 18A), the flutes run in the same direction, namely, the cross-direction. The medium board 10 is fluted by first steaming (i.e., at location 410), then running through heated cross-direction flute-forming rollers 214 that impart cross-directional flutes 216 within the medium board 10. Crossing the flutes in the final double wall may help reduce thermal transfer via convection mechanisms. It will also impart additional strength to the medium hoard 10 due to the cross-directional flutes 216.

The methods of using the insulated paper products 10/100/100'/100" of the present invention may comprise insulating food, medicines, etc. from hot or cold environments. In some embodiments, the method may simply comprise placing an item (e.g., food, medicines, etc.) within an insulated paper product 10/100/400'/100" of the present invention (e.g., putting hot coffee in a cup of the present invention). In other embodiments, the method may comprise placing an item (e.g., food, medicines, etc. within an insulated paper product 10/100/100'/100" of the present invention (e.g., a box), and sealing the insulated paper product 10/100/100'/100" for transport.

As discussed herein, methods of using the insulated paper products 10/100/100'/100" of the present invention may involve insulating an item (e.g., food, medicines, etc.) from hot or cold environments, wherein the item (e.g., food, medicines, etc.) is placed or packaged within an insulated paper product 10/100/100'/100" that has a conventional shape, such as a cup or box. In other words, the insulated paper products 10/100/100'/100" of the present invention take the place or conventional items such as cups and boxes so as to provide one or more advantages as discussed above. As discussed herein, the insulated paper products 10/100/100'/100" of the present invention may have a variety of shapes and configurations similar to many conventional items such as cups and boxes.

During use, the insulated paper products 10/100/100'/100"/60 of the present invention desirably provide/have one or more of the following features/properties in addition to providing insulating properties:

(1) Moisture Resistance: Desirably, the insulated paper products 10/100/100'/100"/60 of the present invention (e.g., a box 61) can be placed into a freezer and then taken out and stacked at room temperature. Such a process usually leads to the insulated paper product 10/100/100'/100"/60 (e.g., a box 61) "sweating" through condensation in the warm air condensing on the surface of the insulated paper product 10/100/100'/100"/60 (e.g., a box 61). In this regard, it is advantageous for the insulated paper product 10/100/100'/100"/60 (e.g., a box 61) to be resistant to moisture ingress. Multiple different additives can be used to reduce the propensity of the insulated paper product 10/100/100'/100"/60 (e.g., a box 61) to absorb moisture and weaken when moist. For example, perlite 12 is more hydrophobic than paper fibers 11, so the incorporation of perlite 12 into a paper layer 10 renders the paper layer 10 less absorbent. Further, the adhesive 40 that bonds flutes to liner board (see, FIGS. 6A-6D) can be made moisture resistant by adding a moisture resistant adhesive resin, such as Coragum SR available from Ingredion, Westchester Ill. In addition, a hydrophobic treatment can be applied to the exterior of the insulated paper product 10/100/100'/100"/60 (e.g., a box 61). Moreover, a chemical cross-linking agent or reactive resin (e.g. a methylol melanine) may be applied to the insulated paper product 10/100/100'/100"/60 (e.g., a box 61), so that it is less sensitive to moisture. Lastly, paper fiber 11 may be treated with rosin, and then aluminum sulfate can be added to the furnish to impart hydrophobicity to the paper layer 10. Alternatively, a wax may be added to impart hydrophobicity.

While undesirable from an environmental and recycling perspective, a thin layer of low density polyethylene (PE) may also be coated onto paper layer 10, fiberboard 21/22/23, and card stock to impart oil and water resistance, as is common practice in the fast food and hot & cold beverage retail industry. In recent years, the paper industry has experienced increased pressure to seek alternatives to PE liners and linings for packaging, leading the chemical industry to innovate new coatings that impart grease and water resistance while being repulpable. US 2019/0077537 to Georgia Pacific Bleached Board LLC teaches the use of several different coatings to impart resistance to water and lipid fluids to paper without the use of PE film, including Epotal 5440 (BASF), Rhoplex P-376 (Dow), Diofan B204 (Solvay), Barrier-Grip 9471A (IGI), and Daran SL143 (Owensboro). These coatings were combined to impart heat seal-ability as well as water proofing to paper beverage cups.

(2) Temperature History and Monitoring: In some embodiments, the consumer may wish to be reassured that the insulated paper product 10/100/100'/100"/60 (e.g., a box 61) contents have not been exposed to high temperatures. To this end, a temperature sensor may be included, such as: (a) a biodegradable and biocompatible temperature sensor may be included in the insulated paper product 10/100/100'/100"/60 (e.g., a box 61), for instance, the biodegradable microsensor for food monitoring as disclosed in *NASA Tech Briefs* Vol 42 No. 7, July 2018. The biosensor slowly dissolves in 1% saline solution; (b) a thermochromic material may be included in the insulated paper product 10/100/100'/100"/60 (e.g., a box 61), such that once the temperature rises above a certain temperature, the color changes, and the consumer is warned. The thermochromic material can be reversible or irreversible. The ink could also be reversible, however, with a large hysteresis loop, so that the color change is metastable. Such inks are used in Pilot® Frixion® ball pen inks, which change from black to colorless upon warming; (c) the formation of condensation and the production of moisture when frozen materials are thawed can be taken advantage of, if a highly visible food dye is included within the structure of the insulated paper product 10/100/100'/100"/60 (e.g., a box 61). When moisture hits the insulated paper product 10/100/100'/100"/60 (e.g., a box 61), the dye dissolves and stains the insulated paper product 10/100/100'/100"/60 (e.g., a box 61) as a warning.

(3) Food Spoilage Sensors: In some embodiments, the insulated paper products 10/100/100'/100"/60 (e.g., a box 61) may further comprise: (a) a biodegradable microsensor for food monitoring as disclosed in *NASA Tech Briefs* Vol 42 No. 7, July 2018 can be configured to detect spoiling gasses, such as methane, hydrogen sulfide, methyl mercaptan, furfuryl mercaptan, indole, cadaverine, isovaleric acid, skatol, and other malodorous materials; and (b) certain colorants react with sulfides and amines, such as Michler's Hydrol Blue, which changes from blue to colorless when exposed to low levels of hydrogen sulfide and amines. Furthermore, Sensor Technology published within NASA Tech Briefs September 2018 describes a printable nanostructured conductive polymer wireless sensor that detects food spoilage by identifying odors emanating from bad meat, first described in American Chemical Society publication Nano Letters.

(4) Freezer to Microwave: For smaller packages, an added feature may be that the insulated paper product 10/100/100'/100"/60 (e.g., a box 61) can be removed from a freezer and placed directly inside a microwave oven. In these embodiments, the insulated paper product 10/100/100'/100"/60 (e.g., a box 61) would need to be microwave transparent. Optionally, the insulated paper product 10/100/100'/100"/60 (e.g., a box 61) may contain a microwave susceptor.

(5) Boxes with Reduced Edge Effects: 90° bends in cardboard pinches the cardboard at those points, leading to potential heat loss at the folded edges. Boxes 61 of the present invention (e.g., formed from insulated paper product 10/1001100'/100") can be designed that replace 90° corners with two 45° corners, to help minimize the losses.

(6) Transient Aluminized layer for Low Emissivity: Addition of a thin aluminized coating 30 onto the paper (e.g., paper layer 10 and/or insulated paper product 100/100' and/or corrugated paper product 100" and/or storage container 60) and/or onto the perlite 12 to lower emissivity. Aluminum has a very low emissivity and may be applied to various materials through a process called sputtering, or by vapor deposition. In this process, aluminum atoms traverse a vacuum and condense onto the surface of another material (e.g., paper layer 10). Many thermal blankets are made via a process like this. Perlite particles 12, as well as other types of particles, may be coated partially or totally in aluminum via these types of process. Paper or paper fibers 11 may also be metallized by an aluminum coating by similar processes. Aluminum foil and metalized plastic films do not re-pulp and have to be removed from the OCC and later waste streams, so these materials are not preferred in some embodiments of the present invention.

However, it is possible to incorporate a chelating agent in another layer of the packaging (e.g., box 61), or for instance in the adhesive, or in one of the coatings. Such a chelating agent would function to remove the aluminum during a pulping process. Chelating agents may include oxalic acid and oxalate salts. EDTA (ethylene diamine tetraacetic acid) and its various salts, salicylate, sodium hexametaphosphate and other materials. In this way, the aluminum could be removed. Soluble aluminum salts are already used in papermaking for instance as a flocculant for fines, as well as in combination with rosin soap to impart water resistance.

(7) Odor Control and Taint of Foodstuffs: A concern with packaging and shipping of foodstuffs is taint and odor. This may arise from the inherent smell of virgin or recycled card, or it could arise when one package containing a strongly odorous material is placed in contact or adjacent to a package containing a food, beverage, drug, or tobacco product. There may be several ways to mitigate odor and taint of foodstuffs by incorporating materials into the paper structure. For instance, transition metal ion modified silica nanoparticles such as those described in U.S. Pat. No. 7,976,855 are able to efficiently capture malodorous chemicals such as mercaptans, carboxylic acids, amine and other odors. U.S. Pat. No. 8,168,563 teaches that silica nanoparticles may be modified by reaction with terminal aminoalkylthrimethoxysilanes and then with copper II ions to further enhance the odor capturing capabilities. Molecular sieves may also be included to sequester low molecular weight odor forming molecules such as hydrogen sulfide and zeolites to sequester ammonia and amine odors. Activated carbon was also found to impart thermal insulation, and would also be anticipated to absorb multiple odors. Activated carbon tends to be acidic in nature, and so may be especially good at taking up basic and weakly basic odors such as ammonia and amine odors. More complex odors also have an affinity for activated carbon, including mercaptan, thiol, and aromatic odors. Cyclodextrins, such as β-cyclodextrin or γ-cyclodextrin and their derivatives may also be incorporated for their odor absorbing properties. One or more of these materials/features could be incorporated into any of the here-in described paper layer 10 and/or insulated paper product 100/100' and/or corrugated paper product 100" and/or storage container 60 to modify and/or minimize any odors present.

Odor transmission from one package to another, or from one good to another may also be mitigated through the use of barrier materials. As one object of the present invention is repulpability of packaging, aluminum foil, PE or PET film, and other synthetic materials would not be consistent with some embodiments of the present invention. However, some materials that provide thermal insulation have a microscopic flake morphology, such as mica and coated mica, and these materials may be useful for effectively blocking the transport of low and high MW malodor causing materials from ingress into packages (e.g., comprising or formed from insulated paper product 10/100/100'/100") of the present invention.

(8) Fiber Blend, Recycling, and Strength: Short length fibers tend to come from refined hardwood, while longer fibers conic from softwood. A good ratio of 75% softwood 25% hardwood balances the properties of the two types of fiber, optimizing tensile strength. Recently, hemp fibers have come under increasing attention as a paper additive. Hemp fibers are far longer than other pulp fibers, help increase strength due to increasing contact points and bonding, and so may be subjected to multiple recycling steps far more than regular wood fibers. Hemp fibers, being much longer than softwood may be recycled around 40 times vs. 6 for other types of fiber. One or more of these materials/features could be incorporated into any of the here-in described insulated paper layer 10 and/or insulated paper product 100/100' and/or corrugated paper product 100" and/or storage container 60.

In order to increase the ability of wood fibers to bond more through surface interactions, additional processes may be used to further fibrillate the fibers. For instance, the fibers may be subjected to an extreme high-shear environment, such as a colloid mill. The high sheer environment of two plate spinning in contact fibrillates cellulose fiber aggregates, increasing bonding, as well as the propensity to retain filler solids. Other ways to fibrillate the fiber can include prolonged beating in a mechanical Hollander pulp beater such as disclosed in the U.S. Pat. No. 1,883,051 or by high-sheer mixing, high-speed mixing, or media milling. Fibrillated cellulose may increase porosity of the paper and paper strength due to enhanced bonding area between fibers. Other ways to increase strength is by including nanocellulose into the paper formulation. One or more of these materials/features could be incorporated into any of the here-in described paper layer 10 and/or insulated paper product 100/100' and/or corrugated paper product 100" and/or storage container 60.

(9) Water Resistance Repulpability: Rosin is often used as part of a two-part system to impart moisture resistance in paper (e.g., paper layer 10 and/or insulated paper product 100/100' and/or corrugated paper product 100" and/or storage container 60). The second part is post addition of aluminum salt solutions—e.g. aluminum chloride or aluminum sulfate. The aluminum reacts with the rosin soap to make a hydrophobic coating, which may impact repulpability yield. However, including a chelating agent somewhere in another component of the paper product may remove the aluminum from the rosin, thereby increasing the repulpability yield. Other areas of the paper that could carry the chelating agent may include the starch adhesive, and internal layer for instance, the fluted medium, or an inner layer of the composite. Vapor-Guard R5341B or Barrier Grip 9471A (The International Group Inc., Titusville Pa.) are also useful as barrier coatings that provide the paper with a degree of grease and water resistance, and are described along with other suitable materials in Georgia Pacific Patent Application Publication No. US2019/0077537.

The present invention is further described by the following additional embodiments, examples, and claims. It should be understood that any feature and/or component described herein may be present alone or in combination with any other feature and/or component or combination of features and/or components described herein to form the here-in described paper layer 10 and/or insulated paper product 100/100' and/or corrugated paper product 100" and/or storage container 60 of the present invention. It should be further understood that the numbered embodiments provided below describe many embodiments of the present invention, some claimed and some unclaimed. Even though some of the features in the numbered embodiments provided below may not be claimed, the unclaimed feature(s) in the numbered embodiments provided below do form part of the present invention, and may optionally be incorporated into any claimed product.

Additional Embodiments

Insulated Paper Products
1. An insulated paper product 100 comprising: one or more paper layers 10 and insulating material 12, wherein (1) when two or more paper layers 10 are present, the two or more paper layers 10 form an integral paper product 100', and (2)(a) at least one of (i) one layer 20 in combination with said one or more paper layers 10 comprises said insulating material 12 and (ii) one paper layer 10 within said one or more paper layers 10 has a non-uniform distribution of insulating material 12 therein, or (2)(b) the integral paper product 100' itself has a non-uniform distribution of insulating material 12 therethrough. Each paper layer 10 may further comprise one or more additives, other than insulating material 12, the one or more additives including, but are not limited to, flocculants and retention aids such as high molecular weight poly(acrylamide), polyethylene imine), cationic guar gum, and other cationic polymers; additives to provide water resistance (e.g., wax, synthetic latexes and resins): or any combination thereof.
2. The insulated paper product 100 of embodiment 1, wherein the one or more paper layers 10 comprises a single paper layer 10, and the single paper layer 10 has a non-uniform distribution of insulating material 12 therein.
3. The insulated paper product 100 of embodiment 2, wherein at least one outer surface 13/15 of the single paper layer 10 comprises a layer of insulating material 12. See, FIGS. 2A-2B.
4. The insulated paper product 100 of embodiment 2 or 3, wherein the non-uniform distribution of insulating material 12 comprises a layer 16 of insulating material 12 within the single paper layer 10 positioned away from opposite outer surfaces 13/15 of the single paper layer 10. See, FIG. 2C.
5. The insulated paper product 100 of any one of embodiments 2 to 4, wherein the non-uniform. distribution of insulating material 12 comprises a layer 16 of insulating material 12 within the single paper layer 10 positioned away from opposite outer surfaces 13/15 of the single paper layer 10 and centrally located within the single paper layer 10. See, FIG. 2C.
6. The insulated paper product 100 of any one of embodiments 1 to 5, wherein said insulated paper product 100 comprises at least one layer 20 in combination with said one or more paper layers 10 with said at least one layer 20 comprising said insulating material 12. See, for example, FIGS. 68 and 6D, and FIG. 12
7. The insulated paper product 100 of embodiment 1, wherein the one or more paper layers 10 comprises two or more paper layers 10, and the integral paper product 100' itself has a non-uniform distribution of insulating material 12 therethrough. See, for example, FIGS. 4A-4F and 6B-6D.
8. The insulated paper product 100' of embodiment 7, wherein one or more paper layers 10 within said integral paper product 100' comprises insulating material 12.
9. The insulated paper product 100' of embodiment 7 or 8, wherein the non-uniform distribution of insulating material 12 within said integral paper product 100' comprises (i) at least one paper layer
10. with insulating material 12 therein and (ii) at least one paper layer 10 substantially free of the insulating material 12. See, for example, FIGS. 4A and 6B-6D.
10. The insulated paper product 100' of embodiment 9, wherein the at least one paper layer 10 with insulating material 12 therein has a substantially uniform distribution of the insulating material 12 within the at least one paper layer 10 with insulating material 12 therein. See again, for example, FIGS. 4A and 6B-6D.
11. The insulated paper product 100' of embodiment 7 or 8, wherein all paper layers 10 within said integral paper product 100' comprise insulating material 12. See, for example, FIGS. 48-4E.
12. The insulated paper product 100' of any one of embodiments 7 to 11, wherein the non-uniform distribution of insulating material 12 comprises a layer 20 of insulating material 12 between the two or more paper layers 10. See, FIG. 12.
13. The insulated paper product 100' of any one of embodiments 7 to 12, wherein the integral paper product 100' comprises x paper layers 10 and (x–1) layers 20 of insulating material 12 between the x paper layers 10.

14. The insulated paper product 100' of any one of embodiments 7 to 13, wherein the non-uniform distribution of insulating material 12 comprises a layer 20 of insulating material 12 along an outer surface 13/15 of the integral paper product 100'.

15. The insulated paper product 100' of any one of embodiments 7 to 14, wherein the non-uniform distribution of insulating material 12 comprises a layer 20 of insulating material 12 along both outer surfaces 13/15 of the integral paper product 100'.

16. The insulated paper product 100' of any one of embodiments 7 to 15, wherein the integral paper product 100' comprises from two to 24 paper layers 10.

17. The insulated paper product 100' of any one of embodiments 7 to 16, wherein (i) any one of the two or more paper layers 10 or (ii) any combination of paper layers 10 within the two or more paper layers 10 each independently comprises the single paper layer 10 of any one of embodiments 2 to 5.

18. The insulated paper product 100 of any one of embodiments 1 to 17, wherein the insulated paper product 100 comprises a void-containing insulated paper product 100".

19. The insulated paper product 100 of embodiment 18, wherein the void-containing insulated paper product 100" comprises voids 19 within at least one paper layer 10, the voids 19 being encapsulated by a material other than paper (e.g., a paper layer 10 containing hollow beads/particles (not shown)).

20. The insulated paper product 100 of embodiment 18 or 19, wherein the void-containing insulated paper product 100" comprises voids 19 within at least one paper layer 10, the voids 19 being encapsulated by paper (e.g., a paper layer 10 containing air pockets 19 therein, possibly formed via a molding process or a process in which a void-forming material is removed from the paper layer 10). See, FIGS. 5-6D.

21. The insulated paper product 100 of any one of embodiments 18 to 20, wherein the void-containing insulated paper product 100" comprises a corrugated paper product 100".

22. The insulated paper product 100 of any one of embodiments 7 to 21, wherein the integral paper product 100' comprises (i) a first linerboard layer 21 comprising one or more first paper layers 10/100/100', (ii) a second linerboard layer 22 comprising one or more second paper layers 10/100/100', and (iii) (a) a fluted paper layer 23 comprising one or more fluted paper layers 10/100/100' or (b) a honeycomb layer (not shown) positioned between the first linerboard layer 21 and the second linerboard layer 22, and each of (i) said first linerboard layer 21, (ii) said second linerboard layer 22, and (iii) (a) said fluted paper layer 23 or (b) said honeycomb layer (not shown) may independently comprise insulating material 12 therein or thereon.

23. An insulated paper product 100 comprising a corrugated integral paper product 100", said corrugated integral paper product 100" comprising: a first linerboard layer 21 comprising one or more first paper layers 10/100/100', a second linerboard layer 22 comprising one or more second paper layers 10/100/100', and (a) a fluted paper layer 23 comprising one or more fluted paper layers 10/100/100' or (h) a honeycomb layer (not shown) positioned between the first linerboard layer 21 and the second linerboard layer 22, wherein (i) said first linerboard layer 21, (ii) said second linerboard layer 22, and (iii) (a) said fluted paper layer 23 or (b) said honeycomb layer (not shown) may each independently comprise insulating material 12 therein or thereon.

24. The insulated paper product 100 of embodiment 22 or 23, wherein (a) said fluted paper layer 23 or (b) said honeycomb layer (not shown) provides pockets of air 19 between said first linerboard layer 21 and said second linerboard layer 22.

25. The insulated paper product 100 of embodiment 24, wherein said pockets of air 19 represent from about 20 to 80 volume percent of a total volume occupied by (a) said fluted paper layer 23 or (b) said honeycomb layer (not shown)(i.e., a total volume between innermost opposing surfaces 25/27 of said first linerboard layer 21 and said second linerboard layer 22). See, for example. FIG. 6A.

26. The insulated paper product 100 of any one of embodiments 22 to 25, further comprising an adhesive 40 that bonds portions of (a) said fluted paper layer 23 or (h) said honeycomb layer (not shown) to portions of said first linerboard layer 21 and said second linerboard layer 22. Suitable materials for adhesive 40 include, but are not limited to, starch adhesives, synthetic latex adhesives such as poly(vinyl acetate), natural rubber latex, modified starches, hydrocolloids such as hydroxypropylcellulose, carboxymethylcellulose, and other water soluble polymers such as poly(vinyl alcohol). A cross-linking agent may also be added to the adhesive to avoid potential swelling of the adhesive and weakening of the bonds when wet. Flocculants and retention aids may also be included such as high molecular weight poly(acrylamide), poly(ethylene imine), cationic guar gum, and other cationic polymers. As discussed herein, in some embodiments, adhesive 40 is at least partially filled with one or more of the herein disclosed insulating materials 12.

27. The insulated paper product 100 of embodiment 26, wherein said adhesive 40 has insulating material 12 dispersed therein.

28. The insulated paper product 100 of any one of embodiments 22 to 27, wherein each of (i) said first linerboard layer 21, (ii) said second linerboard layer 22, and (iii) (a) said fluted paper layer 23 or (b) said honeycomb layer (not shown) independently comprises the insulated paper product 100 of any one of embodiments 1 to 6 or the integral paper product 100' recited in any one of embodiments 7 to 20.

29. The insulated paper product 100 of any one of embodiments 22 to 27, wherein each of (i) said first linerboard layer 21, (ii) said second linerboard layer 22, and (iii) (a) said fluted paper layer 23 or (b) said honeycomb layer (not shown) is substantially free of insulating material 12.

30. The insulated paper product 100 of any one of embodiments 22 to 29, wherein the integral paper product 100' comprises said fluted paper layer 23.

31. The insulated paper product 100 of any one of embodiments 22 to 29, wherein the integral paper product 100' comprises said honeycomb layer (not shown).

32. The insulated paper product 100 of any one of embodiments 1 to 31, wherein the insulated paper product 100' further comprises one or more non-paper layers 20/30. As used herein, the term "non-paper layer" is used to describe a layer that contains less than 15 wt % paper pulp or cellulosic fiber, and typically contain 0 wt % to less than 5.0 wt % paper pulp or cellulosic fiber. Conversely, as used herein, the term "paper layer" (such as each paper layer 10) is used to describe a layer that contains 15 wt % or more paper pulp or cellulosic fiber, and typically contains greater than 15 wt % up to 100 wt % paper pulp or cellulosic fiber (or any value, between 15 wt % and 100 wt %, in multiples of 0.1 wt %, e.g., 50.0 wt %, or any range of values between 15 wt % and 100 wt %, in multiples of 0.1 wt %, e.g., from 40.1 wt % to 70.2 wt %).

33. The insulated paper product 100 of embodiment 32, wherein the one or more non-paper layers 20/30 comprise a gypsum layer, a clay-containing layer, a polymer coating, a pigment-containing layer, a fabric layer (e.g., a nonwoven, woven or knit fabric layer), a fiber-reinforcement layer (e.g., a layer of unidirectional fibers), a layer of insulating material 12, a metal film layer, a foam layer, or any combination thereof. One or more of the non-paper layers 20/30 may be added to the insulated paper product 100 in order to provide a desire property such as lower (or higher) emissivity, lower (or higher) thermal conductivity, enhanced water-repellency, an aesthetically pleasing color and/or texture, or any combination thereof.

34. The insulated paper product 100 of embodiment 32 or 33, wherein the one or more non-paper layers 20/30 comprise a gypsum layer (not shown).

35. The insulated paper product 100 of any one of embodiments 32 to 34, wherein the one or more non-paper layers 20/30 comprise a clay-containing layer 30, a coating 30 that provides a lower or higher emissivity of the insulated paper product 100, a pigment-containing layer 30, or any combination thereof. See, FIG. 6A.

36. The insulated paper product 100 of any one of embodiments 32 to 35, wherein the one or more non-paper layers 20/30 comprise a coating 30 that provides a lower emissivity and/or thermal conductivity of the insulated paper product 100. See again, FIG. 6A. In some embodiments, the coating 30 comprises bismuth oxychloride, mica, zinc oxide, zinc sulfide, cadmium sulfide, bismuth vanadate, or any mixture or combination thereof. In some embodiments, the coating 30 comprises bismuth oxychloride, mica, zinc oxide, or any mixture or combination thereof.

37. The insulated paper product 100 of any one of embodiments 32 to 36, wherein the one or more non-paper layers 20/30 comprise at least two non-paper layers 20/30.

38. The insulated paper product 100 of any one of embodiments 1 to 37, wherein the insulating material 12 comprises perlite, perlite coated with copper ions, expanded perlite, perlite hollow microspheres (such as available from Richard. Baker Harrison Ltd., UK, or CenoStar Corporation (US), or Sil-Cel® microcellular aluminum silicate filler particles made by creating a structure of multicellular spherical bubbles comprising perlite, available from Silbrico (US), Sil-Cel® microspheres are available in a range of particle sizes, and may be coated or uncoated, or Dicaperl HP-2000 perlite microspheres, as sold by Dicalite (US), or flaked or milled pulite (such as Dicaperl LD1006 also sold by Dicalite), porous volcanic materials (such as pumice), vermiculite (including Micro-Lite® vermiculite dispersions, available from Dicalite), hollow expanded vermiculite, glass foams (such as Owens Corning), recycled glass foams (such as manufactured by GrowStone Inc.), cellular glass insulation materials, cenospheres (such as available from CenoStar Corp.), glass bubbles (such as available from 3M under the trade designations iM30K, iM16k, and K20, as well as Q-Cel glass), ceramic microspheres, plastic microspheres, and synthetic hollow microspheres (such as available from Kish Company Inc.), silica aerogels (such as those available from Aspen Aerogels, and those that may be incorporated into paints and coatings under the Enova® and Lumira® brand from Cabot), microporous polyolefin-based aerogels (such as disclosed in US Patent Application Publication No. 2016/0272777 to Aspen Aerogels Inc.), organic aerogels such as those disclosed in PCT WO 2019121242 to Henkel AG & Co. KGAA which comprise thiol-epoxy based aerogels, xerogels (i.e., collapsed aerogels), seagels (i.e., microfoams made from agar and alginates). foamed starch, foamed paper pulp, agar, foamed agar, alginates, foamed alginates, bismuth oxychloride, metalized ceramics, metalized fibers, cadmium yellow pigment (cadmium disulfide), or any combination thereof. Examples of commercially available insulating materials 12 include, but are not limited to, FOAMGLAS® products commercially available from Owens Corning (Pittsburg Pa.); and Growstone products commercially available from Growstone, LLC, a subsidiary of Earthstone International Inc. (Santa Fe, N. Mex.). Recycled glass suitable for use as insulating materials 12 is typically crushed to a finely divided powder and mixed with a blowing agent, e.g., carbon or limestone. It is then passed into a furnace hot enough to begin to melt the glass. As the glass powder particles begin to fuse, the blowing agent gives off a gas or vapor, forming bubbles inside the glass. This generates a porous, mostly closed cell glass foam, with high thermal and sound insulation properties. Vermiculite may also be used as a suitable insulating material 12. Vermiculite is a hydrous phyllosilicate mineral that undergoes significant expansion when heated. Exfoliation occurs when the mineral is heated sufficiently, and the effect is routinely produced in commercial furnaces. Vermiculite is formed by weathering or hydrothermal alteration of biotite or phlogopite.

39. The insulated paper product 100 of any one of embodiments 1 to 38, wherein the insulating material 12 comprises perlite (e.g., in the paper 10, the adhesive 40, the coating 30, and/or the emissivity coating 30), aerogel (e.g., in the paper 10 and/or the adhesive 40), glass bubbles (e.g., in the adhesive 40 and/or the coating 30), activated carbon (e.g., in the paper 10, the adhesive 40, the coating 30, and/or the emissivity coating 30), or any combination thereof.

40. The insulated paper product 100 of any one of embodiments 1 to 39, wherein the insulating material 12 comprises particles having an average particle size of less than about 1000 microns (μm) (or any average particle size greater than about 1.0 μm to less than about 1000 μm, in increments of 1.0 μm, e.g., 25 μm, or any range of average particle size less than about 1000 μm, in increments of 1.0 μm, e.g., from about 50 μm to about 500 μm). For example, perlite particles typically have an average particle size ranging from about 5.0 to about 150 μm, aerogel particles typically have an average particle size ranging from about 10 to about 800 μm, and glass bubble particles typically have an average particle size ranging from about 10.0 to about 50 μm.

41. The insulated paper product 100 of any one of embodiments 1 to 40, wherein the insulating material 12 comprises particles having a multi-modal particle size distribution.

42. The insulated paper product 100 of any one of embodiments 1 to 41, wherein paper layer 10 that contains insulating material 12 comprises from 15.0 weight percent (wt %) to 99.0 wt % fibers 11, and from about 85.0 wt % to about 1.0 wt % insulating material 12, based on a total weight of the paper layer 10. It should be understood that a given paper layer 10 that contains insulating material 12 can have (a) any weight percent of fibers 11 between 15.0 wt % and 99.0 wt % (i.e., in multiples of 0.1 wt %, e.g., 55.5 wt %, or any range of values between 15.0 wt % and 99.0 wt %, in multiples of 0.1 wt %, e.g., from 35.6 wt % to 74.1 wt %).

43. The insulated paper product 100 of any one of embodiments 1 to 42, wherein paper layer 10 that contains insulating material 12 comprises from 20.0 wt % to 75.0 wt % fibers 11, and from about 80.0 wt % to about 25.0 wt % insulating material 12, based on a total weight of the paper layer 10.

44. The insulated paper product 100 of any one of embodiments 1 to 43, wherein the insulating material 12 has a material density of less than 1.0 gram per cubic centimeter (g/cm$^3$), more typically, less than 0.6 g/cm$^3$. It should be understood that the insulating material 12 can have any material density less than 1.0 g/cm$^3$ such as from greater than 0.01 g/cm$^3$ to about 0.99 g/cm$^3$ (or any value between 0.01 and 0.99, in multiples of 0.01 g/cm$^3$, e.g., 0.48 g/cm$^3$, or any range of values between 0.01 and 0.99, in multiples of 0.01 g/cm$^3$, e.g., from 0.10 g/cm$^3$ to 0.50 g/cm$^3$).

45. The insulated paper product 100 of any one of embodiments 1 to 44, wherein at least one layer 10 of said one or more paper layers 10 has a layer density of less than 1.0 g/cm$^3$. It should be understood that the at least one layer 10 can have any layer density less than 1.0 g/cm$^3$ such as from greater than 0.01 g/cm$^3$ to about 0.99 g/cm$^3$ (or any value between 0.01 and 0.99, in multiples of 0.01 g/cm$^3$, e.g., 0.78 g/cm$^3$, or any range of values between 0.01 and 0.99, in multiples of 0.01 g/cm$^3$, e.g., from 0.20 g/cm$^3$ to 0.60 g/cm$^3$). It should be further understood that any number of layers 10 of said one or more paper layers 10 may have an independent layer density, each of which is less than 1.0 g/cm$^3$ (or any value between 0.01 and 0.99, in multiples of 0.01 g/cm$^3$, e.g., 0.88 g/cm$^3$, or any range of values between 0.01 and 0.99, in multiples of 0.01 g/cm$^3$, e.g., from 0.15 g/cm$^3$ to 0.55 g/cm$^3$).

46. The insulated paper product 100 of any one of embodiments 1 to 45, wherein said integral paper product 100+ has an integral paper product density of less than 1.0 g/cm$^3$. It should be understood that the integral paper product 100' can have any integral paper product density less than 1.0 g/cm$^3$ such as from greater than 0.01 g/cm$^3$ to about 0.99 g/cm$^3$ (or any value between 0.01 and 0.99, in multiples of 0.01 g/cm$^3$, e.g., 0.77 g/cm$^3$, or any range of values between 0.01 and 0.99, in multiples of 0.01 g/cm$^3$, e.g., from 0.15 g/cm$^3$ to 0.53 g/cm$^3$).

47. The insulated paper product 100 of any one of embodiments 1 to 46, wherein the insulated paper product 100 is molded to form a three-dimensional object (e.g., a cup 62 or container 60).

48. A storage container 60 comprising the insulated paper product 100 of any one of embodiments 1 to 47. See, FIGS. 19A-19C.

49. The storage container 60 of embodiment 48, wherein the storage container 60 comprises a storage volume 66 at least partially surrounded by one or more container walls 68.

50. The storage container 60 of embodiment 48 or 49, wherein the storage volume 66 is completely surrounded by or surroundable (i.e., the storage container 60 can be configured to surround the storage volume 66) by one or more container walls 68.

51. The storage container 60 of embodiment 49 or 50, wherein the one or more container 68 comprise the insulated paper product 100 of any one of embodiments 1 to 47.

52. The storage container 60 of any one of embodiments 49 to 51, wherein the one or more container walls 68 comprise a gypsum layer, a clay-containing layer, a polymer coating, a pigment-containing layer, a bismuth oxychloride-containing layer, a mica containing layer, an aerogel containing layer, a fabric layer (e.g., a nonwoven, woven or knit fabric layer), a fiber-reinforcement layer (e.g., a layer of unidirectional fibers), a layer of insulating material 12, a metal film layer, a foam layer, a layer of air, a coating that lowers an emissivity of the one or more container walls (e.g., such as mica, bismuth oxychloride, zinc oxide, zinc sulfide, kaolin clay, or cadmium sulfide), a coating that lowers a thermal conductivity of the one or more container walls, a coating that enhances a water-repellency of the one or more container walls such as a wax, or a fluorocarbon, or a reactive cross-linking agent such as an epoxy or a urethane, or a silicone-based coating, or one or more coatings mentioned in U.S. Patent Application Publication No. 20191077537, or any combination thereof.

53. The storage container 60 of any one of embodiments 48 to 52, wherein the storage container 60 comprises a box 61.

54. The storage container 60 of any one of embodiments 48 to 53, wherein the storage container 60 comprises a container 62 for temporarily housing a liquid (not shown).

55. The storage container 60 of any one of embodiments 48 to 52 and 54, wherein the container 60 comprises a cup 62, a mug, a flask, or a thermos 62. As shown in FIG. 19C, the storage container 60 may be a hot beverage cup 62, which could replace both STYROFOAM® cups, as well as lined paper cups along with the insulating paper ring currently provided to prevent burning fingers of the person holding the cup.

56. The storage container 60 of any one of embodiments 48 to 52, wherein the container 60 comprises a clam shell type box packaging 60 for hot food 80. Such a container may be made via molding pulp using a vacuum forming machine. See, for example, FIG. 20.

57. The storage container 60 of any one of embodiments 48 to 52, wherein the container 60 comprises a salad container 60 for chilled food 80. See, for example, FIG. 21.

58. The storage container 60 of any one of embodiments 48 to 52, wherein the container 60 comprises a padded envelope 60. See, for example, FIG. 22.

Figure 23A:
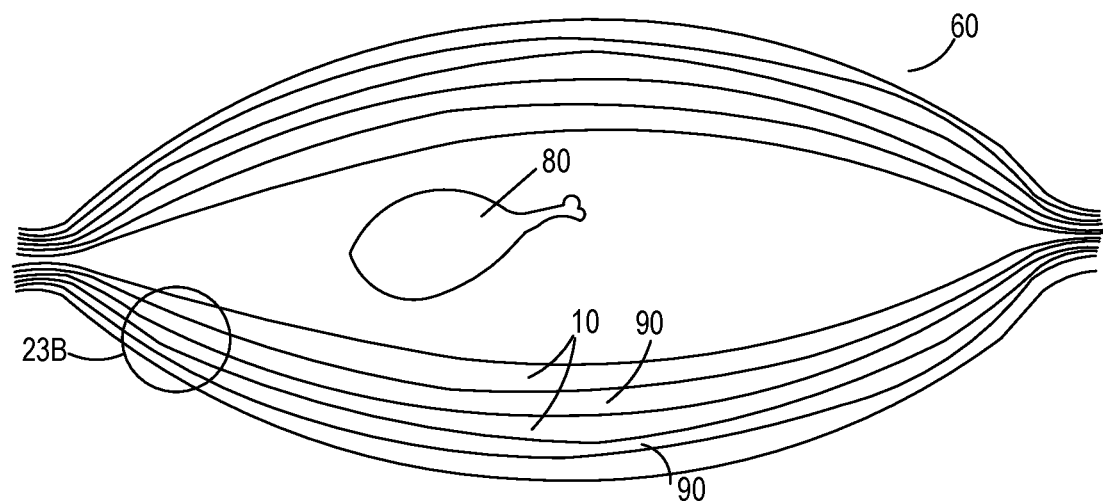
Figure 23B:
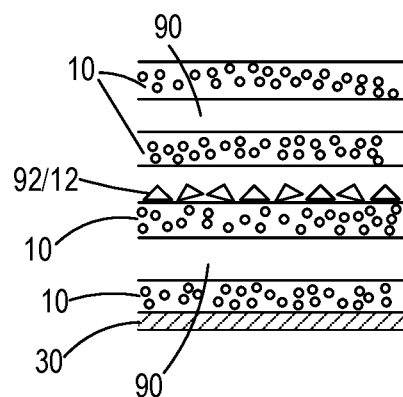
FIG. 23B depicts a close-up cross-sectional view of the wall structure of the exemplary shipping container shown in FIG. 23A.

59. The storage container 60 of any one of embodiments 48 to 52, wherein the container 60 comprises a shipping container 60. See, for example, FIG. 23A. As shown in FIG. 23B, exemplary shipping container 60 comprises (i) multiple thinner paper layers 10, each of which includes insulating materials 12 incorporated therein, optionally with (ii) a non-uniform distribution of material particles 92 (which could be insulating material 12), optionally (iii) air 90 or an insulative filler material between the layers 10, and (iv) optionally coating(s) 30 on one or more of the paper layers 10.

Figure 24:
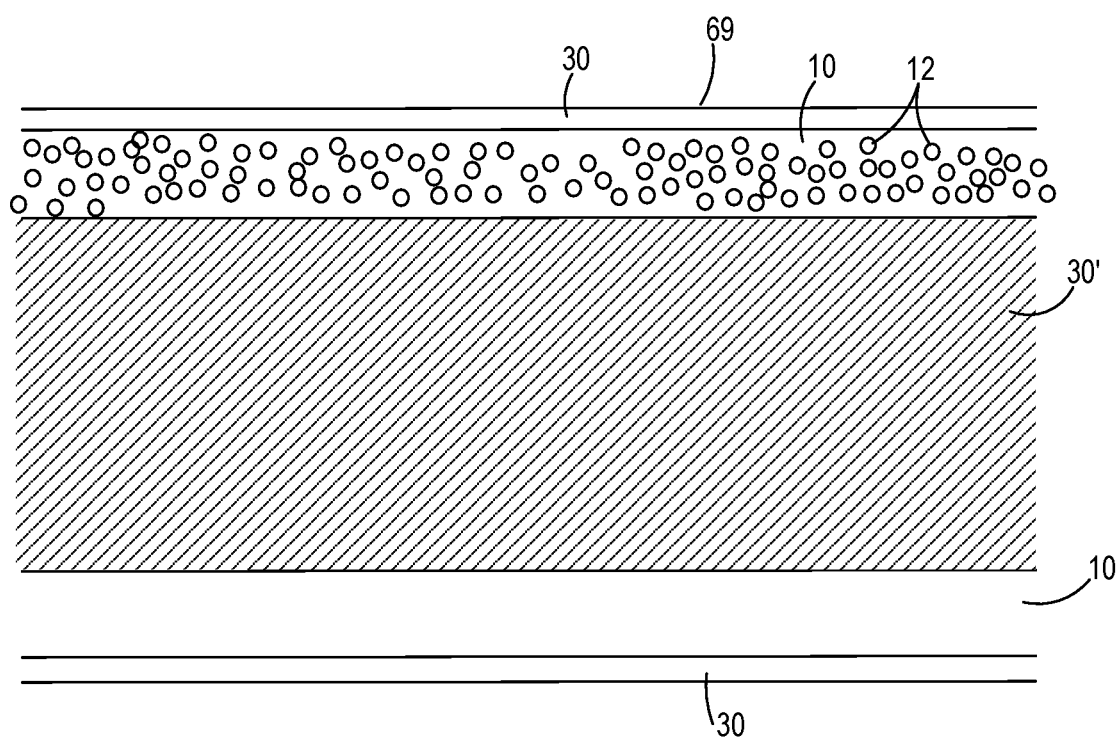
FIG. 24 depicts an exemplary cross-sectional view of a wall structure of an exemplary shipping container.

60. The storage container 60 of embodiment 59, wherein the shipping container 60 comprises shipping container walls 69 that comprise a closed cell foam 30'. See, for example, FIG. 24. In this embodiment, the closed cell foam 30' may be a biodegradable foam 30', for instance a foamed starch such as GreenCell® sold by KIM Industries Inc. Holt, Mich., or a foamed alginate, or pectin, or gelatin, or agar material that has been foamed through one means or another, and optionally chemically cross-linked to a certain extent. As shown in FIG. 24, the shipping container 60 may include paper layers 10 that may optionally include insulating material 12, and may also contain a thermal barrier coating 30. The coating 30 could be designed to reduce radiative heat transfer, or it could be designed to reduce conductive heat transfer, or it could be designed to reduce both.

61. The storage container 60 of any one of embodiments 48 to 60, wherein the storage container 60 of dimensions 12"×10"×7" is capable of keeping a combination of 900 g cooked pork (or simulant) and 1800 g of frozen water gel packs (conditioned to −20° C. prior to placing into the container) below 0° C. after 10 hours in an external temperature of 23° C.

62. A storage container 60 of any one of embodiments 48 to 61 or the insulated paper product 100 of any one of embodiments 1 to 47, further comprising a coating 30 on (i) an inner surface 63, (ii) an outer surface 13/15, or (iii) both (i) and (ii) of the storage container 60 or the insulated paper product 100, the coating 30 having a low thermal emissivity or thermal barrier property. As used herein, the phrase "a low thermal emissivity" refers to a thermal emissivity of less than 0.90, as measured using Thermal Emissivity Method #3 Recommended by Flir Systems Inc. (described in the "Example" section below). Suitable materials for use in a given "emissivity coating" include, but are not limited to, bismuth oxychloride, mica flakes, perlite, kaolin, and any combination thereof (e.g., mica flakes partially or completely coated with bismuth oxychloride).

63. A storage container 60 of any one of embodiments 48 to 62 or the insulated paper product 100 of any one of embodiments 1 to 47, further comprising a coating 30 on (i) an inner surface 63, (ii) an outer surface 13/15, or (iii) both (i) and (ii) of the storage container 60 or the insulated paper product 100, the coating 30 having a Thickness Adjusted Delta T (TADT) heat transfer rate of less than about 9° C. As used herein, the TADT is measured using the Modified Lee's Disk Heat Transfer Rate Test Method (described in the "Example 2" section below).

64. A storage container 60 of any one of embodiments 48 to 63 or the insulated paper product 100 of any one of embodiments 1 to 47, further comprising a coating 30 on (i) an inner surface 63, (ii) an outer surface 13/15, or (iii) both (i) and (ii) of the storage container 60 or the insulated paper product 100, the coating 30 comprising clay particles, a colorant other than said clay particles, or a combination thereof.

65. A storage container 60 of any one of embodiments 48 to 64 or the insulated paper product 100 of any one of embodiments 1 to 47, further comprising a coating 30 on (i) an inner surface 63, (ii) an outer surface 13/15, or (iii) both (i) and (ii) of the storage container 60 or the insulated paper product 100, the coating 30 comprising one or more materials that increase the water resistance of (i) the inner surface 63, (ii) the outer surface 13/15, or (iii) both (i) and (ii) of the storage container 60 or the insulated paper product 100.

66. A storage container 60 of any one of embodiments 48 to 65 or the insulated paper product 100 of any one of embodiments 1 to 47, further comprising a coating 30 on (i) an inner surface 63, (ii) an outer surface 13/15, or (iii) both (i) and (ii) of the storage container 60 or the insulated paper product 100, the coating 30 water-proofing (i) the inner surface 63, (ii) the outer surface 13/15, or both (i) and (ii) of the storage container 60 or the insulated paper product 100. By "waterproofing," it is meant that the outer surface 13/15 of the storage container 60 or the insulated paper product 100 can be in contact with water for 24 hours and maintain its structural integrity.

67. A storage container 60 of any one of embodiments 48 to 66 or the insulated paper product 100 of any one of embodiments 1 to 47, further comprising a coating 30 on (i) an inner surface 63, (ii) an outer surface 13/15, or (iii) both (i) and (ii) of the storage container 60 or the insulated paper product 100, the coating 30 increasing a moisture absorption capacity of (i) the inner surface 63, (ii) the outer surface 13/15, or (iii) both (i) and (ii) of the storage container 60 or the insulated paper product 100.

Methods of Making Insulated Paper Products

68. A method of making the insulated paper product 100 of any one of embodiments 1 to 47, said method comprising: forming an insulated paper product 100 comprising: one or more paper layers 10 and insulating material 12, wherein (1) when two or more paper layers 10 are present, the two or more paper layers 10 form an integral paper product 100', and (2)(a) at least one of: (i) one layer 20 in combination with the one or more paper layers 10 comprises the insulating material 12 and (ii) one paper layer 10 within the one or more paper layers 10 has a non-uniform distribution of insulating material 12 therein, or (2)(b) the integral paper product 100' itself has a non-uniform distribution of insulating material 12 therethrough.

69. A method of making an insulated paper product 100, said method comprising: forming an insulated paper product 100 comprising: one or more paper layers 10 and insulating material 12, wherein (1) when two or more paper layers 10 are present, the two or more paper layers 10 form an integral paper product 100', and (2)(a) at least one of: (i) one layer 20 in combination with the one or more paper layers 10 comprises the insulating material 12 and (ii) one paper layer 10 within the one or more paper layers 10 has a non-uniform distribution of insulating material 12 therein, or (2)(b) the integral paper product 100' itself has a non-uniform distribution of insulating material 12 therethrough.

70. The method of embodiment 68 or 69, wherein said forming step comprises at least one papermaking step.

71. The method of any one of embodiments 68 to 70, wherein said forming step comprises incorporating the insulating material 12 within one or more paper layers 10 of the one or more paper layers 10.

72. The method of embodiment 71, wherein said incorporating step comprises forming a non-uniform distribution of the insulating material 12 within at least one paper layer 10 of the one or more paper layers 10.

73. The method of embodiment 72, wherein the non-uniform distribution of the insulating material 12 comprises a layer of insulating particles 16 positioned proximate an outer surface of the at least one paper layer within the one or more paper layers 10.

74. The method of embodiment 72, wherein the non-uniform distribution of the insulating material 12 comprises a layer of insulating particles 16 positioned centrally within the at least one paper layer within the one or more paper layers 10.

75. The method of any one of embodiments 68 to 74, wherein said incorporating step comprises forming a uniform distribution of the insulating material 12 within at least one paper layer 10 of the one or more paper layers 10.

76. The method of any one of embodiments 68 to 75, wherein said forming step comprises forming a layer 20 of the insulating material 12 on the one or more paper layers 10.
77. The method of any one of embodiments 68 to 76, wherein said forming step comprises incorporating a layer 20 of the insulating material 12 between two or more paper layers 10.
78. The method of any one of embodiments 68 to 77, wherein said forming step comprises incorporating one or more additives, other than the insulating material 12, into at least one paper layer 10 within the one or more paper layers 10. Suitable additives include, but are not limited to, copper ions, waxes, synthetic (e.g., polymeric or glass) fibers, silica, surface modified silica, transition metal surface modified silica, cyclodextrin, sodium bicarbonate, silicones to impart grease and water resistance, metalized ceramic particles, metalized fibers, cationic starches, cationic polymers, such as cationic guar gum, polyethylene imine) (e.g., poly(ethylene imine marketed as Polymin P and available from Aldrich Chemical), fillers, sizes, binders, clays including bentonite clay, kaolin clay, and other minerals, calcium carbonate, calcium sulfate, and other materials that may be added to paper products for different reasons, and any combinations thereof. The filler may make the paper more receptive to printing, for instance, or make the paper glossy. Many fillers have a density greater than 1.0 g/cm$^3$. Flocculants and retention aids, may also be included such as high molecular weight poly(acrylamide), poly(ethylene imine), cationic guar gum, and other cationic polymers. Sizes and binders may also be added to help provide strength to papers, and can include starches, hydrocolloids, artificial and natural polymer latexes, such as RHOPLEX® acrylic resins from Dow Chemical and ROVENE® binders from Mallard Creek Polymers (Charlotte N.C.). Water soluble polymers, such as polyvinyl alcohol), and poly(acrylic acid) may also be added to the paper. Sometimes, water resistance on the final box is required. Vapor-Guard R5341B or Barrier Grip 9471A (The International Group Inc., Titusville Pa.) are useful as barrier coatings that provide a given paper layer 10 with a degree of grease and/or water resistance.
79. The method of any one of embodiments 68 to 78, wherein said forming step comprises forming at least one fluted paper layer 10 within the one or more paper layers 10. See, for example, FIGS. 6A-6D and 14-18B.
80. The method of embodiment 79, wherein the at least one fluted paper layer 10 has cross-directional flutes 216 therein.
81. The method of embodiment 79 or 80, wherein the at least one fluted paper layer 10 has machine-directional flutes 219 therein.
82. The method of any one of embodiments 68 to 81, wherein said forming step comprises bonding two or more paper layers 10 to one another.
83. The method of embodiment 82, wherein said bonding step comprises a laminating step. See, for example, FIG. 10.
84. The method of embodiment 82 or 83, wherein said bonding step comprises an adhesion step. See, for example, FIGS. 6A-6D, wherein adhesive 40 is used to bond paper layers 10/100' to one another.
85. The method of embodiment 84, further comprising incorporating the insulating material 12 within an adhesive 40 using in said adhesion step. See, for example, FIGS. 6B-6D.
86. The method of any one of embodiments 79 to 85, further comprising incorporating the insulating material 12 within one or more voids e.g., air voids 90) of the at least one fluted paper layer 10. See, for example. FIG. 6C.
87. The method of any one of embodiments 68 to 86, wherein said forming step comprises forming a wall structure comprising the one or more paper layers 10 and at least one additional layer. The additional layer could be a layer 20 of insulating material 12, a coating 30 (e.g., a coating 30 that increases or decreases an emissivity of a paper layer 10/100" or an integrated product 100"), a non-paper layer 30, a layer of air 90, or any combination thereof. See, for example, FIGS. 6A-6D and 23A-24.
88. The method of any one of embodiments 68 to 87, wherein said forming step comprises forming a storage container 60.
89. The method of embodiment 88, wherein the storage container 60 comprises the storage container 60 of any one of embodiments 48 to 67.
90. The method of any one of embodiments 68 to 89, wherein said forming step comprises forming at least one paper layer 10 within the one or more paper layers 10 using recycled paper pulp.
91. The method of any one of embodiments 68 to 90, wherein said forming step comprises forming at least one paper layer 10 within the one or more paper layers 10 using recycled pre-consumer scrap cardboard. Pre-consumer scrap cardboard includes, but is not limited to, trimmings from cutting boxes from a cardboard sheet, defective box material and boxes, or any combination thereof.
92. The method of any one of embodiments 68 to 91, wherein said forming step comprises forming at least one paper layer 10 within the one or more paper layers 10 using recycled insulated paper product 100 of any one of embodiments 1 to 47, recycled storage containers 60 of any one of embodiments 48 to 67, or any combination thereof. For example, one method of making at least one paper layer 10 and a container 60 formed therefrom comprises forming a corrugated structure 100" with at least one outer ply/liner 21/22 that contains fiber 11 and insulating material 12, and a fluted median ply/liner 23 without insulating material 12, comprising: suspending cellulose fibers 11 in water to make paper pulp 11; forming a fibrous first layer 10 from the pulp 11; suspending cellulose fibers 11 in water, adding voided materials (e.g., hollow insulating material 12), optionally adding surface active agents, optionally adding a flocculent; forming this layer 10 on top of the first layer of pulp 10; suspending cellulose fibers 11 in water to make paper pulp 11; forming a fibrous top layer 10 on top of the second layer 10; pressing and drying the resultant three-ply insulated paper sheet 100'; optionally coating at least one of the surfaces of the three-ply insulated paper sheet 100' with a coating 30 selected from comprising aluminum, silver, mica, sericite, zinc oxide, zinc sulfide, cadmium sulfide, bismuth oxychloride, bismuth oxychloride coated mica, bismuth vanadate, gypsum, or combinations thereof; passing a paper sheet 10 through a corrugator to make a fluted layer 23 while adhering two insulated paper sheets 100' as liner boards 21/22 to the fluted layer 23 to form corrugated board 100"; optionally adding an additional fluted layer 23 and another liner board 21 or 22 to make a double walled corrugated structure 100", containing three insulated liner boards 21/22 and two fluted layers 23; cutting the double walled corrugated structure 100" into the form/shape of a box 60; and allowing the off-cuts (e.g., scraps from the cutting step) to be sent back to the repulping mill mixed with off-cuts from non-insulating board. Another method of making at least one paper layer 10 and a container 60 formed therefrom comprises forming a corrugated structure 100" with at least one outer ply/liner 21/22 that contains a paper layer 10 and an insulating material layer 20, and a fluted median ply/liner 23 without insulating material 12, comprising: suspending cellulose fibers 11 in water to make paper pulp 11, and optionally adding a flocculant; forming a fibrous first layer 10 from pulp 11; suspending voided materials (e.g., hollow insulating material 12) in water, optionally adding surface active agents, and optionally adding a flocculent and/or a binder; forming this layer 20 on top of the first layer 10 of pulp 11, through curtain coating, slot-die coating, rod coating, spray application, etc.; suspending cellulose fibers 11 in water to make paper pulp 11 optionally adding a flocculant; forming a fibrous top layer 10 on top of the second layer 20; pressing and drying the resultant insulated paper sheet 100'; optionally coating at least one of the surfaces of the resultant insulated paper sheet 100' with a coating 30 comprising aluminum, silver, mica, sericite, zinc oxide, zinc sulfide, cadmium sulfide, bismuth oxychloride, bismuth oxychloride coated mica, bismuth vanadate, gypsum, or combinations thereof passing a paper sheet 10 through a corrugator to make a fluted layer 23 while adhering two insulated paper sheets 100' as liner boards 21/22 to the fluted layer 23 to form corrugated hoard 100"; optionally adding an additional fluted layer 23 and another liner board 21 or 22 to make a double walled corrugated structure 100", containing three insulated liner boards 21/22 and two fluted layers 23; cutting the double walled corrugated structure 100" into the form/shape of a box 60; and allowing the off-cuts (e.g., scraps from the cutting step) to be sent back to the repulping mill mixed with off-cuts from non-insulating board. Yet another method of making at least one paper layer 10 and a container 60 famed therefrom comprises forming a corrugated structure 100" with at least one outer ply/liner 21/22 that contains fiber 11 and insulating material 12, and a fluted median ply/liner 23 that comprises insulating material 12, comprising: suspending cellulose fibers 11 in water to make paper pulp 11; forming fibrous first layer 10 from the pulp 11; suspending cellulose fibers 11 in water, adding voided materials (e.g., hollow insulating material 12), optionally adding surface active agents, optionally adding a flocculent; forming this layer 10 on top of the first layer of pulp 10; suspending cellulose fibers 11 in water to make paper pulp 11; forming a fibrous top layer 10 on top of the second layer 10; pressing and drying the resultant three-ply insulated paper sheet 100'; optionally coating at least one of the surfaces of the three-ply insulated paper sheet 100' with a coating 30 selected from comprising aluminum, silver, mica, sericite, zinc oxide, zinc sulfide, cadmium sulfide, bismuth oxychloride, bismuth oxychloride coated mica, bismuth vanadate, gypsum, or combinations thereof; passing the resultant three-ply insulated paper sheet 100' through a corrugator to make a fluted layer 23 while adhering two insulated paper sheets 100' as liner boards 21/22 to the fluted layer 23 to form corrugated hoard 100"; optionally adding an additional fluted layer 23 and another liner hoard 21 or 22 to make a double walled corrugated structure 100", containing three insulated liner boards 21/22 and two fluted layers 23; cutting the double walled corrugated structure 100" into the form/shape of a box 60; and allowing the off-cuts (e.g., scraps from the cutting step) to be sent back to the repulping mill mixed with off-cuts from non-insulating board. Yet another method of making at least one paper layer 10 and a container 60 formed therefrom comprises forming a corrugated structure 100" with at least one outer ply/liner 21/22 that contains a paper layer 10 and an insulating material layer 20, and a fluted median ply/liner 23 with an insulating layer 20, comprising: suspending cellulose fibers 11 in water to make paper pulp 11, and optionally adding a flocculant; forming a fibrous first layer 10 from pulp 11; suspending voided materials (e.g., hollow insulating material 12) in water, optionally adding surface active agents, and optionally adding a flocculent and/or a binder; forming this layer 20 on top of the first layer 10 of pulp 11, through curtain coating, slot-die coating, rod coating, spray application, etc.; suspending cellulose fibers 11 in water to make paper pulp 11 optionally adding a flocculant; forming a fibrous top layer 10 on top of the second layer 20; pressing and drying the resultant insulated paper sheet 100'; optionally coating at least one of the surfaces of the resultant insulated paper sheet 100' with a coating 30 comprising aluminum, silver, mica, sericite, zinc oxide, zinc sulfide, cadmium sulfide, bismuth oxychloride, bismuth oxychloride coated mica, bismuth vanadate, gypsum, or combinations thereof; passing the insulated paper sheet 100' through a corrugator to make a fluted layer 23 while adhering two insulated paper sheets 100' as liner boards 21/22 to the fluted layer 23 to form corrugated board 100"; optionally adding an additional fluted layer 23 and another liner board 21 or 22 to make a double walled corrugated structure 100", containing three insulated liner boards 21/22 and two fluted layers 23; cutting the double walled corrugated structure 100" into the form/shape of a box 60; and allowing the off-cuts (e.g., scraps from the cutting step) to be sent back to the repulping mill mixed with off-cuts from non-insulating board.

93. The method of any one of embodiments 68 to 92, wherein said forming step comprises a molding step so as to form a three-dimensional object from the one or more paper layers 10 or the insulated paper product 100/100' or the insulated paper product having a corrugated structure 100".

94. The method of embodiment 93, wherein the molding step comprises a pressure molding step, a thermoforming step, a vacuum forming step, or any combination thereof.

95. The method of any one of embodiments 68 to 94, wherein each paper layer 10 that contains insulating material 12 comprises from 15.0 wt % to 99.0 wt % fibers 11, and from about 85.0 wt % to about 1.0 wt % insulating material 12, based on a total weight of the paper layer 10.

96. The method of any one of embodiments 68 to 95, wherein each paper layer 10 that contains insulating material 12 comprises from 15.0 wt % to 80.0 wt % fibers 11, and from about 85.0 wt % to about 20.0 wt % insulating material 12, based on a total weight of the paper layer 10.

97. The method of any one of embodiments 68 to 96, wherein the insulating material 12 has a material density of less than 1.0 g/cm$^3$ (or any value between 0.01 g/cm$^3$ and 0.99 g/cm$^3$, in multiples of 0.01 g/cm$^3$, e.g., 0.48 g/cm$^3$, or any range of values between 0.01 g/cm$^3$ and 0.99 g/cm$^3$, in multiples of 0.01 g/cm$^3$, e.g., from 0.10 g/cm$^3$ to 0.50 g/cm$^3$).

98. The method of any one of embodiments 68 to 97, wherein at least one layer 10 of the one or more paper layers 10 has a layer density of less than 1.0 g/cm$^3$ (or any value between 0.01 g/cm³ and 0.99 g/cm³, in multiples of 0.01 g/cm³, e.g., 0.78 g/cm³, or any range of values between 0.01 g/cm³ and 0.99 g/cm³, in multiples of 0.01 g/cm³, e.g., from 0.20 g/cm³ to 0.75 g/cm³). It should be further understood that any number of layers 10 of the one or more paper layers 10 may have an independent layer density, each of which is less than 1.0 g/cm³ (or any value between 0.01 g/cm³ and 0.99 g/cm³, in multiples of 0.01 g/cm³, e.g., 0.44 g/cm³, or any range of values between 0.01 g/cm³ and 0.99 g/cm³, in multiples of 0.01 g/cm³, e.g., from 0.18 g/cm³ to 0.85 g/cm³).

99. The method of any one of embodiments 68 to 98, wherein the integral paper product 100' has an integral paper product density of less than 1.0 g/cm³ (or any value between 0.01 g/cm³ and 0.99, g/cm³ in multiples of 0.01 g/cm³, e.g., 0.77 g/cm³, or any range of values between 0.01 g/cm³ and 0.99 g/cm³, in multiples of 0.01 g/cm³, e.g., from 0.18 g/cm³ to 0.53 g/cm³).

Methods of Using Insulated Paper Products

100. A method of using the insulated paper product 100 of any one of embodiments 1 to 47 or the storage container 60 of any one of embodiments 48 to 67, said method comprising: insulating an object via the insulated paper product 100 or the storage container 60.
101. The method of embodiment 100, wherein the object is a surface.
102. The method of embodiment 100, wherein the object is a food item, a medicine, or any other item that is desirably kept at a cool temperature (e.g., a temperature below room temperature or a refrigerating temperature) or at an elevated temperature (e.g., a temperature above room temperature or a hot-out-of-the-oven temperature).
103. The method of embodiment 100 or 102, wherein the object is a food item.
104. The method of any one of embodiments 100 to 103, wherein the method uses the storage container 60 of any one of embodiments 48 to 67.
105. The method of any one of embodiments 100 to 104, wherein the method uses the storage container 60 and the storage container 60 comprises a box 61, a container 62 for temporarily housing a liquid (not shown), a cup, a mug, a flask, or a thermos 62, a clam shell 60 for hot food 80 (See, for example, FIG. 20), a salad container 60 for chilled food 80 (See, for example, FIG. 21), a padded envelope 60 (See, for example, FIG. 22), a shipping container 60 (See, for example, FIG. 23A), a shipping container 60 comprising shipping container walls 69 that comprise a closed cell foam 30' (See, for example, FIG. 24), or any combination thereof. For example, in one method of use, the method comprises a method of maintaining an object at a controlled temperature comprising: heating or chilling an object (e.g., food, medicine, meat, fish, salad, vegetables, flowers, pharmaceuticals, biological specimens) to a pre-determined temperature T; packaging the object inside any herein-described storage container 60.
106. The method of any one of embodiments 100 to 105, wherein the storage container 60 of dimensions 12"×10"×7" is capable of keeping a combination of 900 g cooked pork (or simulant) and 1800 g of frozen water gel packs (conditioned to −20° C. prior to placing into the container) below 0° C. after 10 hours in an external temperature of 23° C.
107. The method of any one of embodiments 100 to 106, wherein the insulated paper product 100 of any one of embodiments 1 to 47 or the storage container 60 of any one of embodiments 48 to 67 further comprises a coating 30 on (i) an inner surface 63, (ii) an outer surface 13/15, or (iii) both (i) and (ii) of the storage container 60 or the insulated paper product 100, the coating 30 (a) having a low thermal emissivity, (b) having a Thickness Adjusted Delta T (TADT) heat transfer rate of less than about 9° C. As used herein, the TADT is measured using the Modified Lee's Disk Heat Transfer Rate Test Method (described in the "Example 2" section below), (c) comprising clay particles, a colorant other than said clay particles, or a combination thereof, (d) comprising one or more materials that increase the water resistance of outer surface 13/15 of the storage container 60 or the insulated paper product 100, (e) water-proofing the inner surface 63 and/or the outer surface 13/15 of the storage container 60 or the insulated paper product 100, (f) increasing a moisture absorption capacity of the inner surface of the storage container 60 or the insulated paper product 100, or any combination of (a) to (f).
108. The method of any one of embodiments 100 and 102 to 107, further comprising transporting the object within the insulated paper product 100 or the storage container 60.
109. The method of any one of embodiments 100 and 102 to 108, further comprising shipping the object within the insulated paper product 100 or the storage container 60. For example, in one method of use, the method comprises a method of shipping an object at a controlled temperature comprising: chilling an object (e.g., food, medicine, meat, fish, salad, vegetables, flowers, pharmaceuticals, biological specimens) to below a spoiling temperature of the object; packaging the chilled object inside any herein-described storage container 60, along with frozen water gel packs, dry ice, etc.; closing the container; placing the storage container 60 into a vehicle (e.g., car, train, bus, airplane, etc.); transporting the package to a pre-determined destination; removing the storage container 60 from the vehicle; and delivering the storage container 60 to either the front door of a residence, or to the loading dock of a distribution center, or the entrance of a restaurant, or the receiving department of a business, wherein the temperature inside the unopened storage container 60 remains below the food spoiling temperature for at least 24 hours.
110. The method of any one of embodiments 100 to 109, further comprising repulping the insulated paper product 100 and/or the storage container 60 after said insulating step, wherein at least 80% of the insulating filler is removed from the pulp during the repulping operation.
111. The method of any one of embodiments 100 to 110, further comprising incorporating any fibers 11 and/or insulating particles 12 from a repulped insulated paper product 100 and/or a repulped storage container 60 into a newly formed insulated paper product 100 and/or a newly formed storage container 60.

Adhesives and Paper Products Made Therefrom

112. An adhesive 40 suitable for bonding two or more paper layers 10 to one another, said adhesive 40 being at least partially filled with one or more of the herein disclosed insulating materials 12.
113. The adhesive 40 of embodiment 112, wherein said adhesive 40 comprises a starch adhesive 40.
114. The adhesive 40 of embodiment 112 or 113, wherein said one or more insulating materials 12 comprise perlite, perlite coated with copper ions, expanded perlite, perlite hollow microspheres (such as available from Richard. Baker Harrison Ltd., UK, or CenoStar Corporation (US), perlite microspheres (such as Dicaperl HP-2000 sold by Dicalite), or Sil-Cell® microspherical perlite from Silbrico, flaked or milled perlite (such as LD1006 sold by Dicalite), porous volcanic materials (such as pumice), vermiculite (including MicroLite® vermiculite dispersions, available from Dicalite), hollow expanded vermiculite, glass foams, recycled glass foams (such as manufactured by GrowStone Inc.), cenospheres (such as available from CenoStar Corp.), glass bubbles (such as available from 3M under the trade designation iM30K), silica aerogels (such as those available from Aspen Aerogels, and those that may be incorporated into paints and coatings under the Enova® and Lumira® brand from Cabot), microporous polyolefin-based aerogels (such as disclosed in US Patent Application Publication No. 2016/0272777 to Aspen Aerogels Inc.), xerogels (i.e., collapsed aerogels), seagels (i.e., microfoams made from agar and alginates), foamed starch, foamed paper pulp, agar, foamed agar, alginates, foamed alginates, bismuth oxychloride, metalized ceramics, metalized fibers, activated carbon, cadmium yellow pigment (cadmium disulfide), or any combination thereof.

115. The adhesive 40 of any one of embodiments 112 to 114, wherein said one or more insulating materials 12 are present in an amount ranging from about 1.0 wt % to about 80 wt % of a total adhesive weight comprising adhesive 40 and said one or more insulating materials 12 and any other optional adhesive additives.

116. A paper product (e.g., with or without insulating material 12) comprising the adhesive 40 of any one of embodiments 112 to 115.

117. An insulated paper product 100/100' comprising the adhesive 40 of any one of embodiments 112 to 115.

118. A corrugated paper product 100" comprising the adhesive 40 of any one of embodiments 112 to 115.

In addition, it should be understood that although the above-described insulated paper products and methods are described as "comprising" one or more components or steps, the above-described insulated paper products and methods may "comprise," "consists of," or "consist essentially of" the above-described components or steps of the insulated paper products and methods. Consequently, where the present invention, or a portion thereof, has been described with an open-ended term such as "comprising," it should be readily understood that (unless otherwise stated) the description of the present invention, or the portion thereof, should also be interpreted to describe the present invention, or a portion thereof, using; the terms "consisting essentially of" or "consisting of" or variations thereof as discussed below.

As used herein, the terms "comprises," "comprising," "includes," "including," "has," "having," "contains", "containing," "characterized by" or any other variation thereof, are intended to encompass a non-exclusive inclusion, subject to any limitation explicitly indicated otherwise, of the recited components. For example, an insulated paper product and/or method that "comprises" a list of elements (e.g., components, layers or steps) is not necessarily limited to only those elements (or components or steps), but may include other elements (or components or steps) not expressly listed or inherent to the insulated paper product and/or method.

As used herein, the transitional phrases "consists of" and "consisting of" exclude any element, step, or component not specified. For example, "consists of" or "consisting of" used in a claim would limit the claim to the components, materials or steps specifically recited in the claim except for impurities ordinarily associated therewith (i.e., impurities within a given component). When the phrase "consists of" or "consisting of" appears in a clause of the body of a claim, rather than immediately following the preamble, the phrase "consists of" or "consisting of" limits only the elements (or components or steps) set forth in that clause; other elements (or components) are not excluded from the claim as a whole.

As used herein, the transitional phrases "consists essentially of" and "consisting essentially of" are used to define an insulated paper product and and/or a method that includes materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of".

Further, it should be understood that the herein-described insulated paper products and/or methods may comprise, consist essentially of, or consist of any of the herein-described components, layers and features, as shown in the figures with or without any feature(s) not shown in the figures. In other words, in some embodiments, the insulated paper products of the present invention do not have any additional features other than those shown in the figures, and such additional features, not shown in the figures, are specifically excluded from the insulated paper products. In other embodiments, the insulated paper products of the present invention do have one or more additional features that are not shown in the figures.

The present invention is described above and further illustrated below by way of examples, which are not to be construed in any way as imposing limitations upon the scope of the invention. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLES

Insulated paper products similar to exemplary insulated paper products 100/100'/100"/60 shown and described in FIGS. 1-48 were prepared.

Example 1. Paper Containing Insulating Materials

Test Method:

Swatches of paper containing perlite were prepared and found to be thermally insulating. The insulating properties of the resultant paper swatches were assessed using two thermocouples attached to either side of the sheet. The sheet was then placed on a hot plate and the rate of heating of the face not in contact with the hotplate was recorded as the rate of temperature rise (° C. per second per millimeter or Kelvin (K) per second per millimeter).

When added to cellulosic pulp at 10 wt %, 20 wt %, and 25 wt % and made into a swatch of paper, the heat-resistive properties allowed the perlite-infused paper to outperform the paper control and the paper mixed with other compounds, and nearly as well as the polystyrene cups (0.0771 K/s·mm average heating rate for the polystyrene cups, with a range of 0.0825 to 0.1346 K/s·mm for the various perlite samples). Using a statistical analysis test known as the F-test, it was confirmed with 99.82% accuracy that the perlite-infused paper did indeed perform better than all other types of additives.

Materials Used:

Baking Soda-infused paper

Chick-fil-A, McDonald's, and Sonic Expanded Polystyrene Cups

Solo Cup

70 Wausau Crepe Paper (standard, with ridges, and double thickness)

Additives:

| | |
|---|---|
| Polylactic Acid 1.3 denier fiber | Polyethylene Fybrel |
| Polypropylene 1.5 denier fiber | Activated Carbon |
| Sawdust | Medium-Large Sized Perlite |
| Medium-Small Sized Perlite | Microspheres |

Equipment Used:

| | | |
|---|---|---|
| Blender | Paper-press box | Hot plate |
| Computer | Thermocouples | |

Procedure to Make Paper:

1. Weigh out 3.36 g of the #70 crepe paper and pour into the blender.

2. Add 400 ml of water to the paper and blend the two until the mixture becomes a pulp slurry.

3. Measure out the additives in the following quantities: 10% by weight (0.336 g), 20% by weight (0.672 g), and 25% by weight (0.840 g). These quantities are to prepare three different samples and would require the repetition of steps 1 and 2 for each amount.

4. Add the additive to the pulp slurry and mix the slurry with a stirring rod.

5. Set up the paper-press box as follows:
   a. Place the mesh screen over the white screen.
   b. Place the wooden paper-box form over the mesh screen and strap the box securely in place with the Velcro straps.
   c. Place the wood block shaper into the paper-box form such that it forms a 115 mm by 87 mm rectangle. It is shaped like a "T" and should fit snuggly into place.

6. Pour the paper slurry evenly into the rectangular mold that was created.

7. There is a wooden block that should just fit into the rectangular mold. Cover one side of the block with wax paper and press down on the paper slurry to remove the water.

8. Release the Velcro straps and remove the white screen, screen mesh, pressed pulp, wax paper, and wooden block as one unit.

9. Carefully remove the mesh screen from the pressed pulp.

10. Remove the pulp from wood block by carefully pulling the wax paper away from the block.

11. Lay the wax paper and pulp on a flat surface and remove as much water by patting it with paper towels.

12. Allow the pulp paper to air dry before conducting heat transfer testing.
   a. If time does not allow for the pulp paper to air-dry. Then a heat source may be used to dry the paper. The heat source should not exceed 65.6° C.
   b. Remove the paper from the heat source when the paper is only slightly damp.

Procedure to Test Rate of Warming of Surface Distant from the Hot Plate:

1. Plug the data logger into the computer and open Wavescan 2.0.

2. Go to "Settings" and go through the following steps:
   a. Click "Select Device" under "AI Selected Devices".
   b. The data logger should be the only option to be in the menu. Click "OK".
   c. Click "Set Range" under "AI Channel Setting".
   d. Switch Channels 4 through 7 to "Thermo" on the top right of the window and close out the window.
   e. Set the "ChanStart" to 4 and "ChanCount" to 4 under "AI Channel Setting".
   f. Change the "Interval" to 1000 ms.
   g. Click "OK" at the bottom of the window.

3. Turn on "AI" under "Signal" near the bottom right of the window.

4. Check the box "AI Save2Disk" under "Device" near the bottom left of the window.

5. Verify that the room temperature is 21.5° C.±2° C.

6. Heat the hot plate within the temperature range of 37° C.±2° C.

7. Tape two thermocouples to each side of the paper sample and place the test sample on the hot plate.

8.

9. Place a glass bowl on test sample such that the bowl is facing down. Make sure that the bottom thermocouple is in contact with the hot plate and the bowl does not cover the tip of the top thermocouple.

10. Click "Start" in WaveScan and allow the process to run for at least 120 seconds.

11. Record the ambient room temperature for each test.

12. After the test has run, "Stop" the test and remove the sample and bowl from the hot plate.

13. Place the bowl into water at room temperature bowl down.
   a. This helps to quickly cool the bowl to be reused for testing.
   b. Be sure to thoroughly dry the bowl to remove another variable heat sink from the experimentation.

14. Click "Save As" and save the file in the desired location.

15. Click on "History" and open "Project.wsp" in the file folder that was saved.

16. Click on "Convert" and save the file in the desired location.

17. Repeat steps 7 through 13 three times for each paper sample.

18. Testing each sample should take no more than 3 minutes.

Procedure to Process Data:

1. Open one of the data files with Excel.

2. Plot the data as Temperature versus Time for only the thermocouples on the top of the paper sample. These data points can be distinguished since they will have lower temperature readings than the bottom thermocouples.

3. Add a trend line to both graphs of the two thermocouples and record the slopes of the trend lines. These values are the heat transfer rates of the paper.

4. Do this for all three tests of each paper sample and take the average of the heat transfer rate values.

5. Divide by the thickness in mm to get the thickness-adjusted values.

6. Repeat steps 1 through 4 for all paper samples.

Data:

The tables below categorize data for each sample containing 10% by weight of the different types of additives.

Note: Thickness-adjusted values were obtained by dividing the average rate of heating by the thickness to eliminate the effect of variable sample thickness.

| | | Heat Transfer Rate Testing of Different Insulating Materials 10% By Weight | | | | | | |
|---|---|---|---|---|---|---|---|---|
| | | Rate of Warming of Surface Furthest from the Hot Plate | | | | | | |
| | Thickness | Test 1 | | Test 2 | | Test 3 | | Average (Thickness Adjusted) |
| Sample | mm | (deg/s) | (deg/s) | (deg/s) | (deg/s) | (deg/s) | (deg/s) | (deg/s*mm) |
| Cotton | 1.65 | 0.2135 | 0.2134 | 0.2179 | 0.2179 | 0.2498 | 0.2498 | 0.1376 |
| Activated Carbon | 2.1 | 0.2299 | 0.2143 | 0.2016 | 0.1504 | 0.2051 | 0.2321 | 0.0979 |
| Fybrel | 1.52 | 0.2254 | 0.2193 | 0.3107 | 0.2919 | 0.1630 | 0.1764 | 0.1520 |
| PLA | 1.18 | 0.1787 | 0.1925 | 0.1531 | 0.1576 | 0.1726 | 0.1633 | 0.1437 |
| Med-Sm Perlite | 1.75 | 0.1934 | 0.1733 | 0.1152 | 0.1050 | 0.2803 | 0.2499 | 0.0941 |
| Med-Lg Perlite | 1.7 | 0.1872 | 0.1863 | 0.1207 | 0.1197 | 0.1202 | 0.1203 | 0.0837 |
| Microspheres | 1.18 | 0.1669 | 0.1690 | 0.1586 | 0.1606 | 0.2529 | 0.2430 | 0.1625 |
| Polypropylene | 2.6 | 0.1888 | 0.1883 | 0.2878 | 0.2773 | 0.3052 | 0.3062 | 0.1097 |
| Sawdust | 1.35 | 0.2218 | 0.2041 | 0.1878 | 0.1874 | 0.2304 | 0.2226 | 0.1548 |

The table below categorizes the data points for each sample containing 20% by weight of the different types of additives.

| | | Heat Transfer Rate Testing of Different Insulating Materials 20% By Weight | | | | | | |
|---|---|---|---|---|---|---|---|---|
| | | Rate of Warming of Surface Furthest from the Hot Plate | | | | | | |
| | Thickness | Test 1 | | Test 2 | | Test 3 | | Average (Thickness Adjusted) |
| Sample | mm | (deg/s) | (deg/s) | (deg/s) | (deg/s) | (deg/s) | (deg/s) | (deg/s*mm) |
| Activated Carbon | 2.3 | 0.2099 | 0.1941 | 0.1763 | 0.1711 | 0.2316 | 0.2316 | 0.1088 |
| Fybrel | 1.57 | 0.2893 | 0.2844 | 0.3004 | 0.2876 | 0.1877 | 0.2001 | 0.1645 |
| PLA | 1.68 | 0.2322 | 0.2258 | 0.2563 | 0.2563 | 0.2131 | 0.2131 | 0.1385 |
| Med-Sm Perlite | 2.03 | 0.3365 | 0.3365 | 0.2948 | 0.3093 | 0.2328 | 0.2525 | 0.1346 |
| Med-Lg Perlite | 1.99 | 0.2328 | 0.2525 | 0.2579 | 0.2579 | 0.1577 | 0.1577 | 0.1102 |
| Microspheres | 1.21 | 0.1987 | 0.1955 | 0.2569 | 0.2570 | 0.3377 | 0.3377 | 0.1834 |
| Polypropylene | 1.45 | 0.2132 | 0.2235 | 0.1925 | 0.1804 | 0.1651 | 0.1611 | 0.1305 |
| Sawdust | 1.35 | 0.3022 | 0.3192 | 0.2916 | 0.2715 | 0.1841 | 0.1841 | 0.1917 |

The table below categorizes the data points for each sample containing 25% by weight of the different types of additives.

| | | Heat Transfer Rate Testing of Different Insulating Materials 25% By Weight | | | | | | |
|---|---|---|---|---|---|---|---|---|
| | | Rate of Warming of Surface Furthest from the Hot Plate | | | | | | |
| | Thickness | Test 1 | | Test 2 | | Test 3 | | Average (Thickness Adjusted) |
| Sample | mm | (deg/s) | (deg/s) | (deg/s) | (deg/s) | (deg/s) | (deg/s) | |
| Activated Carbon | 2.33 | 0.2155 | 0.2155 | 0.1970 | 0.1833 | 0.2334 | 0.2215 | 0.0905 |
| Fybrel | 1.31 | 0.1922 | 0.1806 | 0.2094 | 0.1974 | 0.2093 | 0.1960 | 0.1507 |
| PLA | 1.45 | 0.2404 | 0.2320 | 0.2027 | 0.2091 | 0.1965 | 0.1899 | 0.1451 |
| Med-Sm Perlite | 2.5 | 0.2086 | 0.2086 | 0.2339 | 0.2446 | 0.1712 | 0.1712 | 0.0825 |
| Med-Lg Perlite | 2.3 | 0.2055 | 0.2055 | 0.2698 | 0.2675 | 0.2062 | 0.2027 | 0.0983 |
| Microspheres | 1.25 | 0.3524 | 0.3303 | 0.308 | 0.2904 | 0.1969 | 0.1837 | 0.1455 |
| Polypropylene | 1.57 | 0.1823 | 0.1802 | 0.2354 | 0.2425 | 0.2478 | 0.2491 | 0.1417 |
| Sawdust | 2.33 | 0.2425 | 0.2272 | 0.2459 | 0.2459 | 0.1817 | 0.1718 | 0.1195 |

The table below categorizes the data points for each sample not containing a mixed-in additive.

| | Heat Transfer Rate Testing of Different Insulating Materials Other Materials | | | | | | |
|---|---|---|---|---|---|---|---|
| | | Rate of Warming of Surface Furthest from the Hot Plate | | | | | |
| | Thickness | Test 1 | | Test 2 | | Test 3 | | Average (Thickness |
| Sample | mm | (deg/s) | (deg/s) | (deg/s) | (deg/s) | (deg/s) | (deg/s) | Adjusted) |
| Wausau #70 Crepe Paper | 1.18 | 0.1640 | 0.2085 | 0.2681 | 0.2849 | 0.2317 | 0.2337 | 0.1964 |
| Wausau #70 Crepe Paper w/Ridges | 3.48 | 0.2099 | 0.2000 | 0.1460 | 0.1460 | 0.2289 | 0.2289 | 0.0856 |
| Wausau #70 Crepe Paper Double Thickness | 2.96 | 0.1585 | 0.1585 | 0.1567 | 0.1505 | 0.1834 | 0.1834 | 0.1520 |
| Solo Cup | 1.26 | 0.3434 | 0.3172 | 0.2734 | 0.2513 | 0.2577 | 0.2818 | 0.2281 |
| McDonald's Fast-Food, Polystyrene Cup | 2.79 | 0.1729 | 0.1481 | 0.1334 | 0.1116 | 0.1313 | 0.1051 | 0.0479 |
| Sonic Fast-Food, Polystyrene Cup | 2.53 | 0.1833 | 0.1571 | 0.1549 | 0.1376 | 0.1498 | 0.1214 | 0.0595 |
| Chick Fil-A Fast-Food, Polystyrene Cup | 2.08 | 0.2814 | 0.2814 | 0.2770 | 0.2867 | 0.2116 | 0.2114 | 0.1241 |
| Prym Paper | 0.35 | 0.3418 | 0.3418 | 0.3716 | 0.3716 | 0.3119 | 0.3119 | 0.1976 |

Figure 27:
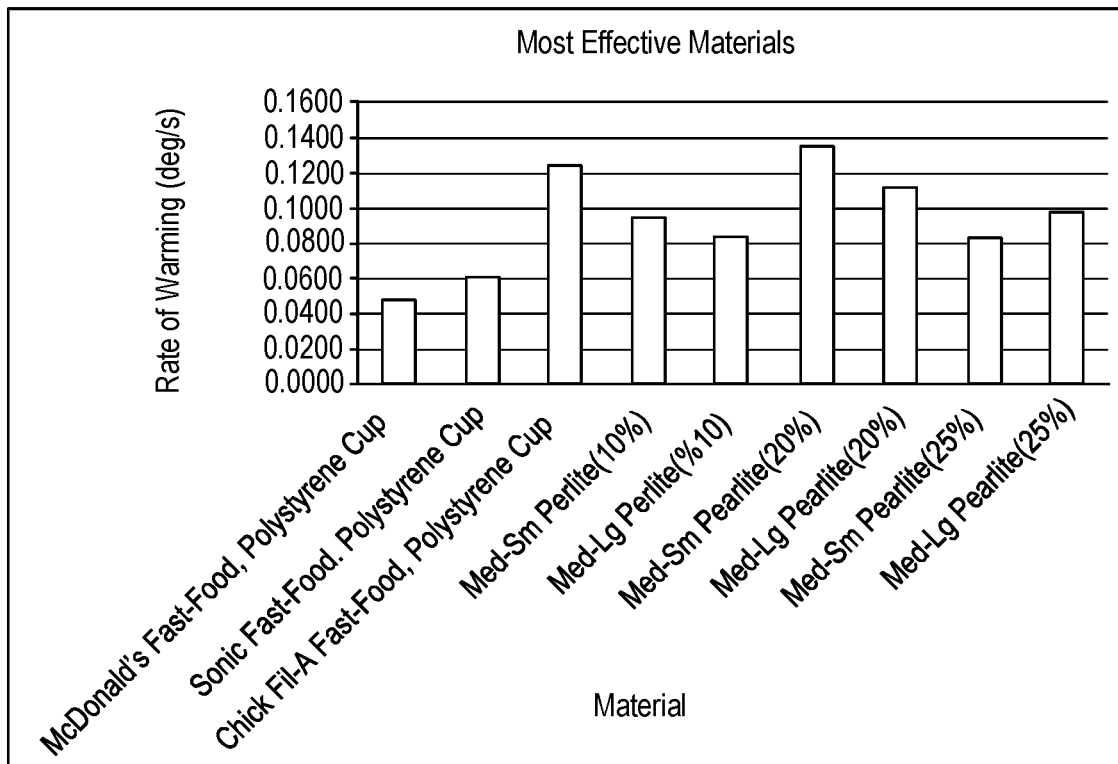
FIG. 27 graphically shows the insulating properties of various polystyrene cups and paper cup samples containing perlite.

FIG. 27 shows the most consistently effective materials at insulating heat were the various polystyrene cups and the paper samples containing perlite. Nearly all of the perlite samples had better heat insulating qualities than the Chick Fil-A cup, and the Med-Lg (10%) sample and the Med-Sm (25%) samples had comparable heat transfer rates to the most effective samples: the McDonald's and Sonic cups.

Figure 28:
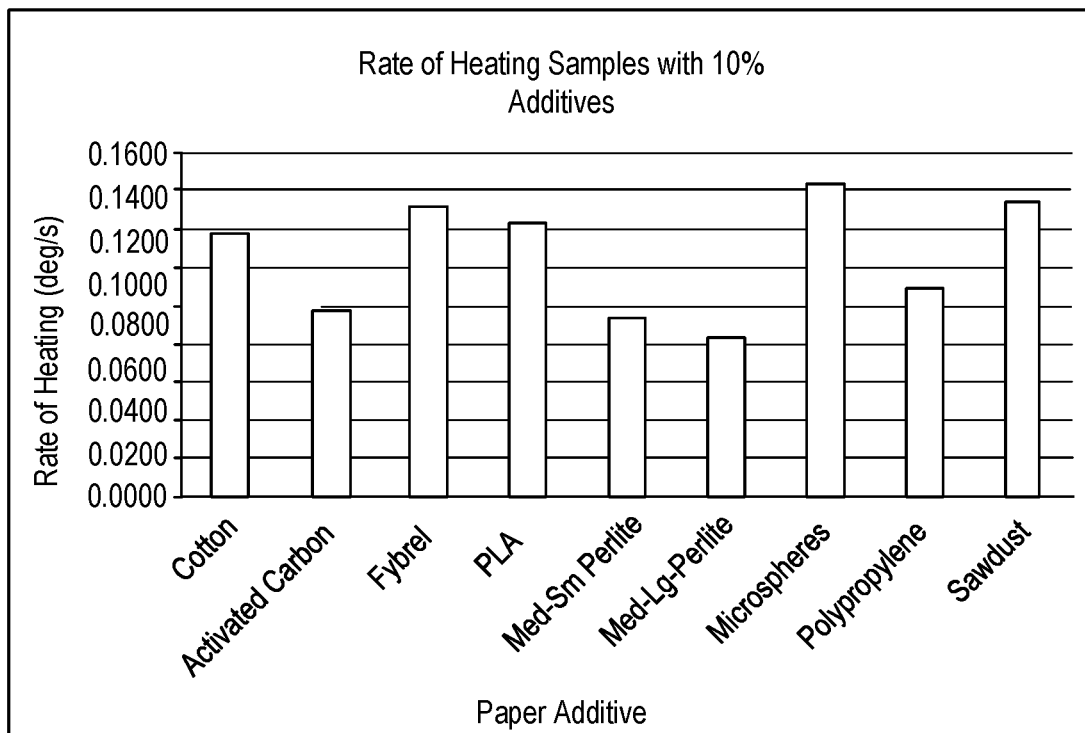
FIG. 28 graphically shows that paper samples with 10% perlite had the most insulating properties relative to paper samples made with any of the other materials tested.

FIG. 28 graphically demonstrates that the paper samples with 10% perlite had the most insulating properties relative to paper samples made with any of the other materials, as both perlite-containing paper samples with varying particle sizes had the smallest rate of heat transfer. This means that the perlite samples retained the most heat, making them good insulators.

Figure 29:
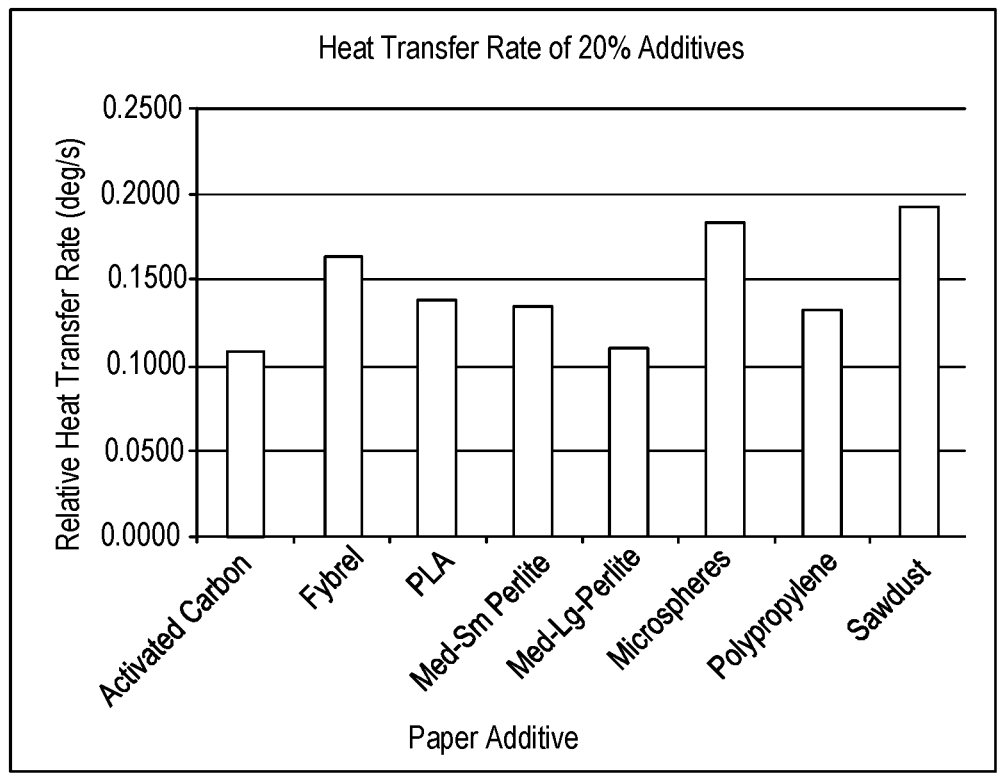
FIG. 29 graphically shows that paper samples with 20% perlite had the most insulating properties relative to paper samples made with any of all the other materials except the activated carbon, which performed slightly better than the perlite-containing paper samples.

FIG. 29 graphically demonstrates that the paper samples with 20% perlite had the most insulating properties relative to paper samples made with any of the other materials except the activated carbon, which performed slightly better than the perlite-containing paper samples in this particular test.

Figure 30:
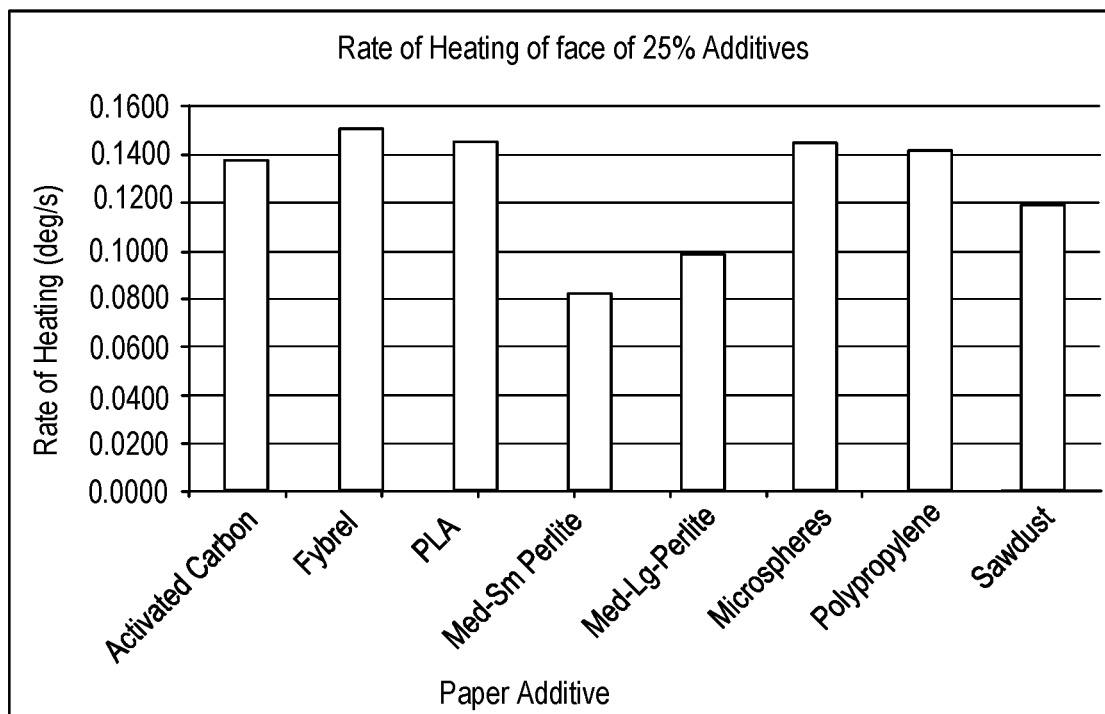
FIG. 30 graphically shows that the paper samples with 25% perlite had the most insulating properties relative to paper samples made with any of all the other materials except for paper samples with activated carbon, which again performed on par with the perlite-containing paper samples.

FIG. 30 graphically demonstrates that the paper samples with 25% perlite had the most insulating properties relative to paper samples made with any of the other materials except for the paper samples made with activated carbon, which again performed on par with the perlite-containing paper samples.

Figure 31:
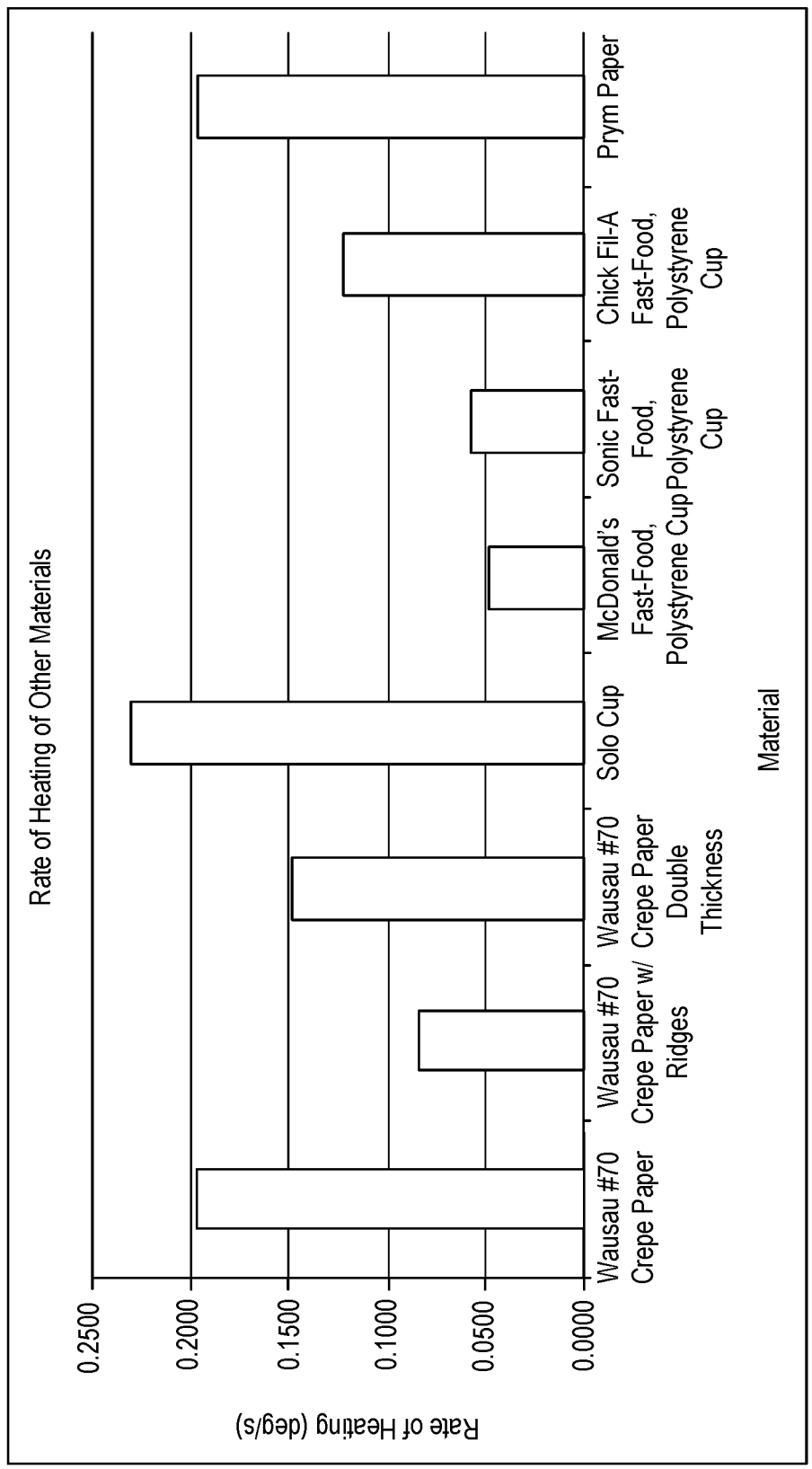
FIG. 31 graphically shows that the polystyrene cups were the most effective insulators out of all the other non-additive materials.

FIG. 31 graphically demonstrates that the polystyrene cups were the most effective insulators out of all the other non-additive materials. In addition, only the perlite samples were able to resist heat transfer as well as the polystyrene cups (slightly worse than the McDonald's and Sonic-sourced cups, slightly better than the Chick Fil-A sources cups).

Figure 32:
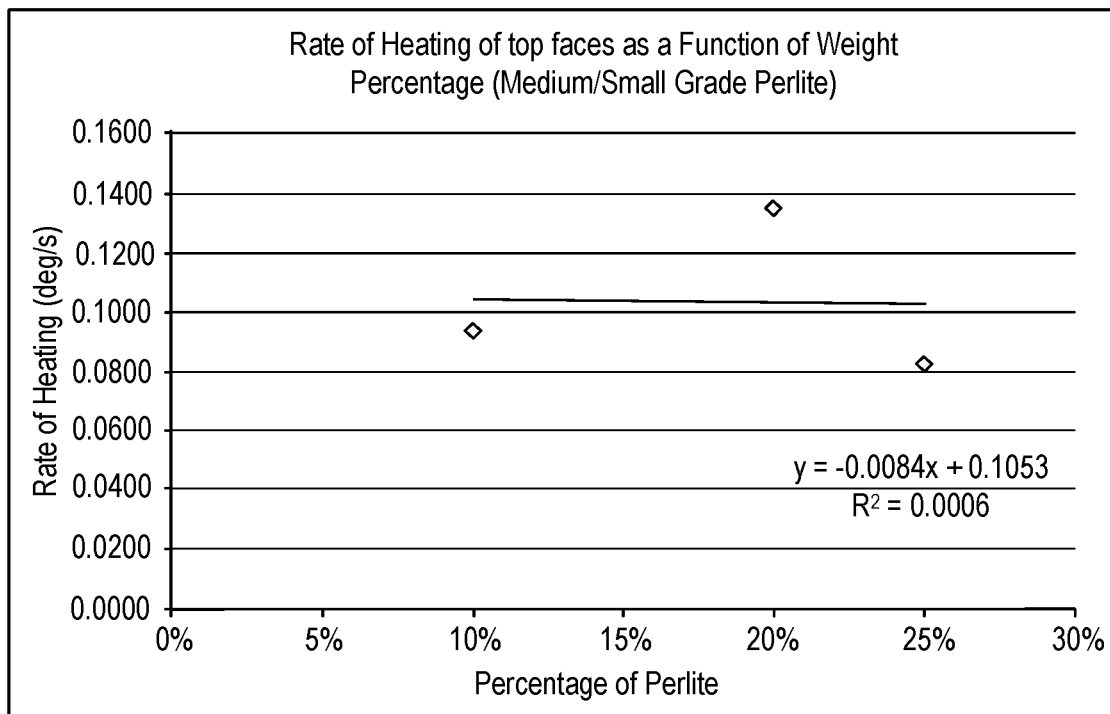
FIG. 32 graphically shows the change in the rate of heat transfer with the addition of perlite with a medium/small grade.

FIG. 32 graphically shows the change in heat transfer rate with the addition of more perlite with the medium/small grade. Note: To establish a trend of any mathematical significance, more data points would be required (i.e., by creating more perlite/paper samples with various weight percentages such as 5 wt %, 30 wt %, etc.).

Figure 33:
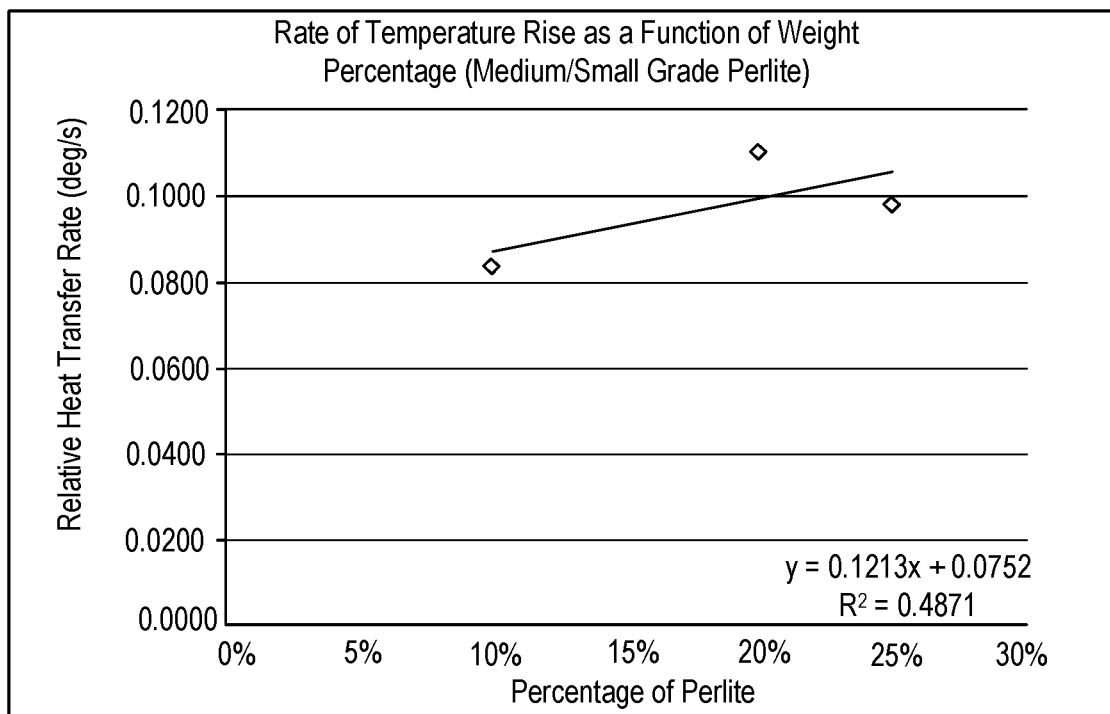
FIG. 33 graphically shows how the effective heat transfer rate changes with an increase in weight percentage of each grade of perlite.

FIG. 33 graphically shows how the effective heat transfer rate changes with an increase in weight percentage of each grade of perlite.

Within each weight-percentage bracket, comparing the paper samples with perlite to those without shows clearly that the perlite adds a noticeable improvement to heat insulation properties. The pair of perlite samples (one with a smaller particle size and one with the larger) were, in all three weight percentages, always among the top three most effective insulators. In comparison to the polystyrene cups sourced from various food vendors, the perlite samples generally performed on par with the polystyrene samples.

Conclusion: When added to a paper mixture, perlite dramatically increases the paper's insulation properties (averaging a heat transfer rate of 0.100 deg/s*mm), making it comparable to the industry standard expanded polystyrene (averaging a heat transfer rate of 0.077 deg/s*mm).

These results suggested that paper-based materials with insulating materials could be formulated to (i) provide highly thermally insulative characteristics, (ii) be able to be repulped, non-polluting, and (iii) be biodegradable and/or bio-destructable.

Example 2. Preparation of Insulated Paper Products

Test Methods:
% Solids Analysis:

A polystyrene disposable weigh boat was accurately weighed to 4 decimal places (tare mass). Approximately 1-2 gram of liquid was placed in the weigh boat, and promptly weighed to four decimal places (gross-wet mass.) Subtracting the tare from the gross-wet mass gives the net-wet mass. The weigh boat was carefully tilted and rocked from side to side, allowing the liquid to coat the bottom of the weigh boat evenly, then it was placed in a cupboard for 24-48 hours to evaporate at room temperature. The dry weigh boat was re-weighed to four decimal places (gross-dry mass) Subtracting the tare from the gross-dry mass gives the net-dry mass.

% solids=100*net-dry/net-wet pH:

All pH measurements were made using universal indicator paper, as supplied by Micro Essential Laboratories Inc. The color of the paper and the chart were compared under indoor fluorescent strip lighting.

Modified Lee's Disk Heat Transfer Rate Test Method

Figure 34:
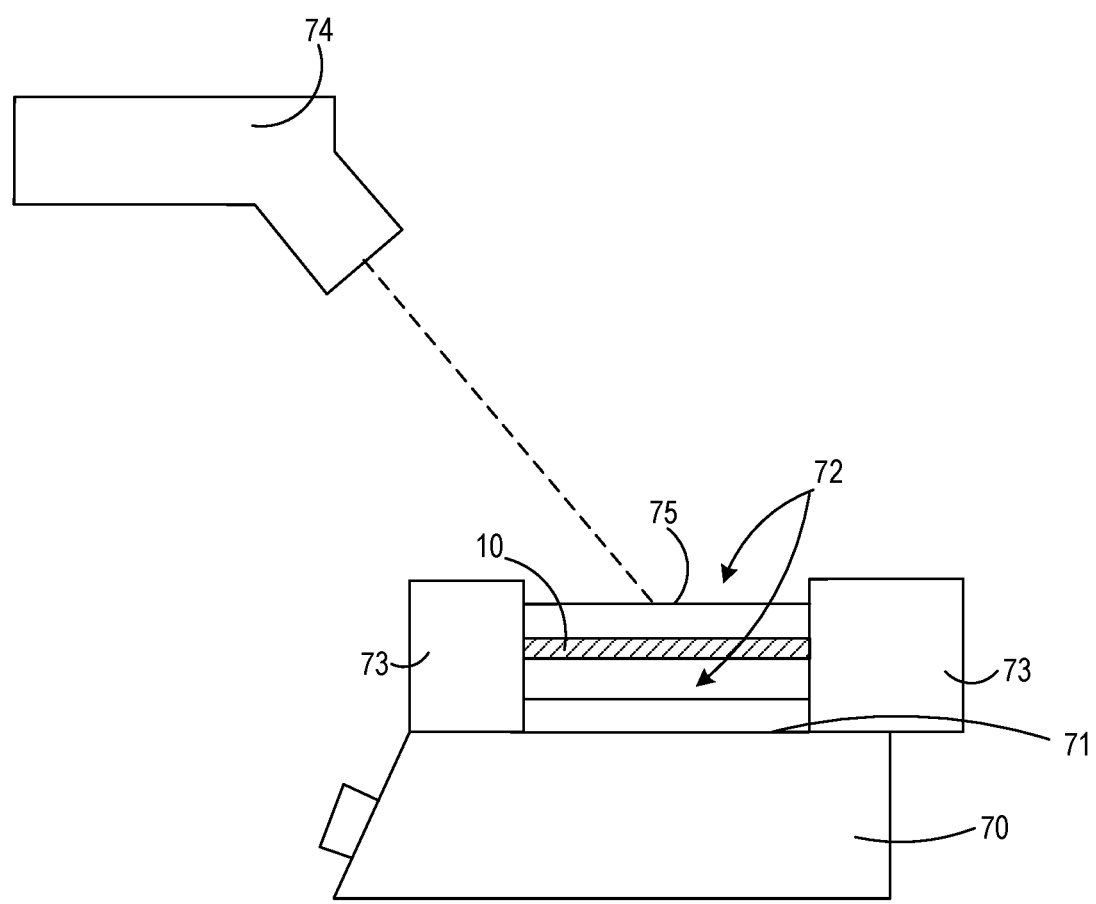
FIGS. 34-35 depict views of an apparatus that may be used to determine the rate of heat transfer of paper samples and/or insulating materials with FIG. 34 depicting a cross sectional view of the apparatus and FIG. 35 depicting an exploded cross sectional view of the apparatus.
Figure 35:
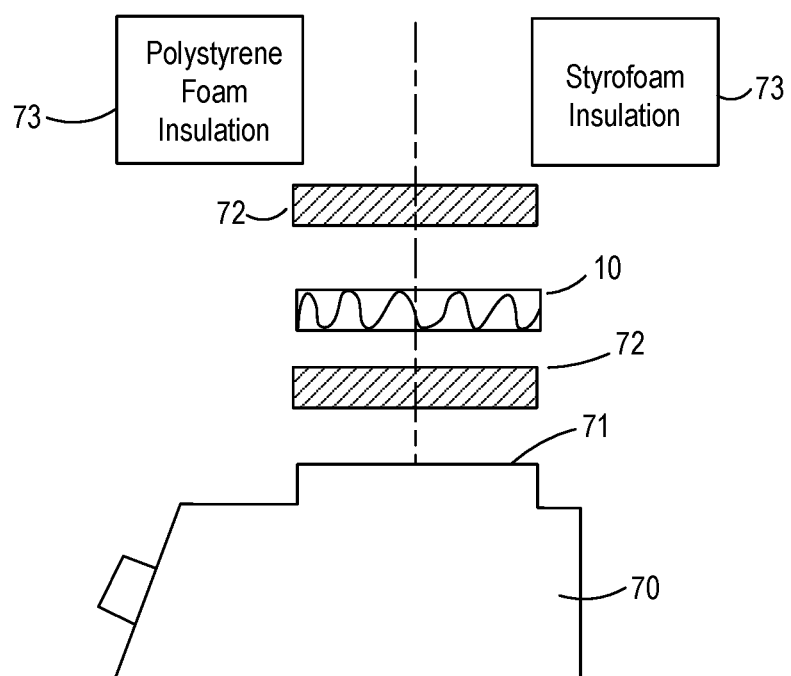

Lee's disk method is a known way to measure thermal conductivity in thin sheets with low conductivity. A modified version of the Lee's disk was used to measure the heat transfer rate of samples generated, assembled using available laboratory equipment, to enable a large number of tests to be conducted in a short period of time. Instead of allowing the materials to reach thermal equilibrium, a digital hotplate was used to maintain a set temperature for one side of the sample. The apparatus is depicted in FIG. 34 (cross section) and FIG. 35 (exploded cross section).

Materials/Equipment Used:

Paperboard sample(s)

Circular cutting device set to cut 113 mm diameter circles (100 cm$^2$)

Calipers

Scientific Balance, accurate to 0.001 g

Digital hot plate 70 that heats to at least 37° C. (98.6° F.) and with a heating surface 71 at least 113 mm in diameter 10× Aluminum disks 72, 113 mm in diameter (100 cm$^2$) and painted matte black on one surface (McMaster 1610T37)

Insulating hot plate guard 73, capable of withstanding temperatures greater than 37° C. (93.6° F.) and constructed to fit the hot plate 70 and the sample stack being used (McMaster 93475K65)

IR Camera 74 & Image Analysis Software (the Flir E-40 Thermal Camera, available from Flir Systems Inc. Goleta Calif.)

Timer

Assumptions:

This test method assumes constant heat flow, and no edge losses or other effects from convection or radiation based heat transfer (all the heat flows through the disks and sample).

Method:

1. Cut 102 mm diameter circular paper samples and label appropriately. Ideally at least three samples can be cut from a single sheet. Five samples are recommended for each datapoint. Measure and record the thickness and weight of each sample using Vernier calipers.

2. Turn on the hot plate 70 and set the temperature to 37° C. Place the Insulating Guard 73 around the hot plate 70. Set one Aluminum disk 72 on the hot plate 70, black side facing up. Once this disk 72 has reached 37° C., sample testing can begin. The temperature can be checked by using the IR camera 74.

3. While the hot plate 70 heats up, allow the other Aluminum disks 72 to sit out and come to room temperature. Measure the room temperature using the IR camera 74, and also use the IR camera 74 to confirm all the Aluminum disks 72 have reached room temperature.

4. When ready to test, in quick succession:

Place the paper sample 10 on top of the hot plate aluminum disk 72

Place a room temperature aluminum disk 72 on top of the paper sample 10, black side up Start a timer for 1 and 2 minutes 5. At the end of one minute, record the temperature of the top black disc 72 registering in the Flir thermal camera 74. After two minutes, once again record the temperature and take an IR image of the top surface 75 of the aluminum disk 72. Remove the top aluminum disk 72 and paper sample 10. Set aside to cool.

6. Repeat steps 4 & 5 until all samples 10 have been tested. If running more than 9 tests, it must be ensured that the aluminum disks 72 cool all the way to room temperature before being reused.

Figure 36:
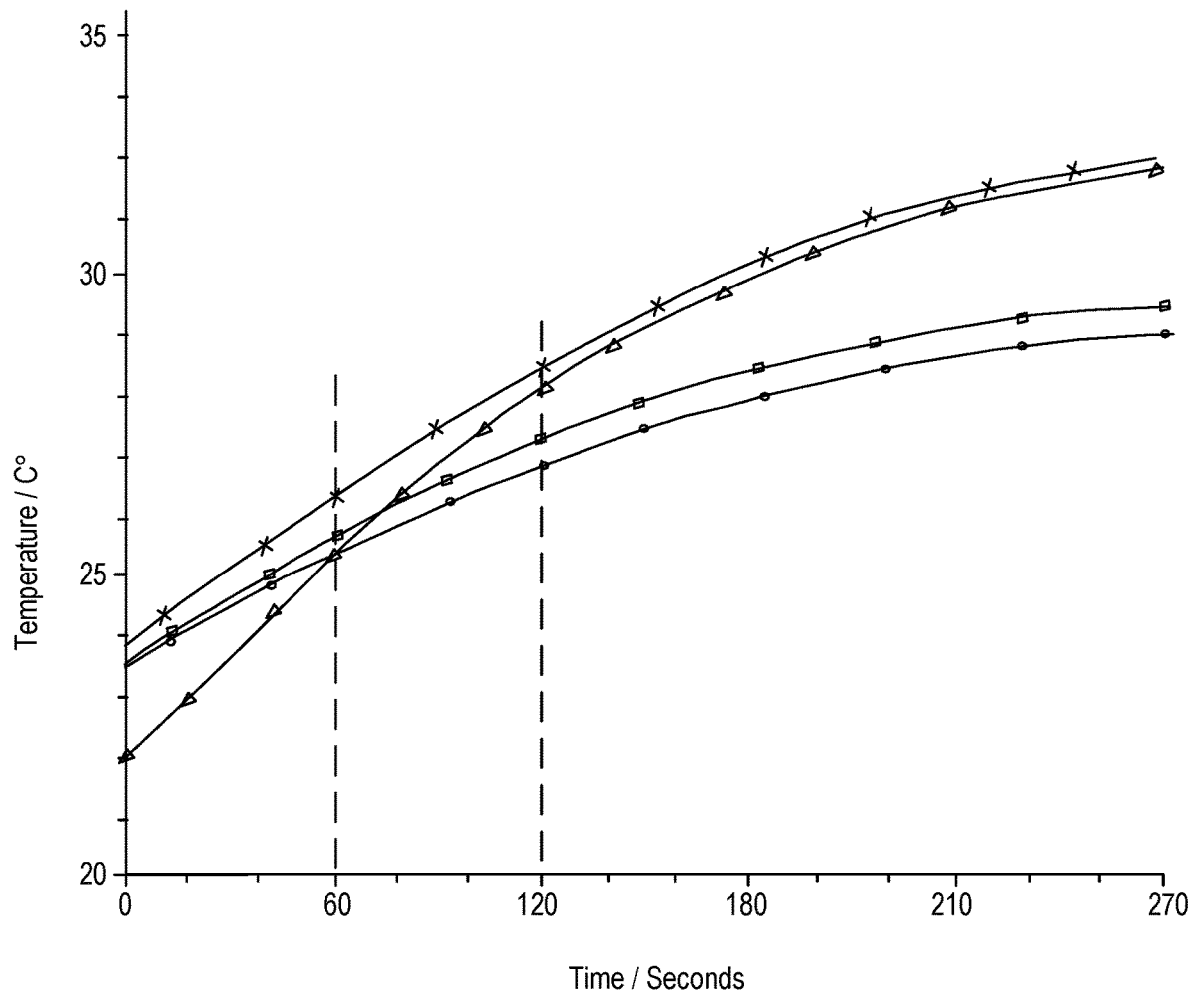
FIG. 36 graphically shows the heat transfer rates of various materials.

Representative warming curves are shown in FIG. 36. The best technical way to approximate the thermal conductivity would be to monitor the temperature rise of the aluminum disk 72 measured over time until the system reached a steady state. The ambient room temperature would have to be taken into consideration too. To allow the inventors to undertake rapid screening, while compensating with variations in room temperature, a snapshot approach was chosen to record the temperature of the aluminum plate 72 via the Flir Thermal imaging camera 74. A first measurement was made immediately after placing the sample 10 and aluminum disk 72 onto the pre-warmed hotplate ($T_0$) 70 and then every 30 seconds for the next 3 mins 30 seconds. The temperature rise after 3 mins and 30 seconds was recorded in ° C. ($T_{3.5}$). The measurement was repeated, ideally 5 times and an average taken.

Delta $T=T_{3.5\ min}-T_0$

As the thickness of the sample also impacts the rate of heat transfer, the average thickness of the samples (d) was used to adjust the average temperature rise measurements over 3.5 mins. A "standard" thickness was chosen based upon a target material thickness ($d_{std}$). The average temperature rise was adjusted using the formula:

Thickness Adjusted Delta $T$ TAD$T=T_{3.5\ min}-T_0*d/d_{std}$.

The TADT is the heat transfer rate and is related to thermal conductivity in that the lower the TADT, then the lower the thermal conductivity of the sample.

Figure 37:
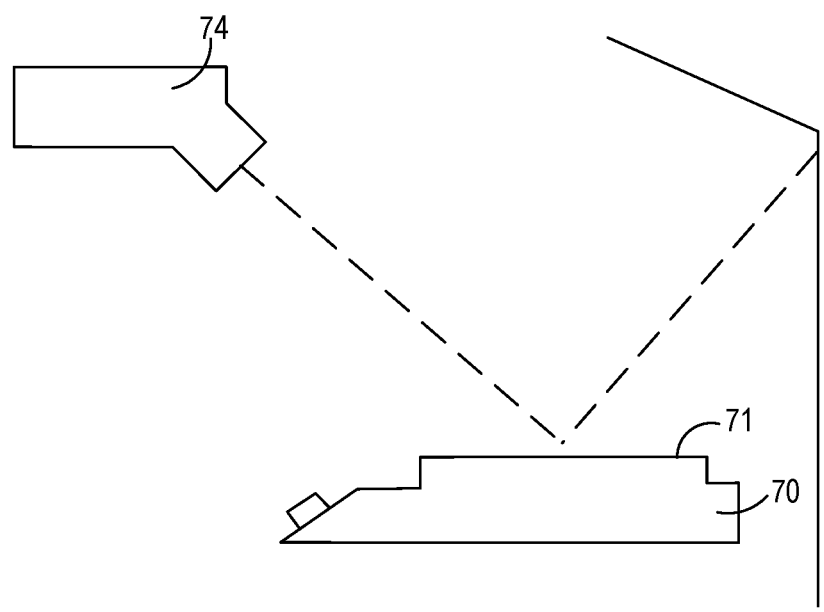
FIGS. 37-39 depict views of another apparatus that may be used to determine the relative emissivity of paper samples and/or insulating materials.
Figure 38:
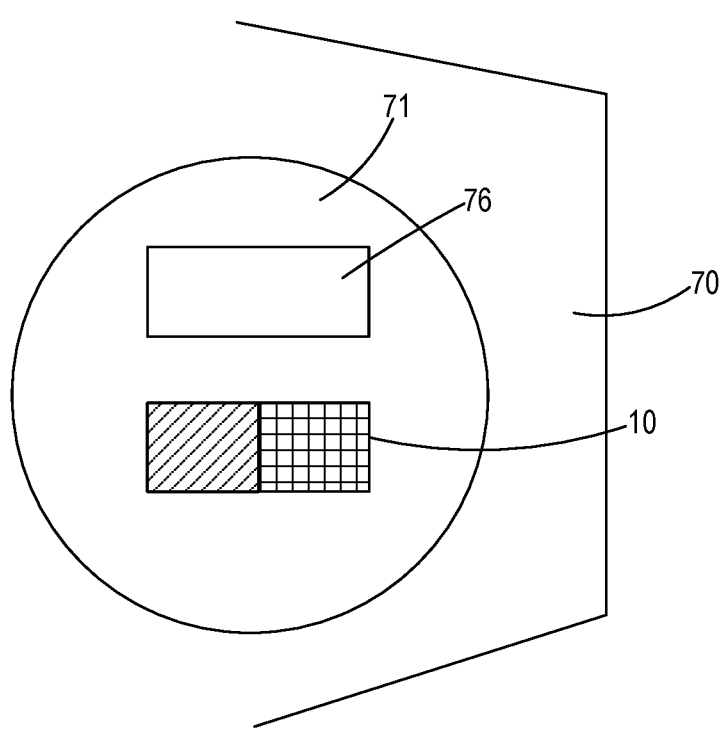
Figure 39:
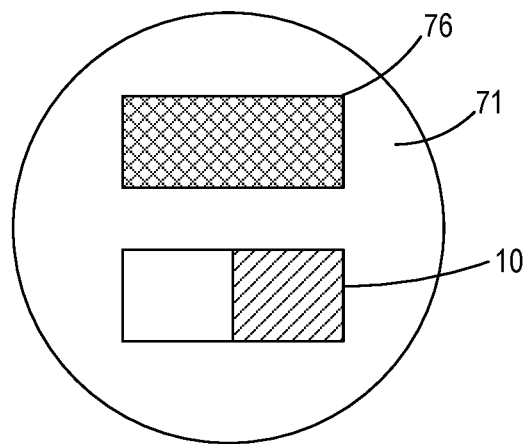

Thermal Emissivity Comparison Method #1 (Via Conduction):

A modified version of Leslie's cube was used to screen multiple materials rapidly. The equipment is depicted in FIG. 37. FIG. 38 shows the view from directly above the hotplate 70, viewing the sample 10 in visible light. FIG. 39 shows the thermal view using the Flir E40 thermal camera 74.

One complication with this test is that it highly thermally insulating materials will skew the results, as the method relies upon conduction of heat from the back to reach the same temperature. So, if the flux of heat traveling through is reduced significantly, then the black painted area will be cooling faster (through radiation) than sample area, leading to a slightly misleading result. For this reason, we developed several other tests to screen materials for emissivity.

Materials:

Paperboard sample(s) 10

Rectangular corrugated strips, 1.5"×3"

Calipers

Digital hot plate 70 that heats to at least 37° C. (98.5° F.) and with a heating surface 71 at least 113 mm in diameter IR Camera 74 & Image Analysis Software
Timer
Polished aluminum strip 76, 0.75 mm thick, 2"×3"
Matte black spray paint (Rust-oleum High Performance Wheel, matte black)
3M Spray Adhesive Assumptions:

This test method assumes constant heat flow, and no edge losses or other effects from convection or radiation based heat transfer (all the heat flows through the sample).

Method:

1. Set the IR camera 74 to have an emissivity value of 0.95, or similar.
2. Turn on the hot plate 70 and set the temperature to 37° C. Once the hot plate 70 has reached 37° C., sample testing can begin. The temperature can be checked by using the IR camera 74.
3. Cut 1.5"×3" cardboard strips. Spray them evenly with 3M aerosol adhesive.
4. Generously sprinkle the material 12 to be testing over the cardboard, then tap to remove the excess.
5. Mask one half of the cardboard with aluminum foil, then spray paint the unmasked half of the sample with the matte black paint. Allow to dry (~45 minutes).
6. Turn on the hot plate 70 and set the temperature to 37° C. Once the hot plate 70 has reached 37° C., sample testing can begin. The temperature can be checked by using the IR camera 74.
7. When ready to test:

Place the corrugated sample on top of the hot plate, painted side up
Place the polished aluminum also on the hotplate as a control.
Start a timer for 2 minutes 8. At the end of two minutes, take an IR image of the top surface 75 of the sample. Remove the cover plate and paper sample.
9. Repeat steps 6 & 7 until all samples have been tested.

Analysis:

Use the thermal images to compare whether the sample is more or less emissive than the shiny or black painted portions.

The portion of the sample painted black has a high emissivity (approx. 0.90), and thus shows up red and displays the correct temperature. The polished aluminum material has a low emissivity (approx. 0.03), and thus shows up blue and displays a lower temperature than the object actually is.

So for this test, one should be able to say whether the emissivity of the test sample is higher, lower, or roughly equal to the emissivity of the black or silver samples.

Figure 40:
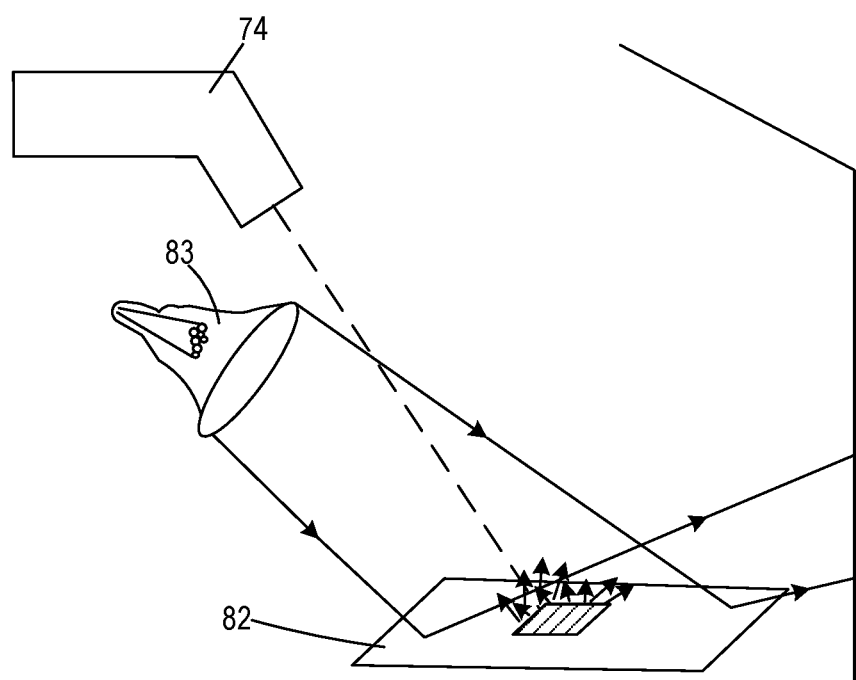
FIG. 40 depicts a view of another apparatus that may be used to determine the relative emissivity of paper samples and/or insulating materials.

Thermal Emissivity Method #2 (By Illumination with an Incandescent Light Bulb):

FIG. 40 shows the test apparatus used to quickly visually compare the thermal emissivity of materials directly from the way that they absorb and then re-emit heat radiated from a hot-filament light bulb 83. Samples were mounted onto a shiny metal plate 82. Half of the sample was sprayed with mat black paint, and half was left exposed. All paint and adhesives used were allowed to dry at room temperature for at least 40 minutes. The camera 74 was switched on, and the spotlight was shone onto the samples from a low angle, so that stray heat radiation reflected away from the thermal camera 74. Immediately, black and high emissivity materials lit up in the thermal camera screen, as the absorbed heat and then re-emitted it back out in all directions—including towards the thermal camera 74.

Materials with low emissivity were generally much darker in color, after illumination for a few seconds.

Thermal Emissivity Method #3 Recommended by Flir Systems Inc.:

The following procedure was found it the Flir E40 manual, to give an actual emissivity number. Method #3 is as follows:

Step 1: Determine the reflected apparent temperature. This is needed to compensate for reflected ambient radiation sources, reflecting from your sample. Here are the steps:

i) Scrunch up a sheet of aluminum foil into a ball, and then uncrumple it.

ii) Attach this to a sheet of card of the same size.

iii) Put the cardboard in front of the object to me measured, with the foil pointing towards the camera 74.

iv) Set the internal camera emissivity setting to 1.0.

v) Record the apparent temperature of the aluminum foil

Step 2: Measuring the thermal emissivity:

vi) Adhere a strip of black electrical tape to the sample.

vii) Warm the sample up to at least 20° C. warmer than the ambient temperature.

viii) With the camera 74 pointing to the tape, change the emissivity setting to 0.97 and use one of the on-screen temperature measurement selection tools to measure the temperature of the tape.

ix) Move the temperature measurement tool to the sample surface without the tape. Now, change the internal emissivity setting until the measured temperature matches that of the insulating tape.

x) Record the emissivity of the sample.

Thermal Emissivity Test Method #4:

Thermal emissivity of certain samples was also tested by Thermophysical Properties Research Laboratory, Inc. of West Fayetteville Ind. using the following test methodology.

The Table Top Emissimetry apparatus measures total normal emissivity over a broad wavelength band. Thin, square samples, 0.5" on a side are mourned facing downward on an isothermal copper block heated by a resistance heater and surrounded by ceramic insulation. Five type-K thermocouples are mounted on the bottom face of the isothermal plate. Sample temperatures during emissivity measurements are inferred from the closest thermocouple. The samples are exposed to ambient air with convection losses minimized by the face-down orientation of the samples and the small gap to the detector head.

The IR detector is a broadband thermopile with a 1 mm diameter sensitive area and flat spectral response from 1-40 micrometers. The detector and radiation shield are water cooled and view the sample through a 3.56 mm aperture 5 mm from the sample surface. The detector is sensitive to radiation from an approximately 4.57 mm diameter spot on the sample. Stray radiation on the detector is minimized by a flat optical black coating on the inner surface of the shield and both faces of the aperture plate and by cooling the shield and aperture plates. The shield temperature is monitored by two type-K thermocouples embedded in the shield walls.

Thermocouple and detector voltages are fed to a A/D module and attached to a personal computer. The emissivity c is calculated by the equation:

$$\epsilon = \frac{\epsilon_{shutt}(T^4_{shutter} - T^4_{shiel}) + S\epsilon_{blkbody}(T^4_{blkbody} - T^4_{shie})}{(1+S)(T^4_{sample} - T^4_{sensor})}$$ where:

$$S = \frac{(V_{sensor} - V_{shutter})}{(V_{blkbody} - V_{sensor})}$$

and V is the detector voltage, T is the temperature measured in Kelvin. The subscripts are as follows:

$T_{shutter}$ is the temperature of the shutter.

$T_{shield}$ is the temperature of the infrared detector when the shutter is in place.

$T_{sensor}$ is the temperature of the infrared detector during measurements.

$T_{blackbody}$ is the temperature of the standard blackbody used to calculate the unknown values.

$T_{sample}$ is the temperature of the sample using the thermocouple nearest the sample.

$V_{shutter}$ is the voltage from the infrared detector when the shutter is in place.

$V_{blackbody}$ is the voltage from the two black body readings taken.

$V_{sensor}$ is the voltage of the infrared detector from each sample.

$\epsilon_{shutt}$ is the emissivity of the shutter at the temperature when read ($\in=0.09$)

$\epsilon_{blkbody}$ is the emissivity of the blackbody standard ($\in=0.95$)

$\in$ is the emissivity of sample.

In operation, power to the heater is adjusted by a computer controlled Eurotherm temperature controller to achieve a desired plate temperature and the system is allowed to stabilize. The detector is aligned with the sample to be viewed and its output voltage recorded. All samples on the isothermal plate are maintained in a constant radiation and convective heat transfer environment as the X-Y table is moved by the extended insulation block surrounding the detector head. Measurement of an oxidized copper reference standard with $\in=0.96\pm0.01$ and a closed aperture measurement are made before and after each sample suite at each temperature. Total hemispherical emissivity is estimated from total normal/total hemispherical relationships developed for metals and insulators. The current temperature range covered is from room temperature to around 150° C.

Expanded Polystyrene Cooler Window Test Method

This test was devised to measure the amount of heat flowing through a given sample, as if it were placed in direct sunlight on a hot day. While a steady-state test would be ideal, the inventors sought methods to make rapid assessments of thermal properties for further research. While not wishing to be limited by theory, this test combines both emissivity (absorption of radiative heat) and conduction to give a measure of the amount of heat passing through a given sample.

Figure 43A:
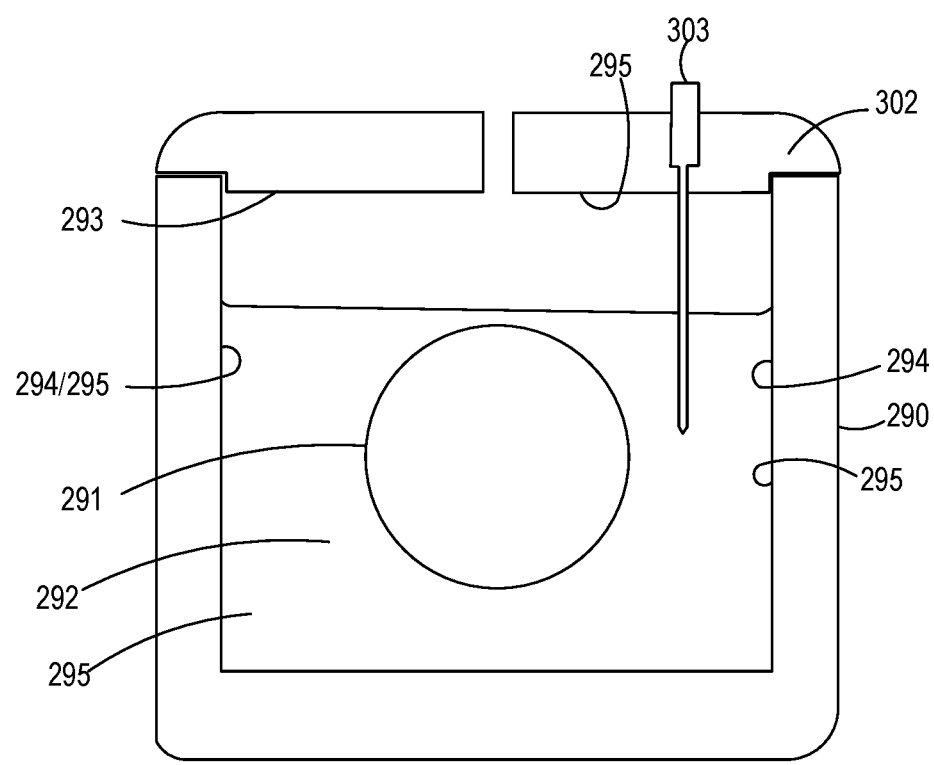
FIGS. 43A and 43B depict views of an apparatus that may be used to determine the rate of heat transfer of paper samples and/or insulating materials with FIG. 43A depicting a cut-away view of modifications to an expanded polystyrene cooler including dimensions, as well as positioning of the window through the cooler wall, and FIG. 43B depicting a cross sectional view of the test apparatus.
Figure 43B:
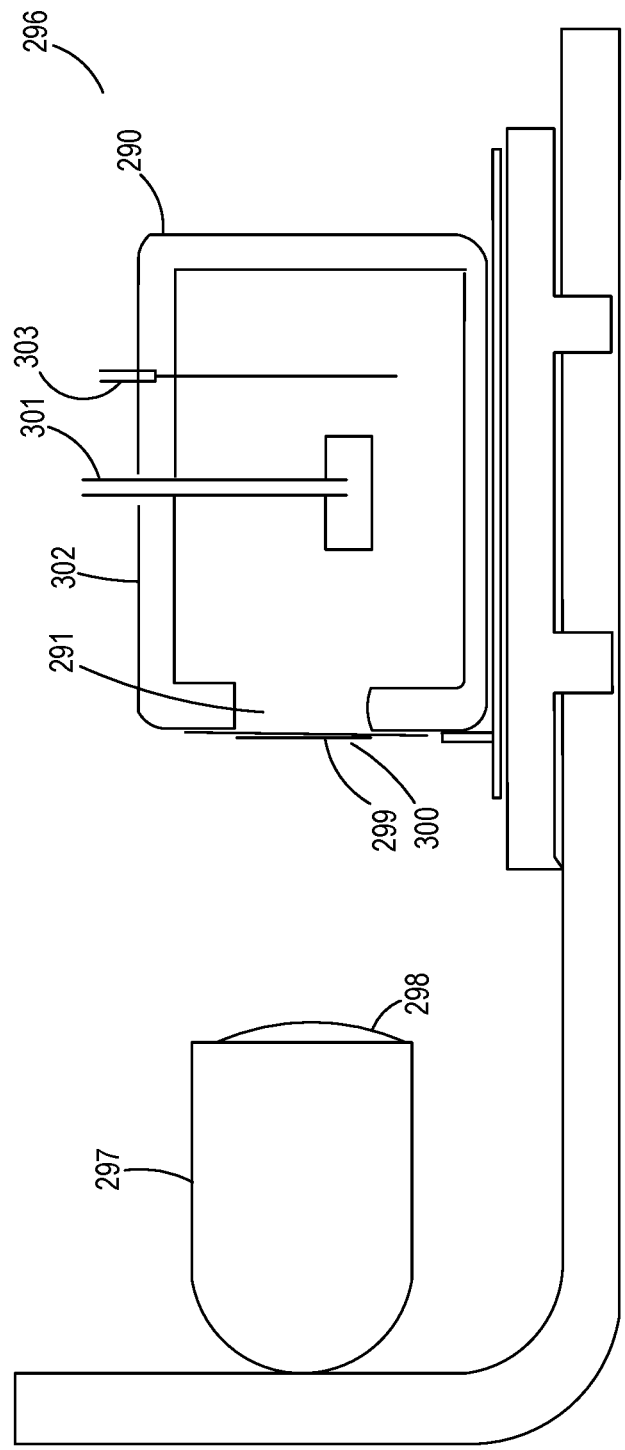

Approximately 5 US gallons of Atlanta city water was placed into a 6 gallon bucket and sealed with a lid to equilibrate to room temperature for at least 24 hours. Expanded polystyrene coolers 290 were purchased from Uline (Pleasant Prairie Wis.) (part number S21529), inside dimensions: 8"×6"×7", wall thickness 1.5", and outside dimensions 11"×9"×10". A 100 mm diameter acrylic circular template was used to draw a circle 291 on one of the 11"×9" faces 292 of the cooler 290. The circle 291 was positioned 60 mm from the top 293 of the cooler 290, and 88 mm from either side 294/294, as shown in FIG. 43A-43B. The circle 291 was carefully cut out using an electrically heated hot knife (e.g. RoMech Pro Hot Knife Kit 200 W Styrofoam cutter, made in China).

Two part liquid silicone compound was mixed and used to seal the inside of the insulated cooler 290 by painting the inner surfaces 295. The silicone resin (for example, Diamond Driven Liquid. Silicone Compound, available from Amazon.com, or Oomoo 30 Silicone Mold. Making Rubber available from Amazon.com, or Smooth-On Ecoflex 00-35 fast platinum cure silicone rubber compound kit, available from Smooth-On through Amazon.com, or RTV Silicone Rubber for Mold Making available from Specialty Resin & Chemical LLC, Dowagiac Mich., or similar) was allowed to cure overnight. The following day, excess silicone resin was cut from the exterior of the cooler 290 in the vicinity of the cut circular hole 291, to ensure bondability between the expanded polystyrene and the sample. Although silicone resins were used, it was also found that epoxy resins could alternately be used to waterproof seal coolers 290 without destroying the expanded polystyrene structure.

Sample preparation: Coatings were made onto 35 lb per 1000 sq ft (35 MSQ or 170 gsm) kraft board using meyer rods and dried. Example board is available from Juvo Plus Inc. (Irwindale Calif.) in the form of "200 pack kraft laser and ink jet printer post cards 2 up per page" SKU LJ-WA-CHG-031218-11-1. This paper was selected as it proved to be a more consistent source of kraft fiberboard than obtaining samples of 35 lb MSQ liner board from various corrugated board manufacturers. In some tests, the kraft fiberboard was substituted with a sheet of paper containing fillers, or thermal insulation elements or other materials that the inventors wished to assess, such as metallized bubble wrap.

Aluminum foil (e.g. Glad® Heavy Duty Aluminum Foil, distributed by Phoenix Industries Inc Denver Colo., and available in grocery stores) was cut into sheets which were sprayed black on the dull side, using matt black spray paint (e.g. Rust-Oleum® Painter's Touch 2× Ultracover Paint+ Primer, Rust-Oleum Corporation, Vernon Hills Ill.) and allowed to dry. The acrylic 100 mm diameter template was then used to mark and cut circular samples of coated kraft board. The back (kraft paper) sides of these were then sprayed with an adhesive such as 31M® Super 77™ Multipurpose Adhesive, made by 3M Company (Minneapolis Minn.) and sold in many craft, office, and hardware stores. The discs were carefully bonded to the shiny side of the painted foil, and placed between paper sheets under several books (about 1 kg pressure) until dry, to maintain flatness of the sample. The foil sheet was trimmed so that approximately 0.5" to 1" of shiny foil remained surround the each sample.

3M® Marine Adhesive Sealant Fast Cure 4000 UV (part #05280) was then used to carefully adhere the black surface of the foil-sample composite to the outside of the cooler 290, so that the sample was in line with the opening 291 into the cooler 290. Other sealants could be used provided that they bond to both painted foil and expanded polystyrene, do not destroy expanded polystyrene by partially dissolving it, and that they form a waterproof seal. This was then allowed to cure overnight.

The cooler 290 with the sample window was placed on the test rig 296 built and illustrated in FIG. 43B. The test rig 296 allows the repeatable location of the test window in front of the 110V 250 W tungsten filament heat lamp 297 such as those used in restaurants to keep prepared food hot prior to serving (e.g. Intertek 5000707, white incandescent tungsten heat lamp). The test rig 296 shown in FIG. 43B includes adjustment of angle of incidence and distance from the surface 298 of the lamp 297 to the center 299 of the test material 300. 4,500 g of water that had been allowed to equilibrate to room temperature was weighed to the nearest gram (using a Philips® Essence kitchen electronic top pan scale 1 g increments to 5 kg capacity) and poured into the cooler 290. The stirrer blade 301 was inserted through the lid 302, and a digital thermometer probe 303 was also inserted through the lid 302. A strobe light (not shown) was used to time the rotation of the stir blade 301 to 600 rpm.

The water was stirred for several minutes until the temperature stabilized, at which time it was recorded. A timer was set for 15 minutes. The heat lamp 297 was switched on, and the timer (not shown) started simultaneously. The temperature of the water in the cooler 290 was recorded every 15 minutes for one hour.

All tests were conducted in an air conditioned temperature controlled environment with an air temperature between 68° F. and 71° F. Positive control sample was a kraft disk that also had a layer of aluminum foil laminated to it before adhering to the shiny side of black painted foil, and a negative control consisted of an uncoated kraft disk mounted onto a similar foil sheet. The temperature rise (DT) over one hour was used to determine the amount of energy (Joules) flowing through the coated kraft board 300 per unit time (Watts) using the equation:

$$E(\text{Joules}) = 4.2 * DT * 4500$$

where 4.2 is the specific heat capacity of water in $J \cdot K^{-1} \cdot g^{-1}$; and 4500 is the mass of the water present in the container. Rate of energy transfer into the water Watts (ER) through the window 291 is calculated by dividing by the number of seconds in one hour, viz.:

$$ER = E/3600 \text{ Watts}$$

As the surface area of the disc 300 is known, then the energy flux Watts per square meter can also be calculated ($W \cdot m^2$)

In some experiments, an infrared thermometer (Etekcity Lasergrip 1025 D) (not shown) vas also used to measure the outside temperature of the disk 300, to give an approximation of the temperature difference over the thickness of the sample.

Cardboard Corrugated Box Performance Testing:

The five specifications listed below for each of cool and frozen food are desired criteria for a successful product.
Cool Food performance: Compliant with ISTA test TNPK-001 using "Heat" profile, which in summary is as follows:
  23° C./734° F. Ambient temperature
  Box is 12"×10"×7"
  Product: 900 g 2 lbs of Cooked Pork (or simulant)—packed at 2° C./35.6° F.,
  1800 g/4 lbs of Gel Paks: 1 lb each, conditioned to −20° C./−4° F.
  Temperature of the product remains below 8° C./46.4° F. after 10 hours at ambient.
Frozen Food performance: Compliant with a modified ISTA test TNPK-001 using "Heat" profile, which in summary is as follows:
  23° C./73.4° F. Ambient temperature
  Box is 12"×10"×7"
  Product: 900 g/2 lbs Frozen cooked pork (or simulant), conditioned to −20° C./−4° F.
  Gel Paks: 1800 g/4 lbs of gel packs (1# each), conditioned to −20° C./−4° F.
  Temperature of the product remains below 0° C./32° F. after 10 hours at ambient.

% Ash Content:

These tests were carried out by SGS Integrated Paper Services Inc., Appleton Wis. according to TAPPI T 211 om-16 Ash in wood, pulp, paper and paperboard: combustion at 525° C. Approximately 10.0 g of paper was accurately weighed, and then ached in a muffle furnace at 525° C. The remaining ash was then re-weighed to determine ash content.

% Moisture:

These tests were carried out by SGS Integrated Paper Services Inc., Appleton Wis. according to TAPPI T 550 om-13 Determination of equilibrium moisture in pulp, paper and paperboard.

Repulpability:

Repulpability was tested by SGS Integrated Paper Services Inc., Appleton Wis. according to the "Voluntary Standard for Repulping and Recycling Corrugated Fiberboard treated to Improve It's Performance in the Presence of Water and Water Vapor Protocol of 2013", generated by the Fiber Box Association, headquartered in Elk Grove Village, Ill., 60007. Repulpable means the test material that can undergo the operation of re-wetting and fiberizing for subsequent sheet formation, using the process defined in this standard. In the repulpability test, materials are weighed, pulped in a specific manner using laboratory equipment, run through a laboratory disintegrator, and then run through a screen. The amount of rejected material is compared to the material that could be reused as pulp to make board as a % by mass. Two figures are derived: The first is the acceptable recovery of the fiber based upon the mass of material first entered into the test, and the second is the percentage of the recovered fiber that is accepted, not rejected. These figures constitute the "% re-pulpability", and the fiber box association has determined that a pass for both measures of repulpability is >85%. Other parameters recorded are: a) material fouling the equipment during pulping or forming b) material that does not disintegrate and has to be removed (becomes part of the rejects)

Adhesive Bonding/Pin Adhesion and Ply Separation Test:

This is an important test to ensure the strength of the bonds between the flutes and the liner board, which in turn relates to the integrity and strength of the box structure. A jig is used, with pins that fit between the corrugated flutes. The stress force needed to separate the layers of the corrugated card is measured. The Fiber Box Association has several tests for this bond strength.

Pulp Preparation Method—from 35# Unbleached Liner Board:

Unbleached 35-lb liner board (available from International Paper) was cut into 8.5"×11" sheets. These were then cut in half, making 8.5"×5.5" sheets, weighing approximately 5.35 g. These were fed through an office cross-cut shredder and placed into a 1 quart mason jar (Ball). Boiling water was poured over the shredded paper (approximately 800 ml) and this was left to soak for at least 10 minutes. The paper wetted out, as evidenced by it changing to a darker brown and sinking to the bottom of the jar.

The wetted out shredded paper was placed into a kitchen blender (Black+Decker, 10 speed, model number BL2010BPA) and blended at the highest speed. Blending took around 2-4 minutes, until the pulp appeared to me homogeneous, and poured without back into the jar without lumps.

If other materials, such as insulating elements are to be added to the finished pulp, it is done so as follows. The mason jar of pulp was opened. A laboratory mixer blade was lowered into the jar and a variable frequency drive was used to run the stirrer motor to give a controlled stirring. Additives were added to the pulp jar. After the final material was added, the pulp was further stirred for an additional 5 minutes.

Pulp Preparation Method—From Bleached Recycle Pulp:

Grade 100 bleached pulp secondary fiber was supplied by Donco Recycling Solutions (with offices in Chicago Ill.) This pulp contained approximately 50% solids and 50% water. The fiber content was a blend of pre- and post-consumer fiber, sourced from PE-lined milk cartons, as well as pre-consumer paper scrap and pre-consumer PE-Lined paperboard carton material. The target specification for the pulp fiber was as follows: 9.050 g+/−0.050 g was placed into a 1 quart mason jar (Ball). City water was poured over the pulp (approximately 800 ml) and this was then poured into a kitchen blender (Black+Decker, 10 speed, model number BL2010BPA) and blended at the highest speed for 1 minute.

If other materials, such as insulating elements are to be added to the finished pulp, it is done so as follows. The mason jar of pulp was opened. A laboratory mixer blade was lowered into the jar and a variable frequency drive was used to nm the stirrer motor to give a controlled stirring. Additives were added to the pulp jar. After the final material was added, the pulp was further stirred for an additional 5 minutes.

Figure 41:
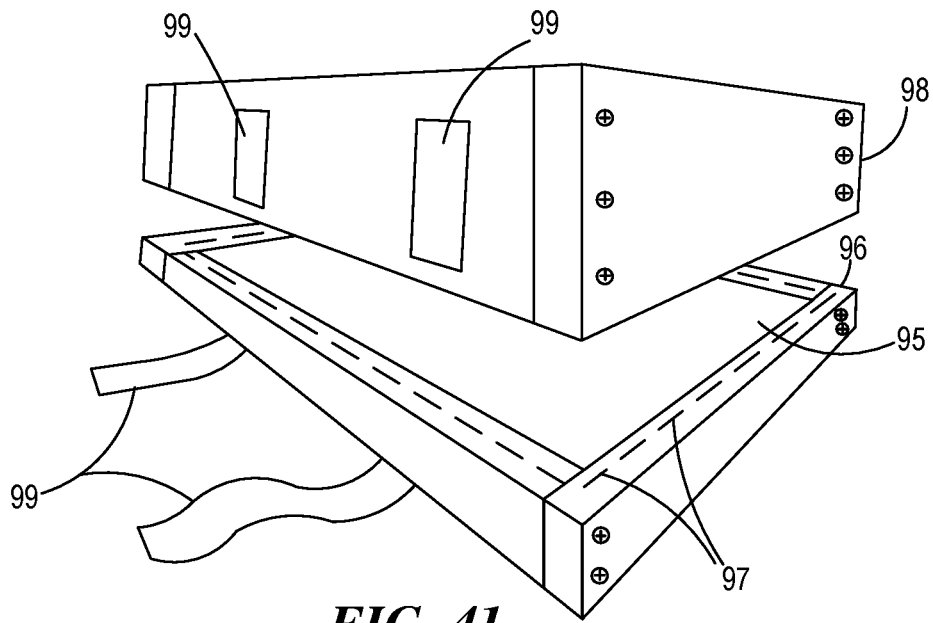
FIG. 41 depicts a view of an apparatus that may be used to form a paper sheet.
Figure 42:
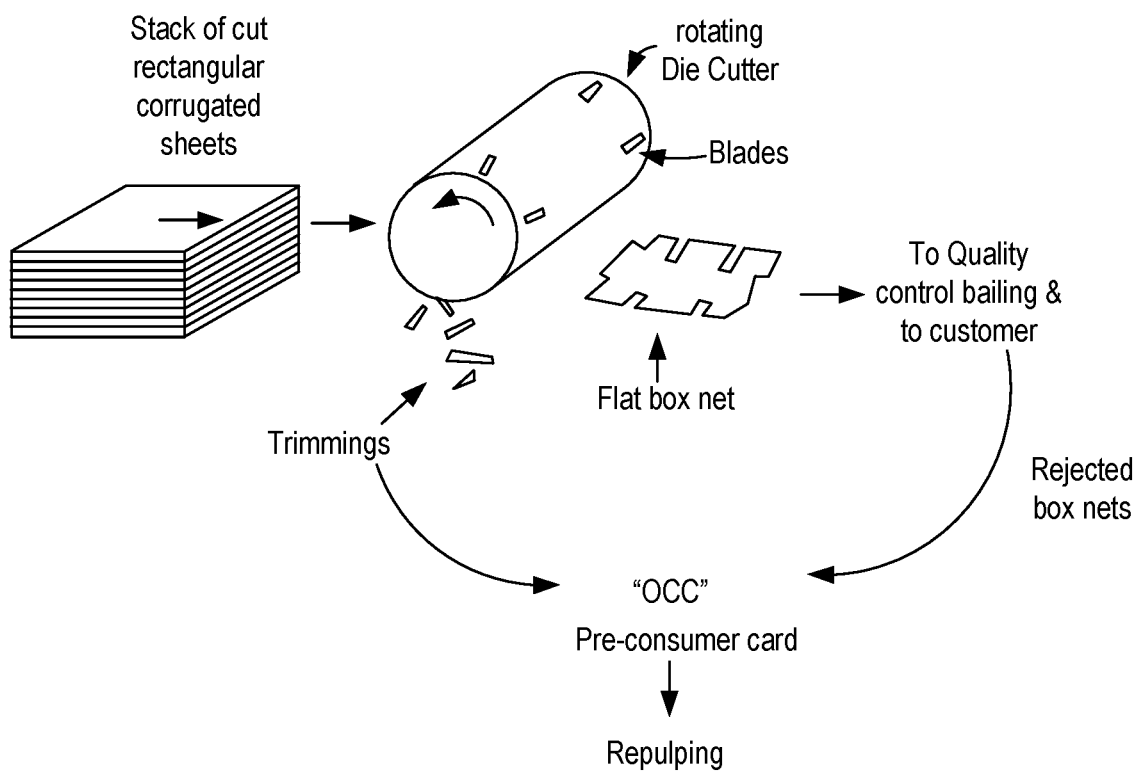
FIG. 42 depicts a schematic view of known processes for forming boxes from a rectangular corrugated sheet with waste (e.g., trimmings and defective boxes) generated from the process.

Handsheet Paper Formation Method:

As shown in FIG. 41, a mesh screen 95 was held taught and mounted onto a square wooden frame 96 using staples 97. A second wooden frame 98 around 4" tall attached on top of the mesh screen layer 95, via hook-and-loop Velcro® straps 99. A large tub was partially filled to around 4" depth with water, and the screen 95 strapped to the frame 96/98 was submersed into the tub. The inside of the frame 96/98 now contained water.

The fresh pulp formulation was poured into the center of the frame 96/98, and the furnish was "hogged". Hogging is a process whereby the hand is lowered into the frame, while it is still filled with water and pulp, and agitated near the top of the screen. This helps ensure even distribution of fiber in the hand sheets.

The frame 96/98 including the attached screen 95 was removed from the tub and held level to even allow drainage and distribution of the fibers. This process is known to paper crafters as "pulling". Pulling is analogous to the wet end process shown in FIG. 8A. Once no liquid was visible, the assembly was tilted to allow residual water trapped between the screen frame 96/98 and the box frame to also escape, otherwise it may flow back over the new paper sheet forming, and destroy the even surface. The pulp, still containing much moisture, is now ready for "couching".

In a separate shallow tub (not shown), layers of thick non-woven PET felt were wetted and stacked. Additional wetted felt sheets were available to place on top of the newly formed sheet. The larger box frame 96/98 was removed from the screen holding the partially formed paper. In one smooth rolling motion, the screen frame was inverted, pressed onto the top layer of wet felt, and the screen lifted off, leaving the pulp behind on the felt. This process is known to paper crafters as couching. In a production environment, it is analogous to the felt press process of FIG. 8B.

For two or more ply samples, the process was repeated, pulling and couching more layers of partially formed paper to build the paper sheet in layers. Once the desired sheet thickness was reached, after couching the last layer, a small paper label was placed in the corner, identifying the sheet sample ID, and a second sheet of moist felt was placed on top of the paper sheet. The next sheet for the next sample was then couched on top of the pile of nonwoven and paper, to form a stack.

The stack of papers was placed in a press. A hydraulic jack was used to apply pressure, expressing water from the stack. This process is analogous to further felt presses on the production line (FIG. 8B). The stack of pressed paper was separated, with each sample sheet placed between two felt sheets. Each of these sandwiches were stacked between sheets of corrugated card. The flute direction of the corrugated sheets was aligned in one direction in the stack, allowing air movement through the stack. The stack was weighed with 10 lbs of weight, placed in front of a box fan, and left to dry for 24-48 hours at ambient temperature.

Coating Method:

A clip attached to a ¾" thick glass plate is used to hold a stack of photocopy paper and the sheet of paper to be coated. A strip of masking tape was placed along the top of the sheet to be coated, and a paper towel was left hanging off the end. A transfer pipette was used to make a line of coating on the masking tape. This prevented the coating from prematurely soaking into the paper board to be coated. Meyer rods (available from RD Specialties Inc.) were used to draw the coating down over the sheet. The coating was then dried under ambient conditions.

Wetting Out and Stabilization:

Before materials can be included in a coating or into the fibrous matrix of paper, materials first have to be wetted out and dispersed. Some materials such as glass have high enough surface free energy that the wet out spontaneously whereas materials such as perlite and aerogel require surfactants to lower the surface free energy of the water enough to wet out the material.

Surfactants may be non-ionic, cationic, or anionic. They may be high molecular weight polymers or copolymers, or they may be low molecular weight, and able to reach newly created interfaces rapidly. Surfactants for aqueous systems may be characterized by their HLB value. HLB stands for Hydrophilic-Lipophilic Balance, and is a measure of the capability of the particular surfactant to wet out various surfaces of differing surface free energy. Very hydrophobic materials have a low surface free energy, so a matching surfactant should also have a low HLB value. More hydrophilic surfaces—those with multiple polar groups perhaps, require surfactants with higher HLB values.

Microspersion EZ manufactured by Micropowders Inc. of Tarrytown N.J. is a non-ionic low molecular weight surfactant with a low HLB. Dawn® liquid dish soap, manufactured by the Procter & Gamble Co (Cincinnati Ohio) is an example of a low molecular weight anionic surfactant. E-Sperse 100 (from Ethos, Greenville S.C.), Triton BG-10 (Dow) Glucopon 425 N (BASF) and Glucopon 215 UP (BASF) are additional materials that can wet out certain hydrophobic materials. The Surfynol® range available from Evonik are ethoxylated acetylenic diols of fairly low molecular weight. They are non-ionic, and low foaming due to the molecular interactions of the acetylenic moiety with the water surface. Surfynol 104, 440, 420 are representative examples.

Higher molecular weight materials are useful for stabilizing dispersions of various materials in water. Polymers may be anionic, cationic, or non-ionic or have a mixture of characteristics. Polymeric dispersants, also known as "grid aids" are often co-polymeric in nature, for instance some of the Joncryl resins from BASF are believed to be methacrylic acid-styrene-butylmethacrylate copolymers, containing anionic ionizable groups. Zetasperse 3100, Zetasperse 3800, TegoDispers 752W, and TegoDispers 755W are also higher molecular weight dispersing agents with a net negative formal charge when ionized available from Evonik. Disperbyk 190, as well as other Disperbyk products available from BYK Chemie (Wallingford Conn.) are also polymeric/copolymeric materials that help stabilize dispersions through a) increasing particle surface negative charge (electrokinetic stabilization), and b) by allowing steric stabilization by dint of segments of polymer dissolving into the continuous medium.

Insulation Element Density:

The insulating elements used to mitigate conductive heat transfer are very low in density. 1 g of Innova aerogel powder occupies around 7 cm$^3$ of volume. The perlite microspheres and milled and classified perlite flake are of similarly low density, in the range of 100-200 kg·m$^{-3}$. If we assume that the density of paper fiber is approximately 1 g·cm$^{-3}$, then the following is approximately true regarding the % by volume:

| % Perlite by mass: | Approximate % Perlite by volume: |
|---|---|
| 66.7% | 93% |
| 50% | 88% |
| 30% | 75% |
| 25% | 70% |
| 20% | 64% |
| 15% | 55% |
| 10% | 44% |
| 5% | 27% |

Formulations Containing Starch Adhesive:

Corn starch adhesive (approximately 25% solids) is applied to the top of the media board flutes in order to laminate with the linerboard, making corrugated cardboard. The corn starch is modified with the addition of a small quantity of sodium hydroxide and sodium borate (less than 1% of the solids.) These additions reduce the gel-point of the adhesive from around 185° F. to 145° F. Part of the starch contained in the adhesive is in true solution (referred to as "cooked starch", while additional starch is added without cooking to form swollen starch gels. At the point of corrugation, the high temperature of the corrugator heats the gels, dissolving them, and boosting viscosity as the adhesive bonds with the paper fibers. If strength is needed under moist conditions, an additional resin may be added referred to as Moisture Resistant Additive (MRA), to impart moisture condensation resistance. For instance, if a box is stored in a freezer, then moved into a room temperature environment, then it's likely that the box will "sweat" as water vapor condenses on the surface of the cold box. Such MRA resins include Coragum SR available from Ingredion in WestChester Ill., and is typically added at 1%-1.5% to impart moisture resistance.

The inventors realized that the physical contact between the corrugated flutes and the liner board presented opportunities for conductive heat transfer. For this reason, the inventors investigated increasing the thermal insulating properties of the starch adhesive.

Modified starch mixed adhesive mixture was warmed, thoroughly mixed and the solids content measured at 29.7%. It was used to make the following coatings, 16-01 to 22-02. 22-02 had to be put into a blender for 8 minutes in order to make an acceptable coating.

Paint base is sold in paint supply stores prior to adding pigment to make customized colors. Deep color paint base contains little in the way of pigments, and mostly only binder, viscosity control agents, and a mineral extender such as calcium carbonate. Behr Pro 23 Deep Base, available from The Home Depot retail store was tested for solids content: 53.6% solids. This paint base was used as a binder to make more coatings containing insulating elements, JL 30-01 to JL 39-01.

| Formulation No. | Formulation Contents | Amount per Substance (g) |
|---|---|---|
| JL 16-01 Control | Cornstarch Adhesive as supplied | 150.00 |
| JL 16-02 | Microspersion EZ (neat) | 0.15 |
| | Cornstarch Adhesive (warmed to 400 C.) | 100.00 |
| | Perlite 20 um | 10.00 |
| JL 19-01 | Perlite 20 um | 30.01 |
| | Microspersion EZ (neat) | 0.37 |
| | Cornstarch Adhesive (warmed to 400 C.) | 170.00 |
| JL 19-03 | 3M Glass Bubbles iM30k | 18.00 |
| | Microspersion EZ (neat) | 0.30 |
| | Cornstarch Adhesive | 182.00 |
| JL 20-02 | 3M Glass Bubbles iM30k | 40.80 |
| | Microspersion EZ (neat) | 0.30 |
| | Cornstarch Adhesive | 163.20 |
| JL 22-02 | Aerogel IC 3120 | 18.00 |
| | Microspersion EZ (neat) | 0.34 |
| | Starch Adhesive | 182.00 |
| | Blended for 8 minutes | |
| Coating formulations based upon paint base. | | |
| JL 30-01 | Behr Deep Base | 40.00 |
| | Water | 40.00 |
| | 3M Glass Bubbles | 40.00 |
| JL 30-02 Control | Behr Deep Base | 60.00 |
| | Water | 60.00 |
| JL 30-03 | Behr Deep Base | 50.00 |
| | Water | 50.00 |
| | 3M Glass Bubbles | 8.83 |
| JL 31-02 | Behr Deep Base | 50.00 |
| | Water | 85.00 |
| | 3M Glass Bubbles | 80.40 |
| JL 34-01 | Behr Deep Base | 100.00 |
| | Water | 175.00 |
| | Aerogel Enova IC 3120 | 35.29 |
| JL 35-01 | Behr Deep Base | 100.00 |
| | Water | 100.00 |
| | Aerogel Enova IC 3120 | 19.78 |
| JL 35-02 | Behr Deep Base | 100.00 |
| | Water | 100.00 |
| | Aerogel Enova IC 3120 | 19.78 |
| JL 39-01 | Behr Deep Base | 50.00 |
| | Water | 50.00 |
| | Thermacell | 25.00 |

Low Emissivity Insulative Clay Coatings:

Many corrugated cardboard boxes and fiberboard packages are coated with a clay coating. This coating provides a smooth flat ink-receptive surface that allows high quality printing, it covers the brown color of unbleached pulp with white, and gives the packaging a higher quality feel. Often the coating is applied in two layers. The first layer is kaolin clay based, whitened by calcium carbonate. This layer helps smooth the surface by filling in low spots. The second layer also contains titanium dioxide and calcium carbonate. The formulations of clay coatings vary. Usually, they contain kaolin clay, along with a film forming binder, such as an acrylic latex, or sometimes a cornstarch. A polymeric dispersant is usually included to stabilize the clay coating, and a viscosity control agent is usually also included, such as carboxymethyl cellulose, or an hydrophobically associated alkali swellable polymer (HASE polymer.) Calcium carbonate is also usually included, along with titanium dioxide pigment for whitening. The clay coating offers another opportunity to incorporate insulative elements that reduce conduction and radiative heat transfer.

Emissivity Screening Results of Materials—Conductivity Method:

Powdered materials were sampled and tested to observe emissivity differences through a thermal camera. The emissivity of the powder surface and the powder surface sprayed with black paint were compared. NVD=no visible difference.

| Material | Comment after 2 minutes of heating |
|---|---|
| Aerogel IC 3120 powder | Possible lower emissivity |
| Perlite P-32 75 micron (cenosphere) | NVD |
| Thermacel powder | Possible lower emissivity |
| Hi Refractive Index glass beads 60μ | Possible lower emissivity |
| Hi Refr. Index glass beads 35μ-45μ | NVD |
| Hi Refr. Index glass beads 180μ-600μ | NVD |
| Titanium dioxide powder | Lower |
| Zinc oxide powder | NVD |
| Yellow oxide pigment (iron oxide) | NVD |
| Bismuth oxychloride powder | Lower |
| Party pink mica powder | NVD |
| Super pearly white mica powder | NVD |
| Snowflake sparkle mica powder | Lower |
| Queens purple mica powder | NVD |
| Diatomaceous Earth powder | NVD |
| Mica Sheet | Lower |
| Kaolin Clay powder | NVD |
| Silicon powder | Lower |
| Kaolin Coating - 42-02 | Lower (slight) |
| Diatomaceous earth coating 43-01 | Lower (slight) |

These powder sample data gave us several ideas for follow up tests. Curiously, some of the materials gave different results if they are first formulated into a coating (e.g. kaolin and diatomaceous earth). In other cases, low thermal conductivity may have skewed some readings.

Emissivity Screening Results of Materials—Illumination Method:

Both powdered materials, as well as materials incorporated into coatings coated onto fiberboard were sampled and tested to observe emissivity differences through a thermal camera. The emissivity of the powder surface/coating surface and regular Cardboard were compared when illuminated by an incandescent tungsten spot light. NVD=no visible difference in emissivity vs. cardboard. Coating formulas follow below. NT=not tested

| Material | Comment 4 seconds of illumination |
|---|---|
| Aerogel IC 3120 powder | NVD |
| Silicon powder | NVD |
| Snowflake Sparkle Mica | Lower |
| Pewter Silver mica | NVD |
| Hi RI glass beads 60μ Al coated | NVD |
| Hi Refr. Index glass beads 35μ-45μ | Slightly lower |
| Thermacels | NVD |
| Titanium dioxide | Lower |
| Zinc oxide | Lower |
| Mica Sheet | Much Lower |
| Bismuth oxychloride powder | Much Lower |
| Perlite P-32 (75μ) | NVD |
| 30-03, Meyer #130 (25% glass bubbles) | Slightly lower |
| 22-02, Meyer#130, (24% Aerogel in starch) | Lower |
| 19-01, Meyer#130, (37% Perlite in starch) | Much Lower |
| 19-01, Meyer #40, (37% Perlite in starch) | Lower |
| Kaolin Powder | Slightly Lower |
| Kaolin Coating - 42-02 Meyer #40 | Much Lower |
| Diatomaceous Earth powder | Lower |
| Diatomaceous earth coating 43-01 | NVD |
| Aerogel Coating 38-02 (~50% aerogel) | Much Lower |
| Bismuth Vanadate | Much Lower |
| BiLite 20 | Much Lower |
| Gypsum | Lower |
| Sericite Pigment | Lower |
| Aluminum Oxide Powder | Lower |

These data gave us additional ideas to pursue insulating against thermal radiative emission and absorption, in addition to insulating against thermal conduction.

Additional Material Sources:

Glass beads, including high refractive index glass, and retroreflective hemi-spherically mirrored glass beads—Cole Safety Products, Glass microbubbles—3M specialty materials, iM30K Bismuth oxychloride—Making Cosmetics Inc (Redmond Wash.). This is a pearlescent pigment, commonly used in cosmetics and packaging to impart a pearl effect. Other sources include BASF, as Biju Ultra UFC and Pearl Glo.

BiLite 20 powder—BiOCl coated onto mica flakes (BASF)

Bismuth Vanadate—Dominion Colour, Ontario

Titanium Dioxide—Brambleberry (Bellingham, Wash.)

Zinc Oxide—Brambleberry (Bellingham, Wash.), and Sky Organics

Snowflake Sparkle Mica—Brambleberry (Bellingham, Wash.)

Super Pearly White Mica—Brambleberry (Bellingham, Wash.)

Pewter Mica—Brambleberry (Bellingham, Wash.)

Party Pink Mica—Brambleberry (Bellingham, Wash.)

Queens Purple Mica—Brambleberry (Bellingham, Wash.)

Yellow iron oxide powder—Brambleberry (Bellingham, Wash.)

Thermacels—HyTech Thermal Solutions, Melbourne Fla. This material is an additive that is advertised to be mixed into paint in order to increase the paint's insulating properties.

Rhoplex VSR-50 is an acrylic low VOC film forming binder emulsion in water. Commonly used in architectural coatings. Originally sold by Rohm & Haas, now available from Dow Chemical.

Sericite comprised sericite mica surface treated with magnesium myristate or Sericite White sparkle luxury mica colorant pigment powder by H&B Oils Center Co.

Supertherm paint, from Eagle Specialty Coatings, British Columbia, Canada

Coatings to Test for Emissivity on Fiberboard or Card

| Formulation ID | Materials | Quantity/g |
|---|---|---|
| JL 48-01 | $CaCO_3$ | 50.00 |
| | Water | 50.00 |
| | 10% Rhoplex VSR-50 in water | 20.00 |
| JL 48-02 | Kaolin Clay | 50.00 |
| | Water | 70.00 |
| | 10% Rhoplex VSR-50 | 20.00 |

-continued

| Formulation ID | Materials | Quantity/g |
|---|---|---|
| JL 48-03 | Bismuth Oxychloride | 20.13 |
|  | water | 33.55 |
|  | 10% Rhoplex VSR-50 in water | 8.05 |
| HT 50-01 | Eagle Specialized Coating |  |

Low Emissivity Coatings on Fiberboard—Cooler Window Tests

Based upon the rapid testing using tests 1 & 2, several materials were selected for further investigation. In preparation for printing, fiberboard is often coated with a clay coating, which smooths the surface and gives it a white color. A simple clay coat formulation was generated:
Kaolin Clay Coating 127-01:

| Material | Quantity (g) | |
|---|---|---|
| Water | 130 | |
| Tego Dispers 755W | 4.86 | Evonik |
| Rovene 6400 | 52.89 | Mallard Creek Polymers |
| Hydrite SB60 | 157.8 | Imerys |

Low Emissivity Coating Formulations by % Composition

| % | TS110 | 137-02 | TS111 | TS112 | TS113 | 137-06 | 127-02 | 137-04 | 137-05 | 136-01 |
|---|---|---|---|---|---|---|---|---|---|---|
| Water | 62.5 | 68.15 | 64.28 | 65.51 | 65.51 | 65.51 | 65.51 | 17.5 | 30.48 | 65.55 |
| T-755W | 8.18 | 2.5 | 5.01 | 5.10 | 5.10 | 5.1 | 5.1 |  |  | 5.1 |
| R-6400 | 2.75 |  |  |  |  |  |  |  |  |  |
| R-4100 |  | 2.85 | 2.71 | 2.85 | 2.85 | 2.85 | 2.85 | 2.85 | 2.85 | 2.85 |
| HPMC |  |  | 1.96 |  |  |  |  |  |  |  |
| BiOCl | 26.56 |  |  |  |  |  |  |  |  |  |
| BiLite |  | 26.5 |  |  |  |  |  |  |  |  |
| ZnO |  |  |  | 26.04 |  |  |  |  |  |  |
| ZnS |  |  |  |  | 26.54 |  |  |  |  |  |
| MgO |  |  |  |  |  | 26.54 |  |  |  |  |
| TiO$_2$ |  |  |  |  |  |  | 26.5 |  |  |  |
| Al-ZnO |  |  |  |  |  |  |  | 26.54 |  |  |
| TH1000 |  |  |  |  |  |  |  | 80 |  |  |
| TH500EF |  |  |  |  |  |  |  |  | 66.67 |  |
| Ag-Glass bubbles |  |  |  |  |  |  |  |  |  | 26.5 |

ZnO-Sky Organics
HPMC-3% aq solution of hydroxypropyl methyl cellulose.
BiOCl-Bismuth oxychloride, sold as Pearl Glo (BASF)
Al-ZnO-Aluminum-doped zinc oxide semiconductor, AZO 100, 20-40 nm particle size, available from Oocap Inc. Las Crusas NM.
TH500 EF is Ropaque ™ TH500EF from Dow Chemicals hollow polymeric microsphere pigment of approximate size 0.4 micron diameter, and 30% solids.
TH1000 is Ropaque ™ TH1000 from Dow Chemicals hollow polymeric microsphere pigment of approximate size 1 micron diameter, and 26.5% solids
Silver (Ag)-coated glass bubbles, available from CoSpheric LLC.
Conductive silver metal coated hollow glass microspheres 5-30 microns, density 0.75 g/cm$^3$, product ID: M-18-Ag-0.75

Kaolin clay coating 127-01 was coated onto 170 gsm (35 lbs/1000 sq ft) kraft laser & ink jet printer post cards, available from Juvo Plus Inc Irwinsdale Calif., using a 5 Meyer rod and dried in a hot air oven at 250° F. for 5 mins. Various coatings were selected and coated onto the board, drying the coatings between each application. A representative area was selected, and tested on the test rig illustrated in FIGS. 43A & 43B. The distance to the lamp was set to 4.5", 4500 grams of water were weighed into the cooler, and the stirrer rotation was set to 600 rpm. The water temperature rise over 1 hour of lamp exposure was recorded.

| Exp: | Al foil | none | 1 clay | 2 clay | 3 clay | BiOCl | BiLite | MgO |
|---|---|---|---|---|---|---|---|---|
| Base: | Kraft | Kraft | Kraft | Kraft | Kraft | Kraft | Kraft | Kraft |
| Coat 1 | Al foil | — | 127-01 | 127-01 | 127-01 | 127-01 | 127-01 | 127-01 |
| Coat 2 | — | — | — | 127-01 | 127-01 | TS110 | 137-02 | TS113 |
| Coat 3 | — | — | — | — | 127-01 | — | — | — |
| TempRise/° C. | 1.3 | 4.1 | 3.7 | 3.5 | 3.5 | 3.4 | 3.1 | 3.5 |
| W.m$^{-2}$ | 87 | 274 | 247 | 234 | 234 | 227 | 207 | 234 |

Al foil: Aluminum foil (Reynolds heavy duty kitchen foil) was mounted dull-face down to Juvo kraft paper using 3M spray adhesive.

| Exp: | ZnO | ZnS | TiO$_2$ | Al.ZnO | AgGls* | TH1000 | TH500EF | TiO2 on Foil |
|---|---|---|---|---|---|---|---|---|
| Base: | Kraft | Kraft | Kraft | Kraft | Kraft | Kraft | Kraft | Kraft |
| Coat 1 | 127-01 | 127-01 | 127-01 | 127-01 | 127-01 | 127-01 | 127-01 | Foil |
| Coat 2 | TS111 | TS112 | 137-06 | 127-02 | 136-01 | 137-05 | 137-04 | 137-06 |
| Coat 3 | — | — | — | — | — | — | — | — |
| Temp Rise/° C. | 3.2 | 3.3 | 3.5 | 5.1 | 3.1 | 3.7 | 3.3 | 2.9 |
| W.m$^{-2}$ | 214 | 221 | 234 | 341 | 207 | 247 | 221 | 194 |

*Ag-coated glass bubbles available from CoSpheric LLC. Conductive silver metal coated hollow glass microspheres 5-30 microns, density 0.75 g/cm$^3$, product ID: M-18-Ag-0.75

| Exp: | BiLite | ZnO | BiOCl | ZnO/BiLite | BiLite/ZnO |
|---|---|---|---|---|---|
| Base: | Kraft | Kraft | Kraft | Kraft | Kraft |
| Coat 1 | 127-01 | 127-01 | 127-01 | 127-02 | 127-02 |
| Coat 2 | 127-01 | 127-01 | 127-01 | TS111 | 137-02 |
| Coat 3 | 137-02 | TS111 | TS110 | 137-02 | TS111 |
| Temp Rise/° C. | 3.2 | 3.1 | 3.3 | 3 | 3.1 |
| W.m$^{-2}$ | 214 | 207 | 221 | 201 | 207 |

These data suggest that we can reduce the amount of energy absorbed by a box, or emitted from the inside surfaces of a box using coatings, by around 30%. While aluminum foil, as well as aluminized bubble wrap are very effective, they can cause problems if introduced into the repulping stream, and in any case are challenging to recycle. Not only could many of these coatings be applied to the interior and or exterior of the box, but could also be used as separate sheets of packaging, as illustrated as the loose sheets in FIG. 23A-23B.

Results of Emissivity Testing by Test Method #4:

| Exp: | Contrl | 1 clay | 2 clay | 3 clay | TiO$_2$ | ZnS | AgGls* | ZnO |
|---|---|---|---|---|---|---|---|---|
| Base: | Kraft | Kraft | Kraft | Kraft | Kraft | Kraft | Kraft | Kraft |
| Coat 1 | — | 127-01 | 127-01 | 127-01 | 127-01 | 127-01 | 127-01 | 127-01 |
| Coat 2 | — | — | 127-01 | 127-01 | 137-06 | TS112 | 136-01 | TS111 |
| Coat 3 | — | — | — | 127-01 | — | — | — | — |
| ε @ 23° C. | 0.900 | 0.859 | 0.883 | | 0.885 | 0.869 | 0.519 | 0.888 |
| ε @ 30° C. | 0.909 | 0.866 | 0.894 | | 0.895 | 0.873 | 0.530 | 0.918 |
| ε @ 40° C. | 0.915 | 0.866 | 0.894 | | 0.904 | 0.874 | 0.536 | 0.933 |

*Ag-coated glass bubbles, available from CoSpheric LLC. Conductive silver metal coated hollow glass microspheres 5-30 microns, density 0.75 g/cm$^3$, product ID: M-18-Ag-0.75

| Exp: | BiLite | BiLite | ZnO | BiOCl | ZnO/BiLite | BiLite/ZnO |
|---|---|---|---|---|---|---|
| Base: | Kraft | Kraft | Kraft | Kraft | Kraft | Kraft |
| Coat 1 | 127-01 | 127-01 | 127-01 | 127-01 | 127-02 | 127-02 |
| Coat 2 | 137-02 | 127-01 | 127-01 | 127-01 | TS111 | 137-02 |
| Coat 3 | — | 137-02 | TS111 | TS110 | 137-02 | TS111 |
| ε @ 23° C. | 0.856 | 0.873 | 0.885 | 0.861 | 0.848 | 0.868 |
| ε @ 30° C. | 0.873 | 0.875 | 0.897 | 0.876 | 0.860 | 0.877 |
| ε @ 40° C. | 0.882 | 0.871 | 0.902 | 0.881 | 0.856 | 0.881 |

Discussion of Emissivity vs. Heat Transfer Results

The inventors were surprised by the results of their own emissivity tests methods 1 and 2, as well as the emissivity results provided by the outside laboratory (Thermal Emissivity Test Method #4). Several coatings have been discovered by the inventors that apparently reduce the transfer of radiant heat energy from an incandescent light bulb (as a proxy to the full-sun illumination of a delivered package) through sheets of paper. The inventors were surprised to find that the emissivity results from the third party laboratory did not correlate with the heat transfer through the materials measured by the cooler window tests. Clearly, the inventors may have discovered several coatings with non-obvious and unexpected thermal properties.

| Sample | Emissivity at 23° C. | Thermal Conduction/ $W \cdot m^{-2}$ |
|---|---|---|
| Clay + ZnO + BiLite | 0.848 | 201 |
| Ag-coated glass | 0.519 | 207 |
| Clay + BiLite + ZnO | 0.868 | 207 |
| Clay + Clay + ZnO | 0.885 | 207 |
| Clay + BiLite | NT | 207 |
| Clay + Clay + BiLite | 0.861 | 214 |
| Clay + ZnO | 0.888 | 214 |
| Clay + ZnS | 0.869 | 221 |
| Clay + Clay + BiOCl | 0.861 | 221 |
| Clay + TiO$_2$ | 0.885 | 234 |
| Clay + Clay | 0.883 | 234 |
| Clay | 0.859 | 237 |
| Kraft | 0.900 | 274 |

Example 3. Sheets Containing Insulating Elements

Approximately 5.35 g portions of 35 lb liner board (International Paper) was shredded and repulped. Additional materials were added, along with surfactants if necessary for wetting. While not yet optimum formulations, we had found that we could make paper sheets containing insulating elements by adding surfactant, along with a cationic polysaccharide, such as cationic Guar Gum, available from Making Cosmetics Inc., or a cationic starch sizing, or a synthetic retention aid, such as Polymin P (BASE), also known as polyethylene imine), or a high molecular weight poly(acrylamide) available from various sources: Hydrophobically associating polymers may also be incorporated, such as N-alkyl poly(acrylamides.) We wished to understand the amount of retained insulation in the paper following drying.

The following formulations were made up and cast as paper, dried at room temperature and then sent for ash content and moisture content analysis:

| Formulation ID | Materials | Mass/g | Target % By mass | % Moisture paper | % Asb Paper |
|---|---|---|---|---|---|
| JL 24-02 Control | Water | 800.00 | 0% | 8.4% | 0.84% |
| | Pulp | 5.35 | | | |
| JL 23-01 | Water | 800.00 | 25% | 6.2% | 15.9% |
| | Pulp | 5.35 | | | |
| | Microspersion EZ (neat) | 2.00 | | | |
| | Perlite P-50 (20 micron) | 1.78 | | | |
| | Cationic Guar Gum | 0.80 | | | |
| JL 23-02 | Water | 800.00 | 50% | 7.2% | 28.5% |
| | Pulp | 5.35 | | | |
| | Microspersion EZ (neat) | 2.00 | | | |
| | Perlite P-50 (20 micron) | 5.35 | | | |
| | Cationic Guar Gum | 0.80 | | | |
| JL 24-01 | Water | 800.00 | 50% | 6.7% | 22.9% |
| | Pulp | 5.35 | | | |
| | Microspersion EZ (neat) | 2.00 | | | |
| | Perlite P-50 (20 micron) | 5.35 | | | |
| | Cationic Guar Gum | 2.00 | | | |
| JL 25-02 | | 800.00 | 25% | 8.0% | 8.8% |
| | Pulp | 5.35 | | | |
| | Microspersion EZ (neat) | 2.50 | | | |
| | Perlite P-50 (20 micron) | 1.78 | | | |
| pH = 8-9 | Polymin P | 0.80 | | | |
| JL 26-01 | Water | 800.00 | 50% | 7.3% | 16.8% |
| | Pulp | 5.35 | | | |
| | Microspersion EZ (neat) | 2.00 | | | |
| pH = 6.0 | Perlite P-50 (20 micron) | 5.35 | | | |

-continued

| Formulation ID | Materials | Mass/g | Target % By mass | % Moisture paper | % Asb Paper |
|---|---|---|---|---|---|
| JL 32-01 | Water | 800.00 | 25% | 7.5% | 14.7% |
| | Pulp | 5.35 | | | |
| | 3M Glass Bubbles | 1.78 | | | |
| | 0.5% a.q. Cationic Guar Gum | 10.00 | | | |
| JL 32-02 | Water | 800.00 | 50% | 6.8% | 28.5% |
| | Pulp | 5.35 | | | |
| | 3M Glass Bubbles iM30K | 5.35 | | | |
| | 0.5% a.q. Cationic Guar Gum | 10.00 | | | |

A mass balance was performed to confirm that a portion of the perlite and a portion of the finer was lost during the drawing and pressing process.

Repulpability Tests: Insulated Paper vs. Uline Insulated Cardboard Box 90 lb fiberboard was fed through a paper shredder. 5.35 g was weighed and pulped in hot water as usual. The pulp was more dense and more difficult to disperse than the pulp from the 35 lb paper. Paper sheets were made using the following formulations:

| JL 41-01 | water | 800.00 |
| | Pulp - 90# shredded paper | 12.50 |
| | iM30K glass bubbles | 12.50 |
| | 0.5% cationic guar gum solution | 25.00 |
| JL 41-02 | water | 800.00 |
| | Pulp - 90# shredded paper | 12.50 |
| | Microspersion EZ (neat) | 1.60 |
| | Perlite P-50 | 12.50 |
| | 0.5% cationic guar gum solution | 25.00 |

As a control a 44-01), the existing method of shipping cold objects was also tested for repulpability. Corrugated cardboard from a BS121007 single walled 12"×10"×17" box sections were laminated to an insulated box liner, made from 3/16" cool-shield bubble & metallized film, available from Uline as model number S-15223. The materials were laminated using 3M aerosol spray adhesive.

| Designation | Summary | Yield based upon total fiber collected. (% accepts) Av. of 2 | Yield based upon original charge to the pulper (% accepts) Av. of 2 | Operational impact (Pass/ Fail) |
|---|---|---|---|---|
| 44-01 | Control | 64.7% | 56.4% | Fail |
| 41-01 | 50% iM30K | 98% | 70% | Pass |
| 41-02 | 50% perlite P-50 | 93% | 66.9% | Pass |

These data illustrate the validity that the approach of incorporating insulating elements into the paper structure has the potential to produce a repulpable thermally insulating material for packaging.

Example 4. Additional Sheets Made for Moisture, Ash Content and Repulpability 35 lbs per 1000 sq. ft. single-ply sheets containing additives were made for additional repulpability tests, consistent with the Fiberboard Association voluntary standard for repulpability. Sheets FA, FD, FE, FF, FG were made using Grade 100 bleached pulp secondary fiber (supplied by Donco Recycling Solutions with offices in Chicago Ill.) The target basis weight for each sheet was 35 lbs per 1000 square feet (MSQ). Taking sample FD as an example, to make 35 MSQ board with 50% additive, 17.5 lbs of dry pulp is mixed with 17.5 lbs of additive for every 1,000 square feet of paper. Once ash content and moisture were measured, the sheets were then run through the repulping test in duplicate:

Sample Details, Moisture, and Ash Content:

| Sample Details | | | Test Results | | |
|---|---|---|---|---|---|
| | | Measured | Based upon Dried Material | | |
| ID | Additive | % Additive | % Moisture Content | % Fiber | % Ash | % additive retention |
| FA | (control) | 0 | 8.4 | 98.7 | 1.4 | N/A |
| FD | 20 μ spherical perlite | 50 | 5.4 | 56.9 | 43.1 | 86.1 |
| FE | iM30k glass bubbles | 50 | 5.1 | 54.5 | 45.5 | 90.9 |
| FF | Dicalite LD 1006 | 50 | 5.0 | 52.6 | 47.4 | 94.7 |
| FG | 75 μ spherical perlite | 50 | 6.2 | 62.1 | 37.9 | 75.7 |

Repulpability Test Data:

| ID | Initial Charge/g | Repulped Mass/g | Total Repulped mass accepted/g | Total Repulped mass Rejected/g | Total Fines/g |
|---|---|---|---|---|---|
| FA | 25.20 | 21.06 | 21.06 | 0.000 | 4.14 |
| FA | 21.60 | 17.62 | 17.62 | 0.000 | 3.98 |
| FD | 25.20 | 14.21 | 13.87 | 0.251 | 11.08 |
| FD | 25.10 | 14.81 | 14.80 | 0.008 | 10.29 |
| FE | 25.70 | 12.09 | 12.09 | 0.000 | 13.61 |
| FE | 25.40 | 12.74 | 12.74 | 0.000 | 12.66 |
| FF | 25.10 | 14.64 | 14.64 | 0.004 | 10.46 |
| FF | 25.60 | 15.98 | 15.24 | 0.036 | 10.32 |

Repulpability Test Results Analysis—Taking Ash Content Into Account:

| ID | % Accepts based upon total fiber collected | % Accepts based upon initial charge | % accepts based on the amount of fiber present in the initial charge (additive ash excluded) | Deposition on equipment noted: |
|---|---|---|---|---|
| FA | 100.0 | 83.6 | 84.0 | No |
| FA | 100.0 | 81.6 | 82.1 | No |
| FD | 98.2 | 55.0 | 85.8 | No |
| FD | 99.9 | 59.0 | 89.6 | No |
| FE | 100.0 | 47.0 | 75.2 | No |
| FE | 100.0 | 50.2 | 80.0 | No |
| FF | 100.0 | 58.3 | 84.3 | No |
| FF | 99.8 | 59.5 | 91.9 | No |

Surface Modification of Insulating Fillers:

Some fillers are quite hydrophobic, meaning that they are difficult to wet out. Aerogels fall into this class, as do silicone-coated micro-spherical perlite, such as CenoStar P grades, from Cenostar Corp. Newbury MA or from American Stone Pioneers, Rolling Hills Estates, Calif. To wet these materials out, mid to low FMB surfactants are useful, such as Microspersion EZ. Judicious selection of polymeric surfactants can also be added to increase the negative surface charge of the wetted particle. Such surfactants include Zetasperse 3800 (Evonik GmbH), which is a comb co-polymeric anionic dispersant, and Disperbyk 190, available from Byk, a division of Altana group. Even with surfactants, mechanical high sheer mixing may be necessary to fully disperse these materials. High sheer mixing may be achieved using for instance a sawblade mixer, or a Silverson mixer. A regular kitchen blender may also be used to mix in short bursts of for instance 2-3 minutes, followed by a cooling time to prevent the drive seals from overheating.

In formulations that contain surfactants, defoamers may also be needed to prevent troublesome foam build up. Defoamers are widely known, and may be as simple as 1-octanol. They are usually low FMB surfactants, such as silicone containing surfactants, or surfactants such as Surfynol 440, Surfynol 420, Surfynol 104e from Evonik GmbH, Particulate dispersions, such as hydrophobic silica dispersions may also be used as de-foamers.

Surface Modified Insulating Fillers

| | | g |
|---|---|---|
| JL 97-01 | Water | 125 |
| | Disperbyk 190 | 25 |
| | Microspersion EZ | 0.134 |
| Mix, then add with stirring: (add in portions.) | Cenostar P-32 (75 micron spherical perlite) | 40.00 |
| JL 91-01 | Water | 143.1 |
| | Microspersion EZ | 0.6 |
| | Disperbyk 190 | 40.42 |
| Mix and addi with stirring: | Innova IC 3110 Aerogel High Sheer Mix, wath Cooling 12 minutes. | 30.00 |
| JL 60-01 | Water | 97.5 |
| | Zetasperse 3100 | 4 |
| | Surfynol 420 | 0.4 |
| | Microspersion EZ | 0.4 |
| Mix, then add with stirring: (add in portions.) | Aerogel Innova IC 3110 High-sheer mix with cooling 15 mins. | 20.00 |

Example 5. Paper Incorporating Thermal Insulation

The following formulations were made up and drawn into paper. Bleached recycled fiber, supplied by Donco Recycling Solutions. The pulp was measured at 50% solids 50% moisture, and so 9 grams (9.05+/−0.05 g) was weighed out in lieu of shredded fiber board.

| Formulation ID | Materials | Mass/g |
|---|---|---|
| JL 46-01 CONTROL | Water | 800.00 |
| | Pulp | 4.5 |
| | Microspersion EZ (neat) | 1.60 |
| (add last.) | 0.5% a.q. Cationic Guar Gum | 10.00 |
| JL 46-02 | Water | 800.00 |
| | Pulp | 4.5 |
| | Microspersion EZ (neat) | 1.60 |
| | Perlite P-50 | 1.78 |
| (add last.) | 0.5% a.q. Cationic Guar Gum | 10.00 |
| JL 46-03 | Water | 800.00 |
| | Pulp | 4.5 |
| | Glass microbubbles (3M) | 1.78 |
| (add last.) | 0.5% a.q. Cationic Guar Gum | 10.00 |
| JL 33-01 | Water | 800.00 |
| | Pulp | 4.5 |
| | Perlite P-50 | 5.35 |
| | Microspersion EZ (neat) | 1.70 |
| | 0.5% a.q. Cationic Guar Gum | 10.00 |
| JL 32-02 | Water | 800.00 |
| | Pulp | 4.5 |
| | 3M Glass Bubbles iM30K | 5.35 |
| | 0.5% a.q. Cationic Guar Gum | 10.00 |
| JL 49-01 | Water | 800.00 |
| | Pulp | 4.5 |
| | Glass microbubbles (3M) | 10.70 |
| | Kroger Household Ammonia | 4.00 |
| (add last.) | 0.5% a.q. Cationic Guar Gum | 10.00 |
| JL 49-02 | Water | 800.00 |
| | Pulp | 4.5 |
| | Perlite P-50 (20 micron) | 10.70 |
| | Microspersion EZ (neat) | 1.60 |
| | Kroger Household Ammonia | 4.00 |
| (add last.) | 0.5% a.q. Cationic Guar Gum | 10.00 |
| JL 99-01 | Water | 800.00 |
| | Pulp | 4.5 |
| | JL 97-01 | 42.9 |
| Mix, then add: | 0.5% a.q. Cationic Guar Gum | 10.00 |
| JL 49-01 | Water | 800.00 |
| | Pulp | 4.5 |
| | Glass microbubbles (3M) | 10.70 |
| | Kroger Household Ammonia | 4.00 |

-continued

| Formulation ID | Materials | Mass/g |
|---|---|---|
| (add last.) | 0.5% a.q. Cationic Guar Gum | 10.00 |
| JL 49-02 | Water | 800.00 |
| | Pulp | 4.5 |
| | Perlite P-50 (20 micron) | 10.70 |
| | Microspersion EZ (neat) | 1.60 |
| | Kroger Household Ammonia | 4.00 |
| (add last.) | 0.5% a.q. Cationic Guar Gum | 10.00 |
| JL 70-01 | Water | 800.00 |
| | Pulp | 4.5 |
| | Microspersion EZ | 1.6 |
| | Perlite P-35 75 micron | 1.78 |
| | Household ammonia solution | 2 |
| Mix, then add: | 0.5% a.q. Cationic Guar Gum | 10.00 |
| JL 110-01 | Water | 800.00 |
| | Pulp | 4.5 |
| | Microspersion EZ | 1.6 |
| | Perlite P-35 75 micron | 4.5 |
| | Household Ammonia | 4.00 |
| (add last.) | 0.5% a.q. Cationic Guar Gum | 10.00 |
| JL 63-01 | Water | 800.00 |
| | Pulp | 4.5 |
| | JL 60-01 | 8.25 |
| (add last.) | 0.5% a.q. Cationic Guar Gum | 10.00 |
| JL 67-01 | Water | 800.00 |
| | Pulp | 4.5 |
| | JL 60-01 | 16.5 |
| (add last.) | 0.5% a.q. Cationic Guar Gum | 10.00 |

Single Ply Samples:

| Formulation | Explanation | Average Thickness/in | Average TADT/° C. |
|---|---|---|---|
| JL 46-01 | Control | 0.0092 | 22.7 |
| JL 46-02 | 28.3% 20 micron perlite spheres | 0.0140 | 13.1 |
| JL 46-03 | 28.3% Glass microbubbles (iM30K) | 0.0149 | 12.2 |
| JL 33-01 | 54.3% 20 micron Perlite spheres | 0.0226 | 6.9 |
| JL 33-02 | 54.3% Glass microbubbles (iM30K) | 0.0231 | 6.9 |
| JL 49-01 | 70.4% Glass microbubbles (iM30K) | 0.0257 | 5.4 |
| JL 70-01 | 25% 75 micron perlite spheres | 0.0177 | 9.1 |
| JL 110-01 | 50% 75 micron perlite spheres | 0.0221 | 6.5 |
| JL 99-01 | 66.7% 75 micron perlite spheres | 0.0317 | 2.8 |
| JL 63-01 | 25% Innova Aerogel | 0.0179 | 8.2 |
| JL 67-01 | 50% Innova Aerogel | 0.0254 | 4.3 |
| JL 143-01 | 67% Innova Aerogel | 0.0353 | 1.8 |
| JL 68-01 | 25% Flaked Perlite (Dicalite LD 1006) | 0.0169 | 9.7 |
| JL 102-01 | 50% Flaked Perlite (Dicalite LD 1006) | 0.0178 | 7.4 |
| JL 100-01 | 67% Flaked Perlite (Dicalite LD 1006) | 0.0282 | 3.8 |
| JL 126-01 | 71.4% Flaked Perlite (Dicalite LD 1006) | 0.0388 | 2.8 |

Thickness: This is the average over five disks with an average of three measurements for each disc of the paper (15 caliper measurements)
Average TADT: This is the average for 5 sheets tested separately
Thermal data TADT was adjusted to a thickness of 0.009 inches for single ply sheets.

The inventors noted that the pulp treated as described readily floated, whereas untreated pulp tends to settle toward the bottom of a jar of water if left for 30 minutes. Without wishing to be bound by theory, the inventors speculate that they have hound the assumed negatively surface charged particles to the negatively surface charged fibers through the use of a positively charged polymer (cationic guar gum). FIG. 44 shows a photograph of two jars 310 of ~2% solids pulp 11 in water 312. The left hand jar 310 contains regular bleached secondary pre-consumer fiber 11, while the jar 310 on the right contains similar pulp 11 combined with aerogel 12 in a similar formulation to JL 67-01.

Figure 46:
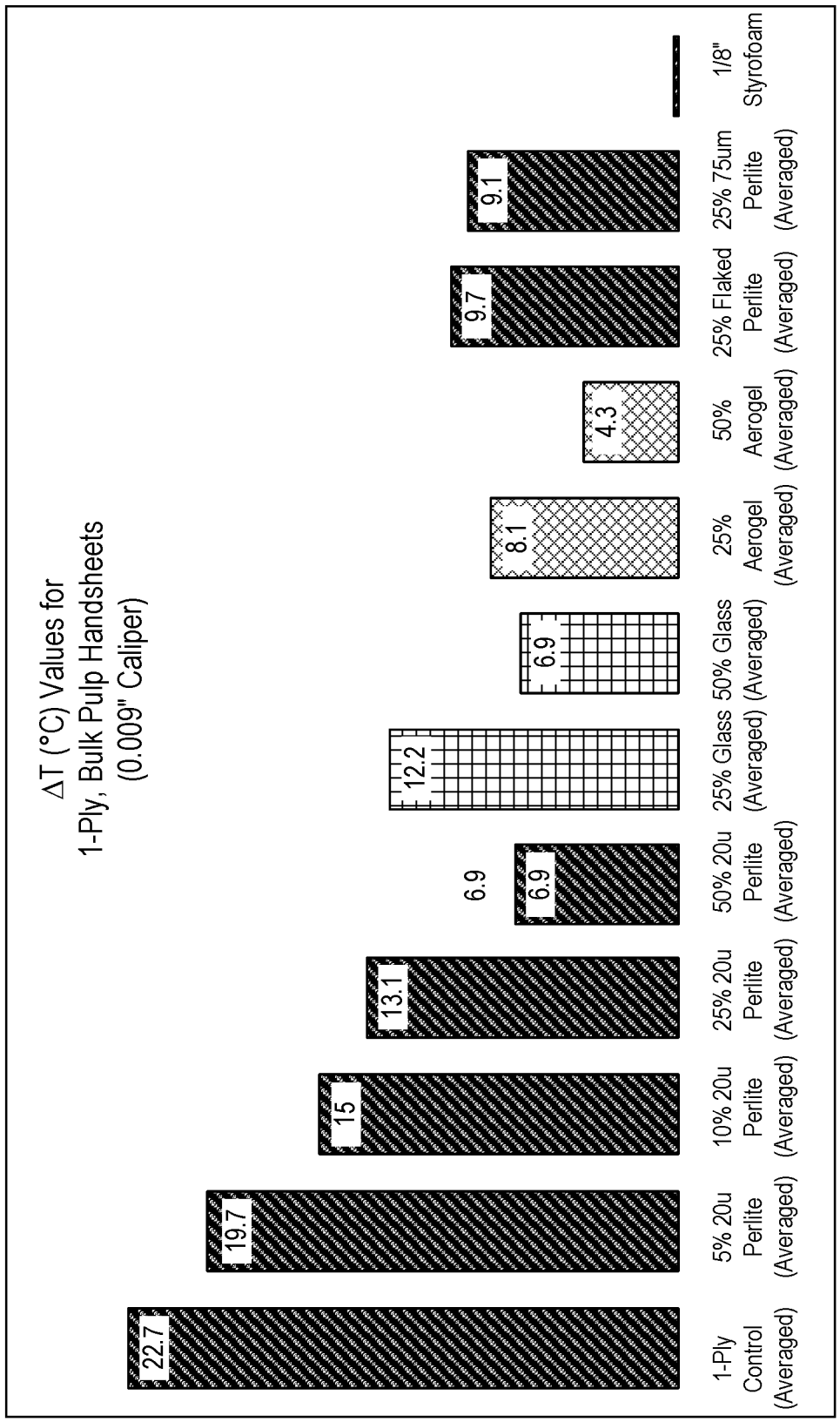
FIG. 46 depicts a bar chart showing the thickness adjusted delta-T temperature difference (TART) for various insulating material filled paper compositions.

Clearly, the Average Thickness Adjusted Delta-T (see, FIG. 46) shows that inclusion of the insulating filler 12 was slowing down heat transfer through the paper sheet 10. These, along with some additional data are shown in FIG. 46 as a bar chart. Note that the thickness of the sheet 10 was taken into account according to the formula provided in the test method described previously. From these data, we realized that the larger insulating particles 75 micron perlite spheres seemed to be more effective than the smaller 20 micron perlite spheres.

Figure 45:
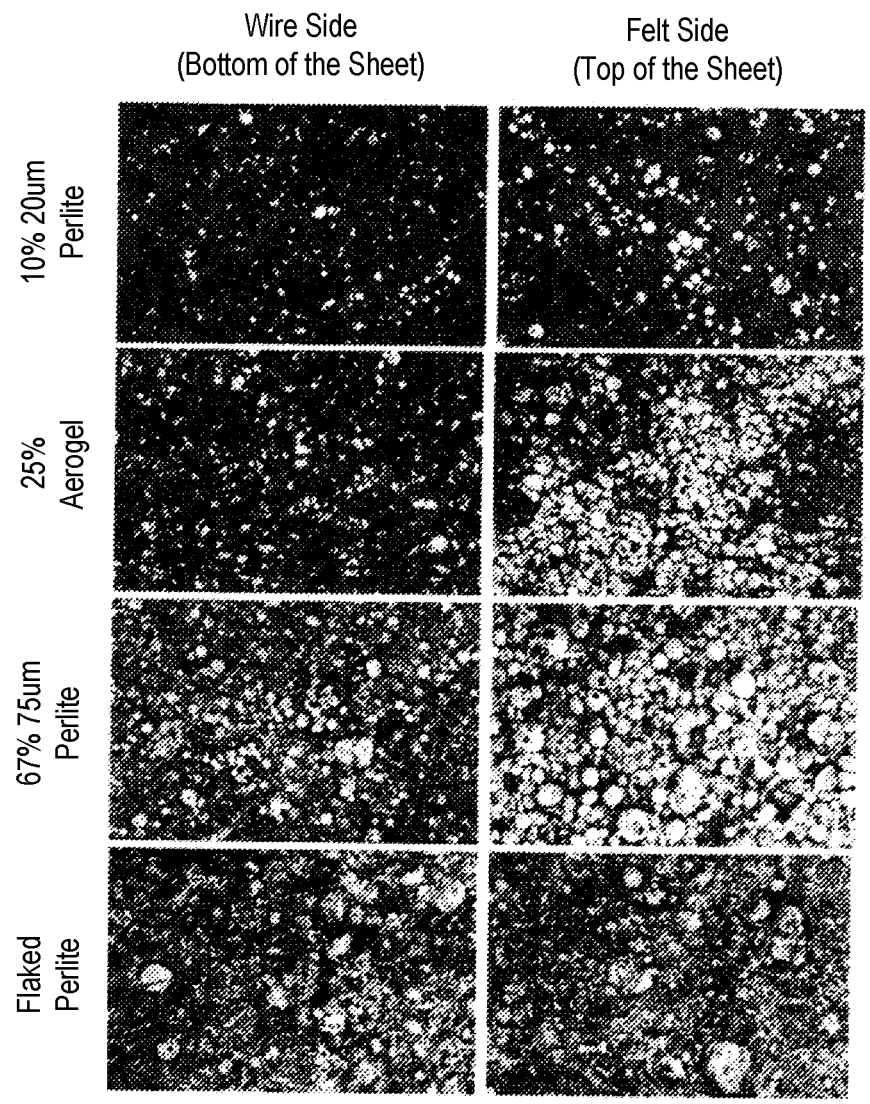
FIG. 45 shows scanning electron micrographs of paper surfaces containing insulating additives, comparing the wire side of the resultant paper to the felt side of the paper for four different materials.

As much of the pulp 11 floated, the inventors realized that gravitation may be classifying the insulating particles 12. FIG. 45 contains a set of scanning electron micrographs (SEMs) which compare the wire side to the felt side of the cooched paper sheet 10. The SEMs clearly show that in the case of 20 micron & 75 micron perlite microspheres 12, and aerogel 12, the felt side (also the upper side during paper forming using our lab equipment) is more populated with insulating particles 12 than the wire side, evidencing an uneven distribution of insulating particles 12.

Double Ply Samples:

The inventors hypothesized that the uneven distribution of insulating particles 12 within paper sheets 10 may be helping provide insulation. The following experiment was designed to investigate the thermal insulative effect of having all of the insulation in one of two layers 10 vs. more evenly distributed through two layers 10.

| grams | DP1 No filler | DP2 5% perlite (20 micron hollow spheres) | DP3 10% perlite (20 micron hollow spheres) |
|---|---|---|---|
| Water/g | 800 | 800 | 800 |
| Pulp/g | 4.5 | 4.5 | 4.5 |
| Surfactant/g | — | 1.6 | 1.6 |
| Perlite (20 micron)/g | — | 0.25 | 0.50 |
| 0.5% Cationic Guar Gum. aq/g | Mix 10 | Mix 10 | Mix 10 |

Surfactant = Microspersion EZ

Several sheets were made from these pulp formulations, dried, tested, and thermally analyzed.

| Sheet: | 1$^{st}$ ply | 2$^{nd}$ ply | Thickness/in | TADT/° C. |
|---|---|---|---|---|
| DL1 (control) | DP1 | DP1 | 0.0177 | 9.6 |
| DL2 | DP2 (5% P) | DP2 (5% P) | 0.0158 | 8.2 |
| DL3 | DP3 (10% P) | DP1 | 0.0190 | 7.2 |

Clearly, these data demonstrate the advantage of a non-uniform distribution of insulating particles 12 within the cross section of the paper sheet 10.

Figure 47:
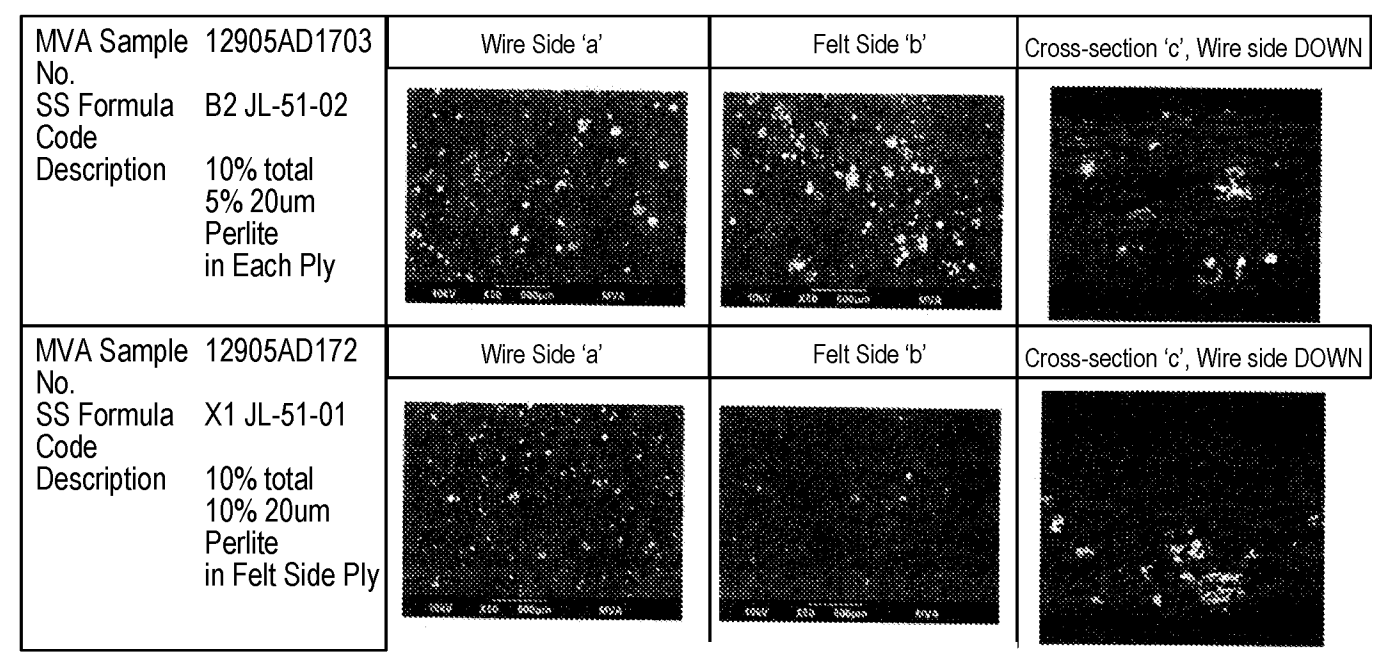

FIG. 47 depicts SEMs of sheets DL2 (MVA Sample 12905AD1703) and DL3 (MVA Sample 12905AD1702), both surfaces of the sheets as well as cross sections. The felt side of DL3 shows slight surface contamination (probably from perlite adhering to the felt) however, a clean cross section. DL2 cross section shows perlite spheres distributed throughout the paper thickness over the two plies.

Three Ply Sheets:

Sheets with three plies were conceived in which the two outer sheets are pulp and the inner layer of the sandwich contains a high concentration of insulating materials. A flaked grade of perlite was also included in these experiments, Dicapearl LD1006 supplied by Dicalite Management Group. This material was mixed into pulp without the addition of other assistants. After mixing.

|  | DP1 No filler | TP2 50% perlite (75 micron hollow spheres) | TP3 50% flaked perlite | TP4 66.7% flaked perlite | TP5 66.7%: 50 um flaked 50% 20 u spherical | TP6 66.7% iM30K glass bubbles |
|---|---|---|---|---|---|---|
| Water/g | 800 | 800 | 800 | 800 | 800 | 800 |
| Pulp/g | 4.5 | 4.5 | 4.5 | 4.5 | 4.5 | 4.5 |
| Surfactant/g |  | 1.6 |  |  | 1.6 |  |
| Perlite (75 micron)/g |  | 4.5 |  |  |  |  |
| Perlite (20 micron)/g |  |  |  |  | 4.5 |  |
| Dicapearl LD1006 |  |  | 4.5 | 9.0 | 4.5 |  |
| iM30K |  |  |  |  |  | 9.0 |
| Household ammonia/g |  | 2-4 |  |  | 2-4 | 2-4 |
| 0.5% Cationic Guar Gum aq/g | Mix 10 | Mix 10 | Mix 10 | Mix 10 | Mix 10 | Mix 10 |

Results Thickness Adjusted Temperature Change (Delta-T)—adjusting for a thickness of 0.045 inches caliper.

| Sheet: | 1ˢᵗ ply | 2ⁿᵈ ply | 3ʳᵈ ply | Thickness/in | TADT*/° C. |
|---|---|---|---|---|---|
| TL1 (control) | DP1 | DP1 | DP1 | 0.0228 | 28.8 |
| TL2 | DP1 | TP2 (50% 75 u Perlite) | DP1 | 0.0415 | 13.4 |
| TL3 | DP1 | TP3 (50% flaked) | DP1 | 0.0398 | 14 |
| TL4 | DP1 | TP4 (66.7% flaked) | DP1 | 0.0535 | 8.3 |
| TL5 | DP1 | TP5 combination | DP1 | 0.0527 | 8.6 |
| TL6 | DP1 | TP6 (66.7% glass bubbles) | DP1 | NT | NT |

*Thickness adjusted to 0.045 inches caliper.

Results Thickness Adjusted Temperature Change (Delta-T)—adjusting for a thickness of 0.009 inches caliper allows comparison to single ply samples.

| Sheet: | 1ˢᵗ ply | 2ⁿᵈ ply | 3ʳᵈ ply | Thickness/in | TADT**/° C. |
|---|---|---|---|---|---|
| TL1 (control) | DP1 | DP1 | DP1 | 0.0228 | 5.8 |
| TL2 | DP1 | TP2 (50% 75 u Perlite) | DP1 | 0.0415 | 2.7 |
| TL3 | DP1 | TP3 (50% flaked) | DP1 | 0.0398 | 2.8 |
| TLA | DP1 | TP4 (66.7% flaked) | DP1 | 0.0535 | 1.7 |
| TL5 | DP1 | TP5 combination | DP1 | 0.0527 | 1.7 |

**Thickness adjusted to 0.009 inches caliper.

These data show that we are able to incorporate low density insulating materials into a paper structure to increase the thermal insulative properties by a factor of at least 3-4.

Sheets TL1 through TL5 contain a mixture of pulp and additive in the 2ⁿᵈ (middle) ply. It is also possible to make insulating paper by creating a 2ⁿᵈ ply (middle layer) that does not contain pulp. As shown in FIG. 12, insulating filler or additive (12) may be added as either a concentrate or a dry powder between two plies of fiber (10). Similarly, a concentrated slurry of insulating; additive may be incorporated between two plies using a slot-die coater, or a spray boom as shown in FIG. 13E. If the application head is close enough to the bottom layer headbox on the forming line, then the amount of water will be high enough that some mixing of the two layers may be expected. In this regard, fibers may help with z-directional adhesion between the three layers in the finished paper, while maintaining a non-uniform cross sectional sheet.

The middle layer could comprise a concentrate such as formulation JL 97-01. The middle layer may optionally include a binder, such as a latex Rovene 6400, or poly(vinyl acetate), or a modified starch, or a mixture of cooked and uncooked starch, or a water soluble synthetic polymer such as poly(vinyl alcohol). If necessary, a defoamer may be added to control foam. Surface active agents may also be included in the middle layer slurry to help wet-out and stabilize the insulating elements, such as Disperbyk 190, Zetasperse 3100, Surfynol 440, or numerous other resinous and non-resinous surfactants.

The bottom and top plies may contain a retention aid, a flocculant, or a binder. Such materials may be cationic, such as poly(ethylene imine), poly(acrylamide), or quaternary ammonium functionalized natural polymers, such as cationic guar gum. In this way, migration of the additive as water drains from the top ply through the underlying middle and bottom ply is limited and fines are trapped.

Concentrates for 2$^{nd}$ Ply (Middle Layer):

| | Mass/g |
|---|---|
| Formula JL 97-01: 75 u spherical perlite concentrate | |
| Water | 125 |
| Microspersion EZ | 0.134 |
| Disperbyk 190 | 25.0 |
| Mix, then add in portions while mixing: | |
| Cenostar P-32 (75 micron spherical perlite) | 40.0 |
| Formula JL 147-01: glass bubbles concentrate | |
| Water | 80 |
| Rovene 4100 (binder of ~50% solids) | 20 |
| iM30K glass bubbles (3M) | 90 |
| Formula glass bubbles concentrate, binder free | |
| Water | 85 |
| iM30K glass bubbles (3M) | 90 |

These coatings may be applied to the paper forming line shortly after a layer of pulp exits the headbox. The concentrate coatings may be applied using a spray nozzle, or a blade coater, or a curtain coater, or a slot-die coater. A coagulant or flocculant may be then be applied on top of the middle ply via spraying, or slot-die coating as non-limiting examples. The coagulant flocculant may also be incorporated in additional layers of pulp below and above the middle insulating layer.

It stands to reason that while a three-ply system has been explored, many more plies may be similarly formed, resulting in 5 ply, 7 ply, or higher-ply systems via similar processes. FIG. 13G depicts a four-ply paper machine.

Example 6. Corrugated Samples of 3-ply Paper Sheets

An antique desk-top hand cranked corrugator was purchased. The corrugator indicated U.S. Reexam Pat. No. RE009,127 "Fluting-Machine", re-issued Mar. 23, 1880 to H. Albrecht.

A sheet of TL1 was hung from inside an inverted 5 gallon pail and held over a boiling tea kettle to steam the sheet. The cast iron hand-cranked corrugator was warmed with a hair dryer, and the warm steamed sheet was promptly rippled. This was promptly bonded between two non-corrugated sheets of TL1 to make a rudimentary corrugated structure. Single ply filled sheets were hand pressed in the lab and dried:

| Sheet Composition ID | EJ | EK |
|---|---|---|
| Water/g | 800 | 800 |
| Pulp/g | 4.5 | 4.5 |
| Flaked Perlite LD1006/g | 9.0 | |
| iM30K glass bubbles/g | | 9.0 |
| Household ammonia/g | | 2-4 |

A sheet of TL1 was hung from inside an inverted 5 gallon pail and held over a boiling tea kettle to steam the sheet. The cast iron hand-cranked corrugator was warmed with a hair dryer, and the warm steamed sheet was promptly fluted. This was promptly bonded between two non-corrugated sheets of EJ to make a rudimentary corrugated structure. This procedure was repeated using EK sheets for all three layers.

Figure 48:
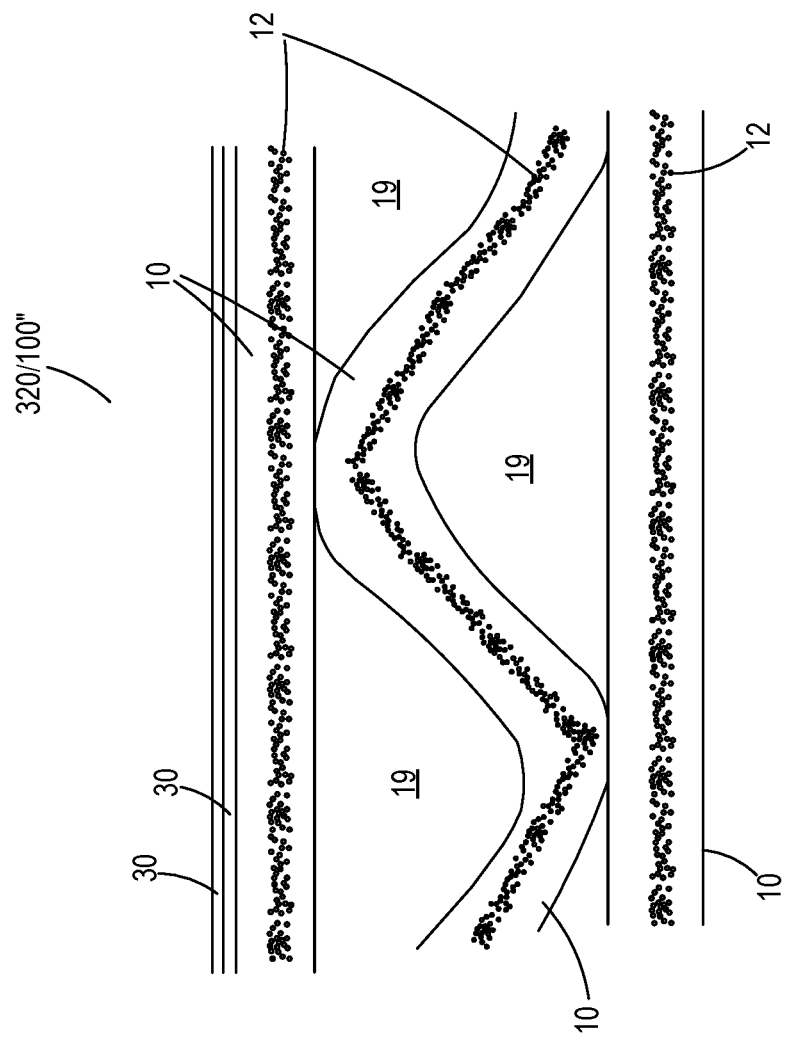
FIG. 48 depicts a corrugated structure of the present invention with one side coated.

A sheet of TL1, EJ, and EK were each coated with Kaolin clay formulation 127-01, then dried, and then coated with 137-02 (BiLite (BASF)—bismuth oxychloride coated mica flakes) and dried. More uncoated sheets were steamed and fluted, and similar corrugated structures were produced incorporating one of the coated sheets with the coating side facing out as depicted in FIG. 48.

10 cm diameter disks were cut of each sample, and mounted into a cooler window for thermal testing. Prior to sealing with marine adhesive, the samples were gently pushed into the front of the cooler window so that the face of the composite was flush with the front of the cooler. 10 cm discs of the following were also cut as controls: Aluminized bubble wrap, corrugated C-flute (35 lbs·MSQ kraft liners with 23 lb medium, Corrugated Supplies Inc.), corrugated B-flute (35 lbs·MSQ kraft liners with 23 lb medium, Corrugated Supplies Inc.), triple wall corrugated B-C flute (35 lbs·MSQ kraft liners with 23 lb medium, Corrugated Supplies Inc.).

Because these samples had significant thickness, temperature rise was monitored over a an initial period of time until three consecutive 15 minute temperature readings showed an increase in temperature within +/−0.1° C. of each other. Upon attaining consistent temperature increase readings over 15 minutes, this was designated as pseudo-steady state. The temperature of the outside lamp-facing surface was also measured using a hand-held pyrometric infra-red thermometer, taking care to try not to allow reflections of the hot lamp from interfering. Usually, a pseudo-steady state situation of incremental temperature increases was established within 15 minutes of run time.

Results of Controls

| Paper | corrugate C-Flute | corrugate B-Flute | Corrugate BC Flute | Bubblewrap Aluminized |
|---|---|---|---|---|
| Ave. Thickness/mm | 4 | 3.175 | 6.35 | 3.175 |
| Coating 1 | — | — | — | — |
| Coating 2 (lamp facing) | — | — | — | — |
| 1 hr Water T Rise/° C. | 3.04 | 3.2 | 2.8 | 1.4 |
| Ave temp difference outer face of window vs. water/° C. | 96.4 | 91.1 | 133.8 | Very noisy data. 74 +/− 25° C. |
| W · m$^{-2}$ | 203 | 214 | 187 | 94 |

| Paper | corrugate Control TL1 | corrugate Flake Perl. EJ | corrugate Gls Bubls EK | corrugate Coated TL1 | corrugate Flk Perl EJ | corrugate Gls Bubls EK |
|---|---|---|---|---|---|---|
| Av. Thkns/mm | 3.87 | 5.51 | 5.68 | 4.11 | 5.44 | 6.36 |
| Coating 1 | — | — | — | 127-01 | 127-01 | 127-01 |
| Coat. 2 lamp | — | — | — | 137-02 | 137-02 | 137-02 |

-continued

| Paper | corrugate Control TL1 | corrugate Flake Perl. EJ | corrugate Gls Bubls EK | corrugate Coated TL1 | corrugate Flk Perl EJ | corrugate Gls Bubls EK |
|---|---|---|---|---|---|---|
| 1 hr T Rise/° C. | 2.4 | 2.13 | NT* | 2 | 1.73 | 1.8 |
| Av. Delta T outer face of window vs. water/° C. | 78.5 | 87.1 | NT* | 74.2 | 86.2 | 77.5 |
| W.m$^{-2}$ | 154 | 143 |  | 134 | 116 | 120 |

* Structure failed during testing-delaminated.

These data demonstrate the additive combination of addressing both radiative heat transfer as well as conductive heat transfer.

Example 7. Coffee Cup Insulated Sleeve Demonstration

Figure 49:
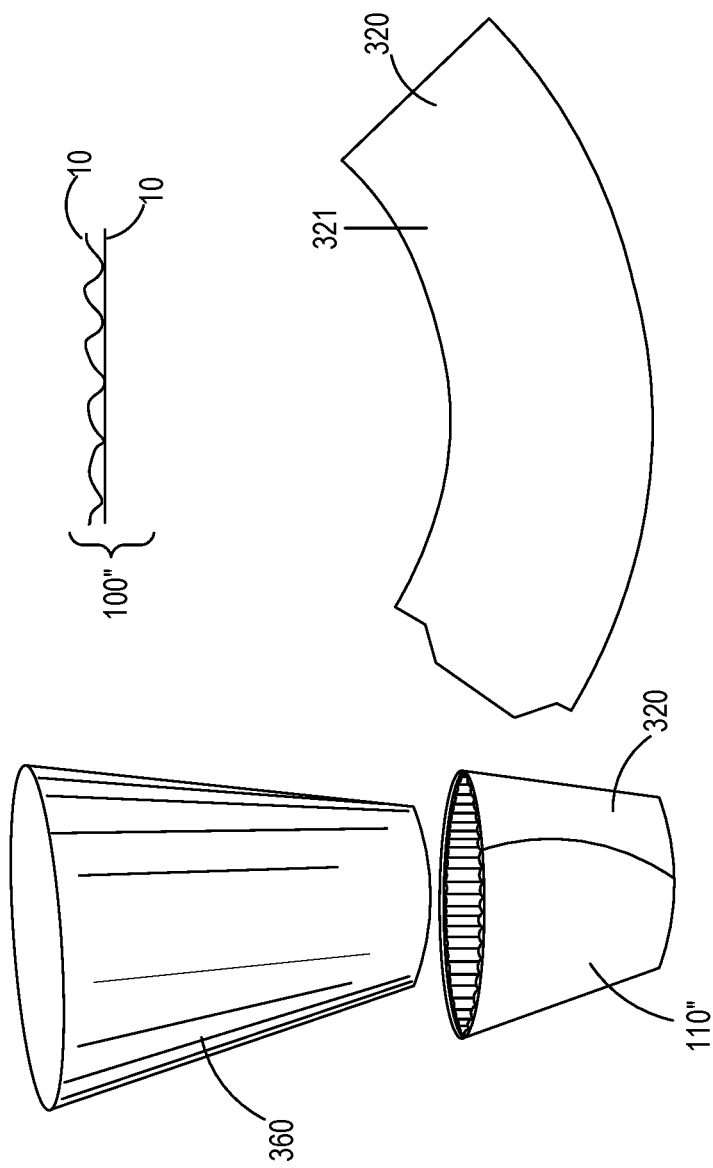
FIG. 49 depicts single faced corrugate paper hot beverage cup sleeves including the net and cross section.

FIG. 48 depicts a single faced beverage cup insulated sleeve 320, commonly used to prevent painful burning of coffeeshop patrons ordering hot coffee in a 'to go' disposable cup (see, cup in FIG. 49). The device 320 consists of a single-faced corrugated kraft fiberboard 100″ cut into a specific shape to form a truncated conical structure 320 that slides over the hot beverage cup (see again, cup in FIG. 49), protecting the holder from heat transmitted through the thin walled PE-lined paper cup. While the present invention is directed at devices 60/62 to maintain foods and other perishables at low temperature, transmission of heat from hot liquids affords a cognitively intuitive demonstration of the insulating technology. In this regard, additional sheets of TL4 were produced. One sheet of TL4 was steamed for 5 minutes in an inverted 5 gallon pail and promptly corrugated using the pre-warmed cast iron antique hand-cranked tabletop corrugator. This corrugated TL4 sheet was placed onto a flat sheet of TL4 that had been sprayed with 3M contact adhesive to form a single faced corrugate 110″. A commercially available hot beverage cup sleeve was deconstructed to determine the net shape. The net shape 321 was cut from the TL4 single faced corrugate 110″. The resultant device 320 was weighed, and found to weigh 10 g.

Juvo kraft board 35 lbs/1,000 sq ft (170 gsm) postcards were also corrugated. 3 flat sheets were laminated and then one corrugated sheet was attached to the composite. When this net was cut out and formed into a sleeve, it also had a mass of 10 g. This composite device was designated "control" as it did not include insulating materials.

Both the Juvo kraft control, the TL4 test device, were placed over two "tall" sized PE-lined paper cups 360 obtained from a Starbucks® store. In addition, an expanded polystyrene) cup 360 was also placed close by for comparison. A kettle of water was boiled. As quickly as safely possible, all three cups 360 were filled with boiling water, and a timer started. Every 30 seconds from filling, an infra-red pyrometer thermometer was used to measure the temperature of the outside of the two sleeves made, as well as the apparent temperature of the EPS cup.

| Time from filling/s | Expanded PS | Control (kraft) | TL4 |
|---|---|---|---|
| 30 | 61.0° C. | 54.2° C. | 48.7° C. |
| 60 | 63.0° C. | 57.3° C. | 53.3° C. |
| 120 | 60.2° C. | 57.6° C. | 52.5° C. |
| 180 | 58.8° C. | 58.6° C. | 54.3° C. |
| 240 | 56.7° C. | 58.2° C. | 55.0° C. |
| 300 | 55.6° C. | 55.0° C. | 51.4° C. |

As can be clearly seen, the external temperature of the TL4 sleeve 320 was consistently lower in temperature than both the control sleeve and the expanded poly(styrene) cup 360.

The present invention is described above and further illustrated below by way of claims, which are not to be construed in any way as imposing limitations upon the scope of the invention. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

What is claimed is:

1. An insulated paper product comprising:
   two or more paper layers and insulating material, said insulating material comprising particles having an average particle size of less than about 1000 microns (μm), said particles comprising perlite, expanded perlite, perlite hollow microspheres, perlite microspheres, milled expanded perlite, perlite flakes, cenospheres, glass bubbles, glass microbubbles, vermiculite, hollow expanded vermiculite, or any combination thereof, the two or more paper layers being bonded to one another so as to form an integral paper product,
   wherein the integral paper product (i) has a non-uniform distribution of the insulating material therethrough and (ii) is repulpable, and
   wherein the insulating material has a material bulk density of less than 0.6 gram per cubic centimeter (g/cm$^3$).

2. The insulated paper product of claim 1, wherein said insulated paper product comprises at least one layer in combination with said two or more paper layers with said at least one layer comprising said insulating material.

3. The insulated paper product of claim 1, wherein one or more paper layers within said two or more paper layers comprise the insulating material.

4. The insulated paper product of claim 1, wherein the integral paper product comprises from two to 24 paper layers.

5. The insulated paper product of claim 1, wherein the insulated paper product further comprises one or more non-paper layers.

6. The insulated paper product of claim 5, wherein the one or more non-paper layers comprise a gypsum layer, a clay-containing layer, a polymer coating, a pigment-containing layer, a fabric layer, a layer of insulating material, a metal film layer, a foam layer, or any combination thereof.

7. The insulated paper product of claim 5, wherein the one or more non-paper layers comprise a coating that provides a lower emissivity of the insulated paper product.

8. The insulated paper product of claim 5, wherein the one or more non-paper layers comprises bismuth oxychloride, mica, bismuth oxychloride-coated mica, zinc oxide, zinc sulfide, cadmium sulfide, bismuth vanadate, gypsum, sericite, powdered silicon, silver-coated glass bubbles, aluminum oxide, or any mixture or combination thereof.

9. The insulated paper product of claim 5, wherein the one or more non-paper layers comprises bismuth oxychloride, mica, zinc oxide, sericite, gypsum, aluminum oxide, or any mixture or combination thereof.

10. The insulated paper product of claim 1, wherein the insulating material comprises particles having an average particle size of less than about 500 microns (μm).

11. The insulated paper product of claim 1, wherein the insulating material comprises particles having a multi-modal particle size distribution.

12. The insulated paper product of claim 1, wherein each paper layer that contains insulating material comprises from 15.0 weight percent (wt %) to 80.0 wt % fibers, and from about 85.0 wt % to about 20.0 wt % of the insulating material, based on a total weight of a given paper layer within the two or more paper layers.

13. The insulated paper product of claim 1, wherein the insulated paper product is molded to form a three-dimensional object.

14. The insulated paper product of claim 1, wherein said insulated paper product comprises a storage container, said storage container comprising a storage volume at least partially surrounded by one or more container walls, each of the one or more container walls comprising the two or more paper layers and the insulating material.

15. The insulated paper product of claim 14, wherein the storage volume is completely surrounded by or surroundable by the one or more container walls.

16. The insulated paper product of claim 14, wherein the one or more container walls further comprise a gypsum layer, a clay-containing layer, a polymer coating, a pigment-containing layer, a bismuth oxychloride-containing layer, a mica containing layer, an aerogel containing layer, a fabric layer, a layer of insulating material, a metal film layer, a foam layer, a layer of air, a coating that lowers an emissivity of the one or more container walls, a coating that lowers a thermal conductivity of the one or more container walls, a coating that enhances a water-repellency of the one or more container walls and comprises a wax, or a fluorocarbon, or an epoxy or a urethane, or a silicone-based coating, or a polymeric emulsion or latex, or any combination thereof.

17. The insulated paper product of claim 14, wherein the storage container comprises a box.

18. The insulated paper product of claim 14, wherein the storage container comprises a cup, a mug, a flask, a thermos, a clam shell type box packaging for hot food, a salad container for chilled food, a padded envelope, or a shipping container.

19. The insulated paper product of claim 14, further comprising a coating on (i) an inner surface, (ii) an outer surface, or (iii) both (i) and (ii) of the storage container, the coating comprising materials selected from mica, bismuth oxychloride, bismuth oxychloride-coated mica, sericite, gypsum, aluminum oxide, or any combination thereof.

20. A method of using the insulated paper product of claim 14, said method comprising:
positioning an object within the storage volume of the storage container.

21. The insulated paper product of claim 1, wherein each of the two or more paper layers comprises one or more additives, other than the insulating material, said one or more additives comprising copper ions, waxes, synthetic fibers, silica, surface modified silica, transition metal surface modified silica, cyclodextrin, sodium bicarbonate, silicones to impart grease and water resistance, metalized ceramic particles, metalized fibers, cationic starches, cationic polymers, fillers, sizes, binders, clay, bentonite clay, kaolin clay, calcium carbonate, calcium sulfate, a flocculant, a retention aid, or any combination thereof.

22. The insulated paper product of claim 1, wherein at least one layer of said insulated paper product comprises starch.

23. An insulated paper product comprising:
two or more paper layers and insulating material, said insulating material comprising particles having an average particle size of less than about 1000 microns (μm), said particles comprising perlite, expanded perlite, perlite hollow microspheres, perlite microspheres, milled expanded perlite, perlite flakes, cenospheres, glass bubbles, glass microbubbles, vermiculite, hollow expanded vermiculite, or any combination thereof, the two or more paper layers being bonded to one another so as to form an integral paper product,
wherein the integral paper product (i) has a non-uniform distribution of the insulating material therethrough and (ii) is repulpable, and
wherein the non-uniform distribution of insulating material within said integral paper product comprises (i) at least two paper layers with the insulating material therein and (ii) at least one paper layer substantially free of the insulating material.

24. The insulated paper product of claim 23, wherein the integral paper product comprises from two to 24 paper layers.

25. An insulated paper product comprising:
two or more paper layers and insulating material, said insulating material comprising particles having an average particle size of less than about 1000 microns (μm), said particles comprising perlite, expanded perlite, perlite hollow microspheres, perlite microspheres, milled expanded perlite, perlite flakes, cenospheres, glass bubbles, glass microbubbles, vermiculite, hollow expanded vermiculite, or any combination thereof, the two or more paper layers being bonded to one another so as to form an integral paper product,
wherein the integral paper product (i) has a non-uniform distribution of the insulating material therethrough and (ii) is repulpable, and
wherein all paper layers within said integral paper product comprise the insulating material.

26. The insulated paper product of claim 25, wherein the integral paper product comprises from two to 24 paper layers.

27. An insulated paper product comprising:
two or more paper layers and insulating material, said insulating material comprising particles having an average particle size of less than about 1000 microns (μm), said particles comprising perlite, expanded perlite, perlite hollow microspheres, perlite microspheres, milled expanded perlite, perlite flakes, cenospheres, glass bubbles, glass microbubbles, vermiculite, hollow expanded vermiculite, or any combination thereof, the two or more paper layers being bonded to one another so as to form an integral paper product, wherein the integral paper product (i) has a non-uniform distribution of the insulating material therethrough and (ii) is repulpable, wherein the integral paper product comprises (i) a first linerboard layer comprising one or more first paper layers, (ii) a second linerboard layer comprising one or more second paper layers, and (iii) a fluted paper layer comprising one or more fluted paper layers positioned between the first linerboard layer and the second linerboard layer, and one or more of (i) said first linerboard layer, (ii) said second linerboard layer, and (iii) said fluted paper layer independently comprises insulating material therein or thereon, and wherein said fluted paper layer provides pockets of air between said first linerboard layer and said second linerboard layer, and said pockets of air represent from about 20 to 80 volume percent of a total volume occupied by said fluted paper layer.

28. The insulated paper product of claim 27, further comprising an adhesive that bonds portions of said fluted paper layer to portions of said first linerboard layer and said second linerboard layer.

29. The insulated paper product of claim 28, wherein said adhesive has the insulating material dispersed therein.

30. An insulated paper product comprising:

two or more paper layers and insulating material, said insulating material comprising particles having an average particle size of less than about 1000 microns (μm), said particles comprising perlite, expanded perlite, perlite hollow microspheres, perlite microspheres, milled expanded perlite, perlite flakes, cenospheres, glass bubbles, glass microbubbles, vermiculite, hollow expanded vermiculite, or any combination thereof, the two or more paper layers being bonded to one another so as to form an integral paper product, wherein the integral paper product (i) has a non-uniform distribution of the insulating material therethrough and (ii) is repulpable, and wherein at least one layer of said two or more paper layers has a layer density of less than 1.0 g/cm$^3$.

31. An insulated paper product comprising:

two or more paper layers and insulating material, said insulating material comprising particles having an average particle size of less than about 1000 microns (μm), said particles comprising perlite, expanded perlite, perlite hollow microspheres, perlite microspheres, milled expanded perlite, perlite flakes, cenospheres, glass bubbles, glass microbubbles, vermiculite, hollow expanded vermiculite, or any combination thereof, the two or more paper layers being bonded to one another so as to form an integral paper product, wherein the integral paper product (i) has a non-uniform distribution of the insulating material therethrough and (ii) is repulpable, and wherein said integral paper product has an integral paper product density of less than 1.0 g/cm$^3$.

32. An insulated paper product comprising:

two or more paper layers and insulating material, said insulating material comprising particles having an average particle size of less than about 1000 microns (μm), said particles comprising perlite, expanded perlite, perlite hollow microspheres, perlite microspheres, milled expanded perlite, perlite flakes, cenospheres, glass bubbles, glass microbubbles, vermiculite, hollow expanded vermiculite, or any combination thereof, the two or more paper layers being bonded to one another so as to form an integral paper product, wherein the integral paper product (i) has a non-uniform distribution of the insulating material therethrough and (ii) is repulpable, and wherein said insulated paper product comprises a storage container, said storage container comprising a storage volume at least partially surrounded by one or more container walls, each of the one or more container walls comprising the two or more paper layers and the insulating material, and said insulated paper product further comprises a coating on (i) an inner surface, (ii) an outer surface, or (iii) both (i) and (ii) of the storage container, the coating having a thermal emissivity of less than 0.90 at 23° C., as measured using Thermal Emissivity Method #4.

33. The insulated paper product of claim 32, wherein the storage container comprises a cup, a mug, a flask, a thermos, a clam shell type box packaging for hot food, a salad container for chilled food, a padded envelope, or a shipping container.

34. A method of using the insulated paper product of claim 32, said method comprising:

positioning an object within the storage volume of the storage container.

* * * * *